(12) United States Patent
Murashita et al.

(10) Patent No.: US 7,152,038 B2
(45) Date of Patent: Dec. 19, 2006

(54) RESERVATION METHOD OFFERING AN ALTERNATIVE EVENT

(75) Inventors: Kimitaka Murashita, Kawasaki (JP); Satoshi Iwata, Kawasaki (JP); Shoji Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 992 days.

(21) Appl. No.: 09/824,237

(22) Filed: Apr. 3, 2001

(65) Prior Publication Data

US 2002/0062236 A1  May 23, 2002

(30) Foreign Application Priority Data

Nov. 22, 2000  (JP) .............................. 2000-356555

(51) Int. Cl.
*G06Q 10/00* (2006.01)
(52) U.S. Cl. ........................................................ 705/5
(58) Field of Classification Search ...................... None
See application file for complete search history.

(56) References Cited

U.S. PATENT DOCUMENTS

| | | | | |
|---|---|---|---|---|
| 5,272,474 A | * | 12/1993 | Hilliard | 340/825.29 |
| 5,359,508 A | * | 10/1994 | Rossides | 705/30 |
| 5,596,636 A | | 1/1997 | Davies et al. | 379/216.01 |
| 5,712,979 A | * | 1/1998 | Graber et al. | 709/224 |
| 5,978,770 A | * | 11/1999 | Waytena et al. | 705/5 |
| 5,987,420 A | * | 11/1999 | Maeda et al. | 705/5 |
| 6,189,783 B1 | * | 2/2001 | Motomiya et al. | 235/375 |
| 6,249,767 B1 | * | 6/2001 | Okayama et al. | 705/5 |
| 6,876,973 B1 | * | 4/2005 | Visconti | 705/5 |
| 7,070,539 B1 | * | 7/2006 | Brown et al. | 482/8 |
| 7,082,402 B1 | * | 7/2006 | Conmy et al. | 705/8 |

FOREIGN PATENT DOCUMENTS

JP  11250155  * 9/1999

OTHER PUBLICATIONS

MacArthur, Kate; Fighting a Wait Problem: As more Americans choose to dine out these days, restaurants try to alleviate longer waits with entertainment, takeout; Jun. 5, 2000; Advertising Age, v71, p. 22; dialog copy 2 pages.*

* cited by examiner

*Primary Examiner*—Thomas A. Dixon
(74) *Attorney, Agent, or Firm*—Staas & Halsey LLP

(57) ABSTRACT

The present invention relates to a reservation server which comprises a retaining section for retaining store/facility information including a reservation-needed service and a reservation situation, a network terminal for outputting alternative event substituting for the service, a receiving section for receiving a desired service, a reservation managing section for selectively reading out the store/facility information and the alternative event, and a transmitting section for transmitting the information and event. Accordingly, a service provider can notify a user of a service and reservation situation of a store-near the user or the start/end time of the service, and the time to be taken for the service and can suggest an alternative event in a time zone convenient to the user.

19 Claims, 43 Drawing Sheets

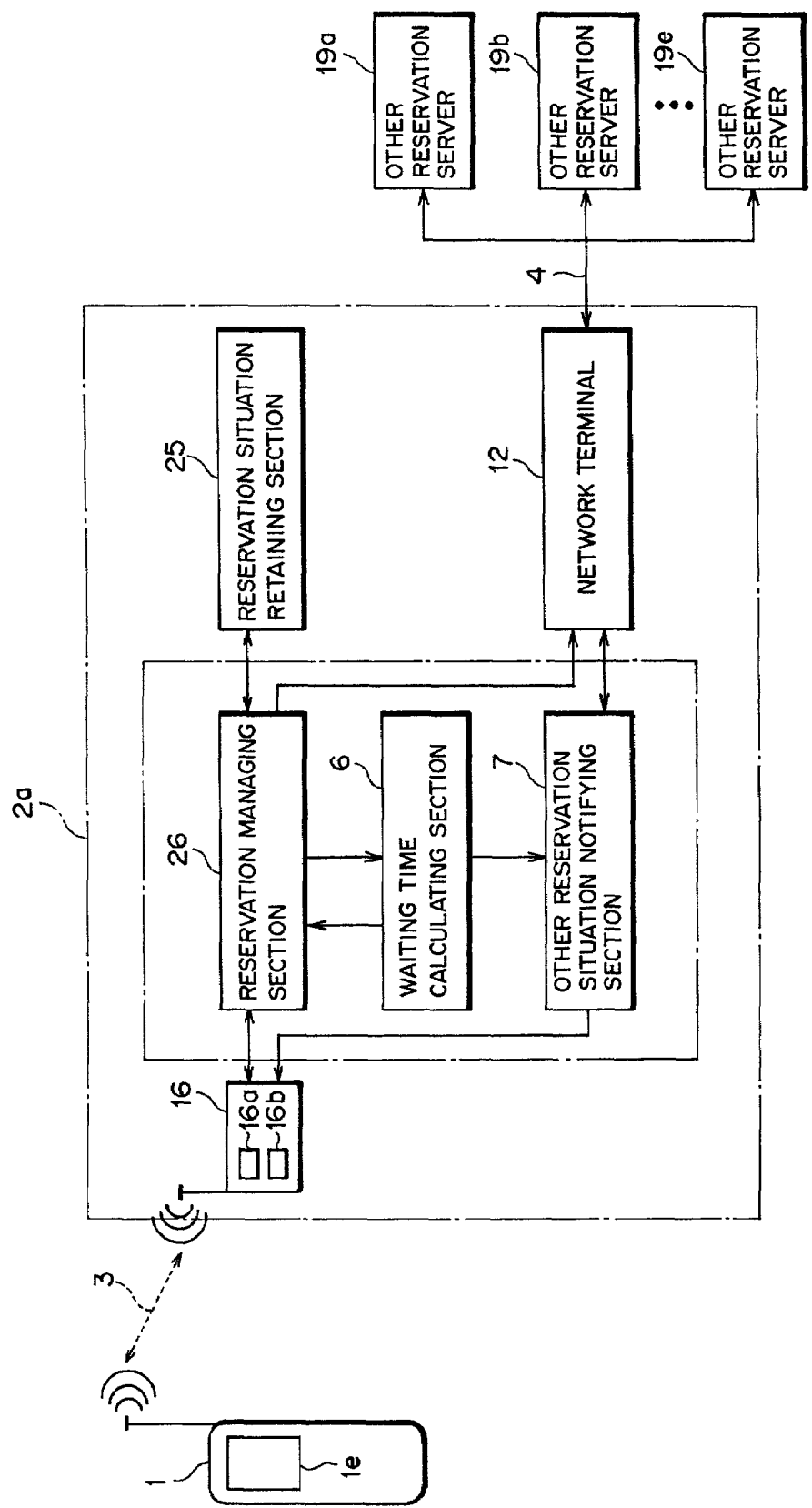

FIG. 19A

| PRESENT TIME | 12:10 |
|---|---|
| SCREENING START TIME | 13:25 |
| SCREENING END TIME | 15:25 |

FIG. 19B

| FACILITIES | MOVING TIME | WAITING TIME | REFORMANCE TIME |
|---|---|---|---|
| COFFEE SHOP | 15 MINUTES | 10 MINUTES | 60 MINUTES |
| BOWLING ALLEY | 10 MINUTES | 30 MINUTES | 50 MINUTES |
| KARAOKE BOX | 10 MINUTES | 0 MINUTES | 60 MINUTES |
| RESTAURANT | 10 MINUTES | 0 MINUTES | 60 MINUTES |

FIG.42(a)

```
                                                            1e
┌──────────────────────────────────────────────┐
│  ┌────────────────────────────────────────┐  │
│  │ MOVIE SHOWING AT  aa:bb                │  │
│  │ "ccccc"  ALL SEATS ARE OCCUPIED.       │  │
│  │ SELECT ONE FROM THE FOLLOWING          │  │
│  │  ┌──────────────────────────┐          │  │
│  │  │ RESERVE NEXT RUNNING     │          │  │
│  │  └──────────────────────────┘          │  │
│  │   RESERVE ANOTHER MOVIE                │  │
│  │   CANCEL                               │  │
│  └────────────────────────────────────────┘  │
└──────────────────────────────────────────────┘
```

FIG.42(b)

```
                                                            1e
┌──────────────────────────────────────────────┐
│  ┌────────────────────────────────────────┐  │
│  │ MOVIE SHOWING AT  aa:bb                │  │
│  │ "ccccc"  ALL SEATS ARE OCCUPIED.       │  │
│  │ VACANT SEATS EXIST IN ANOTHER          │  │
│  │ MOVIE THEATER.                         │  │
│  │ RESERVE ?                              │  │
│  │  ┌────────────────────────────────────┐│  │
│  │  │ dd/ee   THEATER"fff"  5 MINUTES ON FOOT │  │
│  │  └────────────────────────────────────┘│  │
│  │    gg/hh   THEATER"iii" 10 MINUTES ON FOOT │
│  │    CANCEL                              │  │
│  └────────────────────────────────────────┘  │
└──────────────────────────────────────────────┘
```

FIG.43(a)

| PRESENT TIME | 12:10 |
|---|---|
| SCREENING START TIME | 13:25 |
| SCREENING END TIME | 15:25 |
| WAITING TIME | ONE HOUR AND FIFTEEN MINUTES |

FIG.43(b)

| FACILITIES | MOVING TIME | WAITING TIME | PERFORMANCE TIME |
|---|---|---|---|
| RESTAURANT | 10 MINUTES | 0 MINUTES | 60 MINUTES |
| KARAOKE BOX | 10 MINUTES | 0 MINUTES | 60 MINUTES |
| COFFEE SHOP | 15 MINUTES | 10 MINUTES | 60 MINUTES |
| BOWLING ALLEY | 10 MINUTES | 30 MINUTES | 50 MINUTES |

RESERVATION METHOD OFFERING AN ALTERNATIVE EVENT

BACKGROUND OF THE INVENTION (1) Field of the Invention

The present invention relates to a reservation server, a user terminal, a reservation system and a reservation method, suitable for use in, for example, ticket purchase/ reservation at movie theaters, recreation grounds or the like having a window for customers, such as ticket or box office, or in service reservation at restaurants.

(2) Description of the Related Art

In general, when getting a ticket for a movie theater, theater, recreation ground, transportation means or the like, a user stands in a queue in front of a ticket office in order to purchase it directly, or reserves it through telephone or Internet. Furthermore, the user purchases, for example, a ticket for a movie theater, he/she desires, through an operator (ticket seller) or a ticket issuing machine at a window for customers (user window; sometimes, which will hereinafter be referred to simply as a "window"), or purchases a railroad ticket or an airline ticket.

In addition, a user frequently makes reservation through remote access means such as telephone or Internet (which will sometimes be referred to hereinafter as "reservation made through remote access means"). For example, the telephone reservation has come into widespread use for concert tickets, sports tickets, seats in restaurants and others.

An operator has access to a server for managing ticket reservation in order to size up the ticket issuing situation of a terminal or a ticket issuing machine, thereby accomplishing services to users.

For the telephone reservation, a host server is designed to reserve and issue a ticket desired (demanded) by a user, through a remote user terminal or line.

At this time, as well known, a line of people is made in front of a window, or a queue is made for use of a ticket issuing machine or on reservation calls by a remote access means. This queue usually happens not only at a ticket office but also at various places such as a cash register, a window of a bank and a cash dispenser.

However, in order to purchase of a ticket or reservation thereon, users must queue up at a window and face an operator on a one-to-one basis. In addition, when using an attraction (big wheel, roller coaster, or the like) in a recreation ground or receiving a service such as buying bargain goods which may requires users to wait in a queue, a user is almost forced to go directly to the attraction spot and stand in a queue at a window therefor.

For these reasons, with a conventional reservation system, a user is confronted with the following problems (1-1) to (1-5) while a store with the following problems (2-1) to (2-5).

(1-1) While the user stands in a queue, limitation is imposed on his/her activities. That is, the user cannot leave that place in the meantime. For example, when restrained for thirty minutes, the user cannot do anything in the meantime.

(1-2) Although the user can estimate the degree of jam to some extent, the user cannot decide if he/she will be able to receive a service (reservation-needed service) For example, the user cannot check whether the tickets for a movie are sold out or not.

(1-3) Reservation to be made through a remote access means requires access to a server. Accordingly, the server does not give a chance for reservation to the user.

(1-4) With the reservation to be made through a remote access means, even if the user receives other service information or advertisement from a server when making reservation, the user cannot seize whether or not they are acceptable in view of distance or time to be taken. In addition, such service information on a distance-wise or time-wise impracticality is useless to the user in view of time, communication change or the like.

(1-5) When reservation cannot be made because of sold-out, the user needs to search another service by himself or herself (which sometimes will be referred to hereinafter as an "alternative service") substituting for the sold-out reservation, the user wants.

On the other hand, a store will be confronted with the following problems.

(2-1) The store must place a predetermined number of operators at all times, or prepare change or ticket paper in a ticket issuing machine.

(2-2) The store needs to count the number of users or the length of a queue made for purchase of, for example, popular goods in front of a window before the business hour, and if there is a possibility that the store cannot offer the service to the users, the store needs to inform the users of this situation.

(2-3) The store needs to conduct a window service quickly when a large number of users are waiting. Accordingly, for example, the store cannot offer a service other than reservation to users while keeping the users waiting.

(2-4) The store cannot select only the users existing in the neighborhood, i.e., in a store's service available range to transmit a service information to the selected users.

(2-5) When a user makes a reservation through a remote access means, the store does not know where the user is at the moment the reservation is made. Accordingly, it is impossible for the store to notify the user of other services (or service information) available near the place where the user is. Even if the store should notify the user of other services information, it is impossible for the store to know whether or not the notified services are really available for the user. Therefore, the frequency which the user actually uses the notified service information remains low.

SUMMARY OF THE INVENTION

Accordingly, the present invention has been developed in order to eliminate the above-mentioned problems, and it is therefore an object of the invention to provide a reservation server, user terminal, reservation system and reservation method, designed for a service provider to notify a user(s) of a service of a store within easy reach of the user, a service reservation information, a service start/end time, and a time to be taken for the service in real time, or to suggest or propose an alternative event substituting for that service in a time zone convenient to the user.

For this purpose, in accordance with an aspect of the present invention, there is provided a reservation server comprising a retaining section (means) for retaining store/ facility information including a reservation-needed service requiring reservation and a reservation information of the reservation-needed service, an alternative event information outputting section for outputting alternative event information on an event substituting for the reservation-needed service, a receiving section for receiving a desired service or desired event which a user desires, and is transmitted from a user terminal, a reservation managing section for selectively reading out the store/facility information retained in the retaining section and the alternative event information outputted from the alternative event information outputting section on the basis of the desired service or desired event received in the receiving section, and a transmitting section for transmitting, to the user terminal, at least one of the store/facility information and alternative event information read out in the reservation managing section.

Accordingly, this can inform a user within a predetermined range of a store situation in real time by transmitting reservation circumstances to a user terminal, thus promoting an increase of customers.

Furthermore, in accordance with another aspect of the present invention, there is provided a reservation server comprising a retaining section for retaining store/facility information including a reservation-needed service and a reservation information on the number of seats of the reservation-needed service by way of a user window or remote access means, an alternative event information outputting section for outputting alternative event information including an event substituting for the reservation-needed service and a start/end time of the event, a receiving section for receiving a desired service or desired event which is desired by a user, and is transmitted from a user terminal, a reservation managing section for selectively reading out the store/facility information retained in the retaining section and the alternative event information outputted from the alternative event information outputting section on the basis of the desired service or desired event received in the receiving section, and a transmitting section for transmitting, to the user terminal, at least one of the store/facility information and alternative event information read out in the reservation managing section.

Accordingly, this permits access to an other reservation server after reservation to inform a user of an other reservation information or a reservation information on a nearby store, thus transmitting a reservation information within currently easy access of the user to the user in an appropriate timing.

In addition, it is also appropriate that the reservation server further comprises a waiting time calculating section for calculating, as a waiting time, a difference between the start time included in the alternative event information selected by the reservation managing section or the reservation-needed service start time included in the store/facility information selected by the reservation managing section and the present time, and for outputting the calculated waiting time. In this case, reservation server can select and give only practicable information so that user can reserve. So, a store having the reservation server can recommend the use of its own other services or introduce another store with respect to a time a user spends after the completion of reservation other than reservation waiting time of that store, collecting introduction charges or advertisement charges from other stores.

Still additionally, it is also appropriate that the reservation server further comprises an end time calculating section for calculating and outputting, as an end time, the sum of a performance time, to be taken for the event included in the alternative event information selected by the reservation managing section, or the performance time, to be taken for a reservation-needed service included in the store/facility information selected by the reservation managing section, and the present time. In this case, a variety of services becomes possible, and the user can make certain reservations on these services.

Moreover, it is also appropriate that the reservation server further comprises an other reservation information notifying section for outputting, to the transmitting section, a reservation information on a reservation-needed event among the alternative event information outputted from the alternative event information outputting section. In this case, the other reservation information notifying section can be made to output practicable information among the alternative event information as performing event information to the transmitting section, to output performing event information on the basis of a user traveling time, a user's waiting time (time that a user waits) at an other store and an event performance time in the other store, or to extract a longest event taking a maximum performance time from events included in the alternative event information on the basis of an event end time obtained by adding a waiting time to a performance time to be taken for each of the events for putting the extracted longest event in performing event information and outputting the longest event included performing event information. This can transmit a service or event performance time even in the case of offering, to the user, a service which defies the determination of a definite time.

Still moreover, it is also appropriate that the alternative event information outputting section is constructed as an event information retaining section to retain and output the alternative event information according to time zone, and the other reservation information notifying section is constructed as an event notifying section to extract the performing event information from the alternative event information outputted from the event information retaining section on the basis of the present time for outputting the extracted performing event information to the transmitting section. Thus, a user can receive a service in a time zone convenient to the user.

Furthermore, it is also appropriate that the alternative event information outputting section is constructed as an other reservation server interface section to output, as the alternative event information, other reservation server alternative event information retained in an other reservation server connected through a server network, and the other reservation information notifying section is made to extract practicable other reservation server alternative event information satisfying a predetermined condition from the other reservation server alternative event information outputted from the other reservation server interface section for outputting the extracted practicable other reservation server alternative event information to the transmitting section. In this case, the reservation server can offer diverse service to the user.

Still furthermore, it is also appropriate that the reservation server further comprises a reservation mediating section for transmitting a reservation request from a user, received in the receiving section, through the other reservation server interface section to the other reservation server. In this case, it is possible to avoid the drain of services to be introduced.

In addition, it is also appropriate that a utilization situation retaining section is provided to retain an access log between the reservation server and the other reservation server, and is made to calculate an introduction charge on information provided by the other reservation server to the reservation server and an introduction charge on information provided by the reservation server to the other reservation server on the basis of the access log and retain both the calculated introduction charges. This allows the access log on introduction or reservation at an another store to be preserved therein, and permits the collection of the introduction charges corresponding to the access frequency such as the number or introductions or the number of reservation mediations done by the reservation server.

Moreover, it is also appropriate that a discount/value-added information generating section is provided to generate discount information or value-added information on the alternative event information outputted from the alternative event information outputting section and to output the discount information or the value-added information to the transmitting section. Thus, by transmitting a coupon ticket of an another store to a user terminal at introduction or reservation mediation, it is possible to strongly recommend the use of a service introduced.

In addition, in accordance with a further aspect of the present invention, there is provided a reservation server comprising a retaining section for retaining store/facility information including a reservation-needed service and a reservation information on the reservation-needed service, a handling table for retaining handling scheme data on handling by a store or facility according to reservation information of the store/facility information, and a store handling selecting section for selecting desired handling scheme data among the handling scheme data retained in the handling table on the basis of the reservation information retained in the retaining section to notify an other store or facility of the selected handling scheme data.

In this case, it is also appropriate that the store handling selecting section is made to read out and output the handling scheme data from the handling table on the basis of, of the reservation information, a rate of change representative of variation in the number of reservations for a predetermined period of time.

Accordingly, it is possible to monitor the user reservation situation in a reservation system at all times, and hence to suggest the handling scheme to be conducted by the store according to the present situation, thus enabling a store to gain larger profit and permitting the offer of a service which a user desires.

Furthermore, in accordance with a further aspect of the present invention, there is provided a user terminal comprising a receiving section for receiving at least one of store/facility information and alternative event information retained in a reservation server, a displaying section for displaying the store/facility information or alternative event information received in the receiving section, a selecting section for selecting a desired service or desired event which a user desires, of the store/facility information or alternative event information displayed on the displaying section, and a transmitting section for transmitting the desired service or desired event selected in the selecting section to the reservation server.

Accordingly, in a case in which a reservation at the store itself requires a waiting time, a user can receive only information practicable by the user within the waiting time, while a store with a reservation server can recommend the employment of its own other services, or introduce other stores to get introduction charges or advertisement charges from the other stores.

In addition, it is also appropriate that the user terminal further comprises a discount/value-added information retaining section for retaining discount information or value-added information transmitted from the reservation server and received in the receiving section. In this case, a user can show the displaying section of the user terminal to a clerk in, for example, a store or facility for receiving a service written on the discount ticket or the coupon ticket.

Furthermore, in accordance with a further aspect of the present invention, there is provided a reservation system comprising a user terminal for transmitting and receiving data and a reservation server connected through a radio network to the user terminal for outputting at least one of store/facility information and alternative event information to the user terminal, the reservation server including a retaining section for retaining the store/facility information, an alternative event information outputting section for outputting the alternative event information, a first receiving section for receiving a desired service or desired event which is desired by a user, and is transmitted from the user terminal, a reservation managing section for selectively reading out the store/facility information retained in the retaining section and the alternative event information outputted from the alternative event information outputting section on the basis of the desired service or desired event received in the first receiving section, and a first transmitting section for transmitting, to the user terminal, at least one of the store/facility information and alternative event information read out by the reservation managing section, while the user terminal including a second receiving section for receiving at least one of the store/facility information and alternative event information transmitted from the first transmitting section of the reservation server, a displaying section for displaying the store/facility information or the alternative event information received in the second receiving section, a selecting section for selecting the desired service or desired event that the user desires, of the store/facility information or alternative event information displayed on the displaying section, and a second transmitting section for transmitting, to the reservation server, the desired service or desired event selected by the selecting section.

Accordingly, a user can make reservation at an another store from the first position without moving to a communicable (communication-feasible or communicatable) range of a reservation server of the another store. In addition, the reservation-permissible range is enlarged to be larger than a communicable range of a radio network of the reservation server.

Furthermore, in accordance with a further aspect of the present invention, there is provided a reservation method comprising a first transmitting step in which a reservation server transmits, to a user terminal, at least one of store/facility information and alternative event information, a reserving step in which the user terminal transmits, to the reservation server, a desired service or desired event which a user desires, of the store/facility information or alternative event information transmitted in the first transmitting step, a selecting step in which the reservation server selects at least one of the store/facility information and alternative event information on the event substituting for the reservation-needed service on the basis of the desired service or desired event transmitted in the reserving step, and a second transmitting step in which the reservation server transmits, to the user terminal, the store/facility information or alternative event information selected by the selecting step.

Accordingly, it is possible to effectively issue a notification to a user, for example, by introducing a service to be done within a limited time instead of a store.

In this case, it is also appropriate that the first transmitting step includes an other reservation server access step in which the reservation server gains access to other reservation server alternative event information retained in at least other reservation server which is connected through a server network to the reservation server, a performing event information extracting step in which the reservation server extracts, from the other reservation server alternative event information accessed in the other reservation server access step, performing event information practicable within a user's waiting time to be taken until a desired service starts, and a performing event information transmitting step in which the reservation server transmits, to the user terminal, the performing event information extracted in the performing event information extracting step. Thus, through introduction and reservation mediation, the user can make reservation at an other store from the initial position without moving to a communicable range of a reservation server of the other store. Moreover, the reservation-permissible range of the reservation server becomes larger than the communicable range of a radio network of the reservation server.

In addition, it is also appropriate that the selecting step includes an other reservation server access step in which the reservation server gains access to other reservation server store/facility information or other reservation server alternative event information retained in an other reservation server connected through a server network to the reservation server, a waiting time calculating step in which the reservation server calculates a user's waiting time, to be taken until a desired service or a desired event starts, on the basis of the other reservation server store/facility information or other reservation server alternative event information accessed in the other reservation server access step, and an extracting step in which the reservation server extracts, from the desired service or desired event, a service or event practicable within the waiting time calculated in the waiting time calculating step. Accordingly, a service provider can notify a user of a reservation situation or a time-limited service at an appropriate timing.

Furthermore, in accordance with a further aspect of the present invention, there is provided a reservation method comprising a reserving step in which a user terminal makes reservation for a reservation-needed service to a reservation server connected through a radio network to the user terminal, a threshold detecting step in which the reservation server detects the fact that a rate of change of the number of reservations for the reservation-needed service reserved in the reserving step is equal to or more than a first threshold value, or is equal to or less than a second threshold value, a supernumerary dispatch staff retrieving step in which the reservation server has access to at least an other reservation server which is connected through a server network to make retrieval on supernumerary store/facility having supernumerary when the threshold detecting step detects that the rate of change thereof is equal to or more than the first threshold value, and the reservation server has access to the other reservation server to make retrieval on a dispatch requiring store/facility requiring dispatched staff when the threshold detecting step detects that the rage of change thereof is equal to or less than the second threshold value, and a requesting/supporting step in which the reservation server issues a request for dispatch to the supernumerary store/facility retrieved in the supernumerary dispatch staff retrieving step or offers support to the dispatch requiring store/facility retrieved in the supernumerary dispatch staff retrieving step.

Accordingly, a user can be notified of a service of a store existing in a communicable range in real time, and can obtain the latest service information.

Still furthermore, in accordance with a further aspect of the present invention, there is provided a reservation method comprising a communication-feasible user terminal retrieving step in which a reservation server retrieves a communication-feasible user terminal from user terminals connected to a server network to the reservation server, a third transmitting step in which the reservation server transmits store/facility information including a reservation-needed service and a reservation situation of the reservation-needed service to the communication-feasible user terminal retrieved in the communication-feasible user terminal retrieving step, and a fourth transmitting step in which the communication-feasible user terminal transmits a desired service which a user desires, among reservation-needed services included in the store/facility information transmitted in the third transmitting step, to the reservation server.

This enables advertisement of service contents and reservation situations at a proper timing, and reservation situations on stores/facilities the user can visit directly appear on the user terminal.

Furthermore, in accordance with a further aspect of the present invention, there is provided a reservation method comprising an inquiring step in which a user terminal inquires of a reservation server connected through a server network to the user terminal whether or not it is possible for a user to receive a desired service which the user desires, a reference step in which the reservation server refers to at least one of store/facility information including a reservation-needed service and a reservation situation of the reservation-needed service and alternative event information on an event substituting for the reservation-needed service with respect to the desired service on the inquiry in the inquiring step, and a store/facility information transmitting step in which the reservation server transmits details of the desired service to the user terminal when it is possible for the user to receive the desired service as a result of the reference in the reference step, and transmits alternative store/facility information or alternative event information to the user terminal when it is impossible for the user to receive the desired service.

With this method, a user can initiatively select and receive a service.

BRIEF DESCRIPTION OF THE DRAWINGS

FIG. 18 is a block diagram showing a reservation server according to a second embodiment of the invention;

FIG. 19(a) is an illustration for explaining a timetable according to the second embodiment of the invention;

FIG. 19(b) is an illustration for explaining performing event information according to the second embodiment of the invention;

FIGS. 42(a) and 42(b) are illustrations of examples of display to be made for when all seats are occupied, according to the fifth embodiment of the invention;

FIG. 43(a) is an illustration for describing suggestion time according to the fifth embodiment of the invention;

FIG. 43(b) is an illustration of a timetable of a facility according to the fifth embodiment of the invention;

DESCRIPTION OF THE PREFERRED EMBODIMENTS

Embodiments of the present invention will be described hereinbelow with reference to the drawings.

(A) Description of First Embodiment of the Invention

Figure 1:
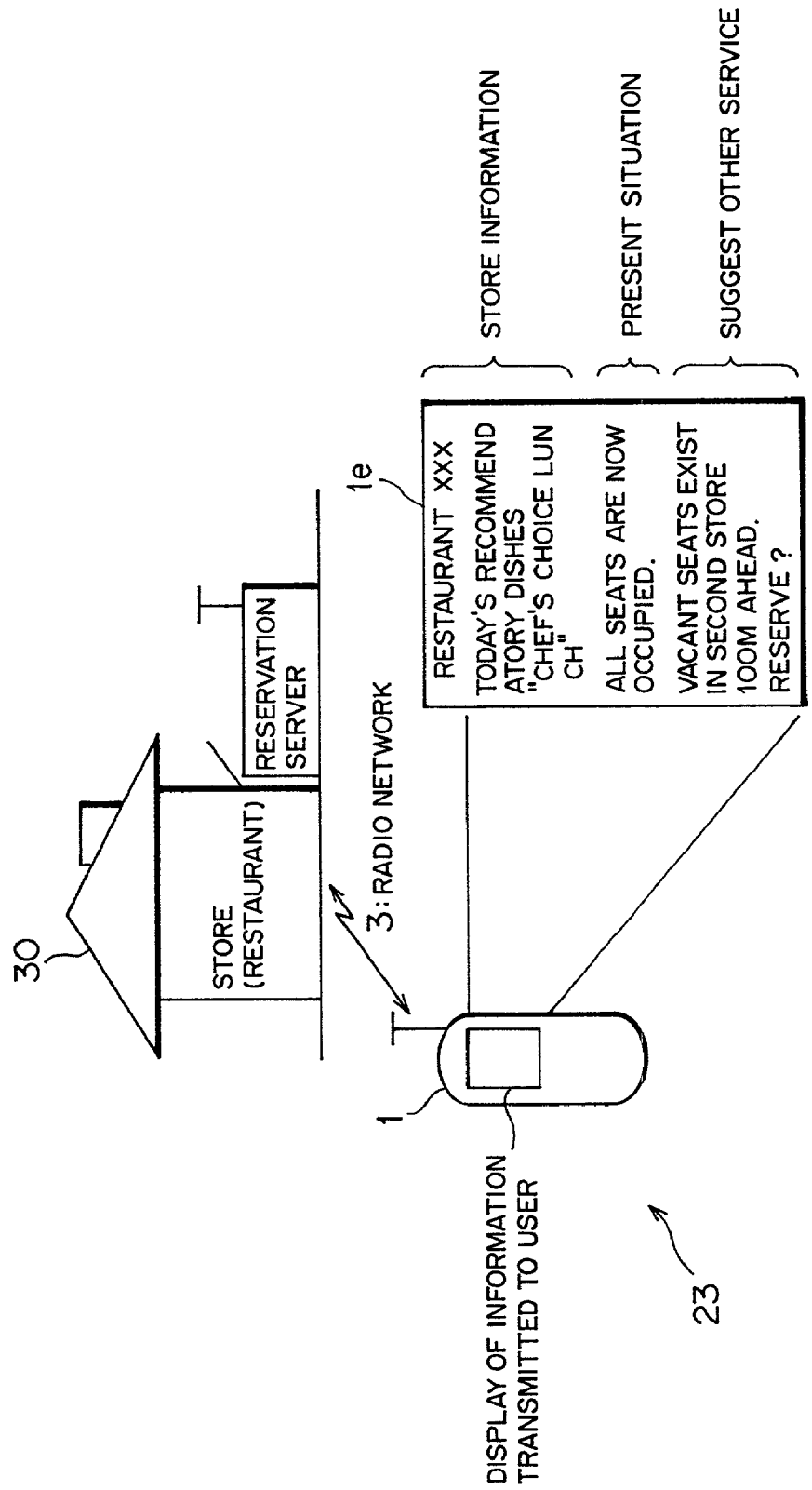
FIG. 1 is an illustration of a configuration of a reservation system which is to employ the present invention.

FIG. 1 is an illustration of a configuration of a reservation system which is to employ the present invention. In FIG. 1, a reservation system 23 is for making reservation at a store/facility, and is equipped with a user terminal 1, a reservation server 2 and a restaurant 30 as one example of a store/facility. This store/facility is a store or facility having a window, and in addition to the restaurant 30, signifies a store such as an eating and drinking house, a movie theater, a theater, a recreation ground or a bank, or a facility such as a city hall, a transportation facility, a public institution, a hospital or a drugstore in a hospital.

The services (reservation-needed services) of these stores/facilities include, in addition to services in which the restaurant 30 or an eating and drinking house serves lunches, coffee or the like, services of a movie theater or a theater showing users movies or plays, services of a recreation ground permitting users to utilize attractions, deposit services a bank presents, services of a city hall issuing resident cards to users, services of a transportation facility transporting a person or thing by using a passenger car, services of a public institution accepting a tax return, services of a hospital examining patients, services of a drugstore making up a prescription for patients, or other services.

In addition, the services (reservation-needed services) cover the contents thereof. That is, the reservation-needed services include dish information such as dish menus, dish prices, the presence or absence of recommendatory dishes and low-priced dish menus of the day, and opening and closing times of the restaurant 30. Also with respect to a movie theater or a theater, the services include information such as titles of movies, titles of plays, and start and end times. Still additionally, the services include description of attractions, description of deposit merchandise, acceptance period, information on time and charge, information on income tax return period, specialist classification such as internal medicine department and surgery department, names of medicines, and other information.

Moreover, the reservation signifies, for each service, securement of a seat in the restaurant 30 or an eating and drinking house at a specified date, securement of a seat in a movie theater or a theater, securement of an attraction ticket in a recreation ground, a numbered ticket for a deposit service, a numbered ticket for issue of a resident card, securement of a seat in a railroad train or an airplane, tax payment acceptance, a numbered ticket for medical examination or reception of medicines, and others. That is, in the following description, the reservation covers behaviors which cause the issue of numbered tickets and the occurrence of waiting queues.

Still moreover, the number of vacant seats, the degree of jam (jamming state of a store) or the presence or absence of a seat in each service will sometimes be referred to hereinafter as a "reservation situation". Each service and the reservation situation thereof are interchanged as store/facility information (sometimes, which will hereinafter be referred to simply as a "store information") between a user and a store through the user terminal 1 and the reservation server 2.

These meanings will be used in the same way in each modification of the first embodiment and second to fifth embodiments which will be described later, unless otherwise specified particularly.

In FIG. 1, the reservation system 23 accepts reservation from users, and offers alternative event information to the users when the reservation comes to an end. That is, when the reservation server 2 cannot provide a service which a user desires, the alternative event information of the service information retained in the reservation server 2 is suggested to the user.

This alternative event information is on an event (alternative event) substituting for a reservation-needed service, and includes the event substituting for the reservation-needed service and the start and end times of that event. This alternative event signifies a service in which a user enjoys a movie, a service in which a user utilizes attraction in a recreation ground, a service in which the restaurant 30 or a coffee shop serves a lunch, coffee or the like, use of a karaoke (sing-along music) box (a kind of karaoke bar), bowling in a bowling alley, a discount service in a supermarket, and others. Therefore, the alternative event and the reservation-needed service sometimes represent the same event or service.

In addition, the alternative event information includes, in addition to the event substituting for the reservation-needed service, the contents of that event. That is, it covers a title of a movie, a description of an attraction, dish information such as dish menus, dish prices, recommendatory dishes of the day and the presence or absence of low-priced dish menus in the restaurant 30 or a coffee shop, time zone discount information on a karaoke box, a time service on the day, and others.

The description of the first embodiment will be made principally in the case of taking the restaurant 30 as an example. In each modification of the first embodiment and other embodiments which will be described later, a movie theater, a railroad and others will be taken as examples.

In FIG. 1, the restaurant 30 is a service providing store, and store information (a reservation-needed service such as dish information, opening/closing time and the presence or absence of a discount dish, and a reservation situation of this reservation-needed service) is transmitted through the reservation server 2 to the user terminal 1.

In this case, the user terminal 1 is equipped with a displaying section (means) 1e, and for example, is a portable telephone made to transmit and receive data. Thus, a user can interchange of information with the restaurant 30 through the reservation server 2.

The reservation server 2 is connected through a radio network 3 to the user terminal 1, and is made to output, to the user terminal 1, store/facility information including a reservation-needed service requiring a reservation and a reservation situation (state) of the reservation-needed service or alternative event information on an event substituting for the reservation-needed service. This feature is realized by a personal computer or a workstation and a radio transmitter/receiver.

In addition, in order to make reservation at the restaurant 30, the reservation server 2 is located in the vicinity of the restaurant 30, and is designed to establish mutual interchange of data with the user terminal 1. Still additionally, the reservation server 2 is made to transmit, to the user terminal 1, the start/end time of an alternative event or alternative service substituting for a reservation-needed service.

The radio network 3 is a network for making transmission/reception of data between the user terminal 1 and the reservation server 2. Moreover, the user terminal 1 and the reservation server 2 mutually transmit and receive digitized store information through the radio network 3 and reservation data from a user, and the reservation server 2 can accept reservation from the user. This radio network 3 will be described later with reference to FIGS. 5 to 13.

Secondly, referring to FIG. 2, a description will be given hereinbelow of the reservation server 2.

Figure 2:
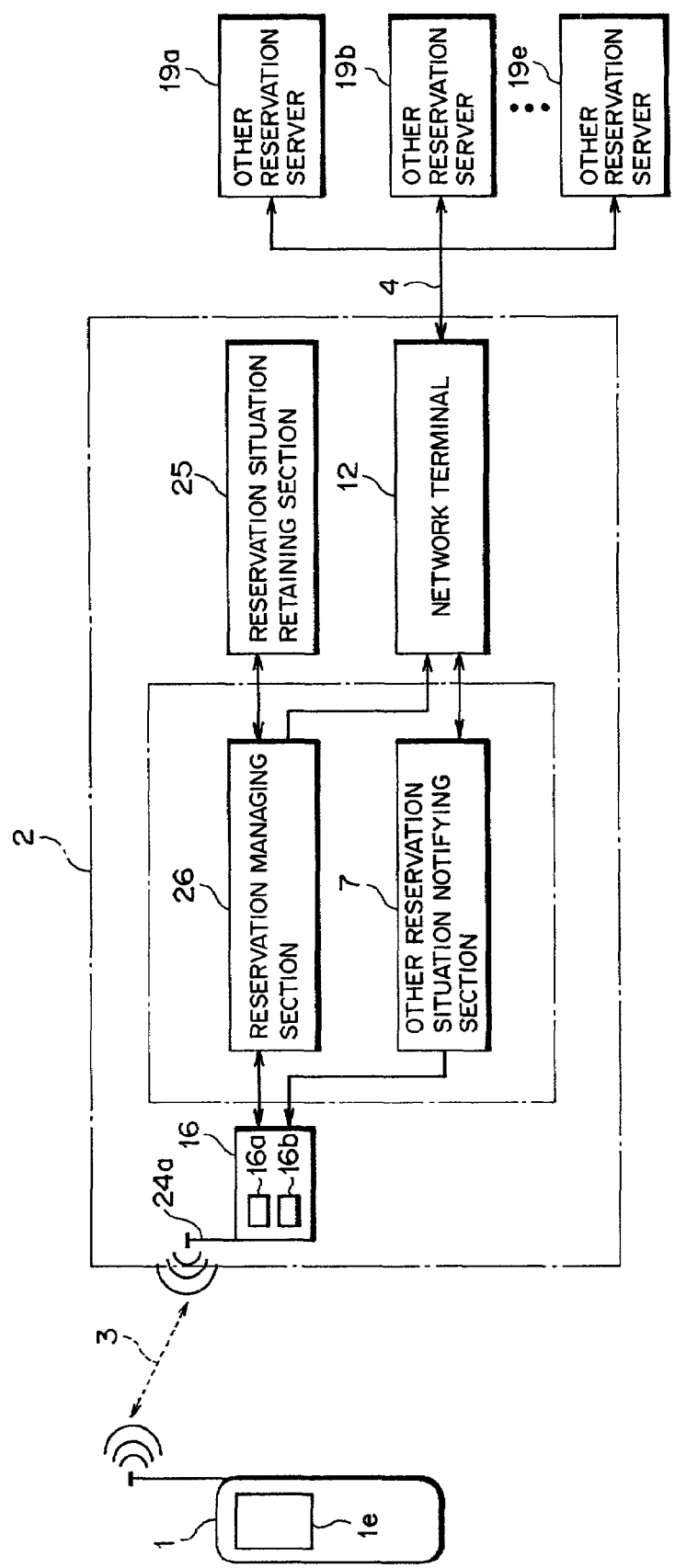
FIG. 2 is a block diagram showing a reservation server according to a first embodiment of the invention.

FIG. 2 is a block diagram showing the reservation server 2 according to the first embodiment of the present invention. In FIG. 2, the reservation server 2 is equipped with a radio transmitter/receiver 16, a reservation situation retaining section (retaining section) 25, an alternative event information outputting section (network terminal; hereinafter also referred to simply as an "NT") 12, a reservation managing section 26 and an other reservation situation notifying section 7. In addition, the reservation server 2 is connected to a server network 4 to make radio communications with the user terminal 1, and further to establish interchange of data with reference to other reservation servers (each of which will be referred to hereinafter also as a "other reservation server") 19a to 19e.

The radio transmitter/receiver 16 is for transmitting/receiving radio data to/from the user terminal 1, and includes an antenna 24a, a receiving section (first receiving section) 16a and a transmitting section (first transmitting section) 16b. The antenna 24a is for transmitting/receiving radio signals, and the receiving section 16a is for receiving a desired service or desired event which is desired by a user, and is transmitted from the user terminal 1, and further the transmitting section 16b is for transmitting, to the user terminal 1, store/facility information or alternative event information read out by the reservation managing section 26. These receiving section 16a and transmitting section 16b are equipped with a radio demodulating circuit and a radio modulating circuit (both not shown), respectively.

The reservation situation retaining section 25 is for retaining store/facility information, that is, for preserving store/facility information including a reservation-needed service requiring a reservation and a reservation situation on the number of seats in the reservation-needed service by way of a window (user window) or a telephone or Internet (remote access means) This feature is realized by a hard disk.

The alternative event information outputting section 12 is for outputting alternative event information on an event substituting for the reservation-needed service, that is, for issuing alternative event information including an event replacing the reservation-needed service and a start/end time of the event.

Moreover, the alternative event information outputting section 12 is also constructed as an other reservation server interface section to output, as the alternative event information, other reservation server alternative event information retained in the other (different) reservation servers 19a to 19e connected through the server network 4 thereto. This alternative event information outputting section 12 is designed to output the alternative event information to the reservation managing section 26 and the other reservation situation notifying section 7, and further to output, to the other reservation servers 19a to 19e, information such as a desired event or desired event received in the receiving section 16a through the reservation managing section 26, which will be described later, and the server network 4.

Still moreover, the alternative event information outputting section 12 is made to output, to the reservation managing section 26 and the other reservation situation notifying section 7, the alternative event information (or, including a reservation-needed event) transmitted from the other reservation servers 19a to 19e through the server network 4.

That is, the reservation server 2 is provided with the reservation situation retaining section 25 and the network terminal 12 to transmit both its own information and information retained in the other reservation servers 19a to 19e to the user terminal 1.

Incidentally, in a third embodiment, which is to be described herein later, the function of this alternative event information outputting section 12 is realized in a retaining section of the reservation server 2 itself, which will be described later in detail.

The reservation managing section 26 is for selectively reading out store/facility information retained in the reservation situation retaining section 25 and alternative event information outputted from the alternative event information outputting section 12 on the basis of a desired service or desired event received in the receiving section 16a. In addition, the reservation managing section 26 is made to write, in the reservation situation retaining section 25, information such as a desired service or desired event obtained by the demodulation in the receiving section 16a, and further to output that information to the network terminal 12.

The server network 4 is a network for establishing connection between the reservation server 2 and the other reservation servers 19a to 19e, and is realized with wired or radio lines.

Each of the other reservation servers 19a to 19e is similar to the reservation server 2 so that the reservation server 2 gains access to the other reservation servers 19a to 19e to obtain, in addition to its own reservation situation, the reservation situations preserved in the other reservation servers 19a to 19e.

The other reservation situation notifying section 7 is for outputting, among the alternative event information, a reservation situation on a reservation-needed event requiring reservation to the transmitting section 16b.

That is, the other reservation situation notifying section 7 is made to extract practicable other reservation server alternative event information, the other reservation server alternative event information, satisfying a condition, such as on a user's schedule or a user's location, from the other reservation server alternative event information outputted from the other reservation server interface section (network terminal 12), and to output it to the transmitting section 16b.

Accordingly, a radio signal transmitted from the user terminal 1 is received by the receiving section 16a through the antenna 24a, and is demodulated to output information such as a desired service or desired event the user wants, and in the reservation managing section 26, this information is written into the reservation situation retaining section 25 and is outputted to the network terminal 12. In addition, in the network terminal 12, the information, such as the desired service or desired event from the demodulation, is outputted to the server network 4 to be transmitted to the other reservation servers 19a to 19e.

On the other hand, the store information retained in the reservation situation retaining section 25 and the alternative event information (or, including a reservation-needed event) outputted from the network terminal 12 are selectively read out in the reservation managing section 26 on the basis of the desired service or desired event received in the receiving section 16a, and of the alternative event information outputted from the network terminal 12, the reservation-needed event reservation situation is outputted to the transmitting section 16b.

Thus, the reservation server 2 repeats the alternative event information transmitted from the other reservation servers 19a to 19e to the user terminal 1, and further transmits the desired service or desired event sent from the user terminal 1 to the other reservation servers 19a to 19e.

In this way, the reservation server 2 can notify the user terminal 1 of the reservation situations in the reservation situation retaining section 25 and in the other reservation servers 19a to 19e, and can accept a user reservation from the user terminal 1. Therefore, the reservation server 2 can recommend a variety of services to the user.

Furthermore, referring to FIG. 3, a description will be given hereinbelow of the other (different) reservation servers 19a to 19e.

Figure 3:
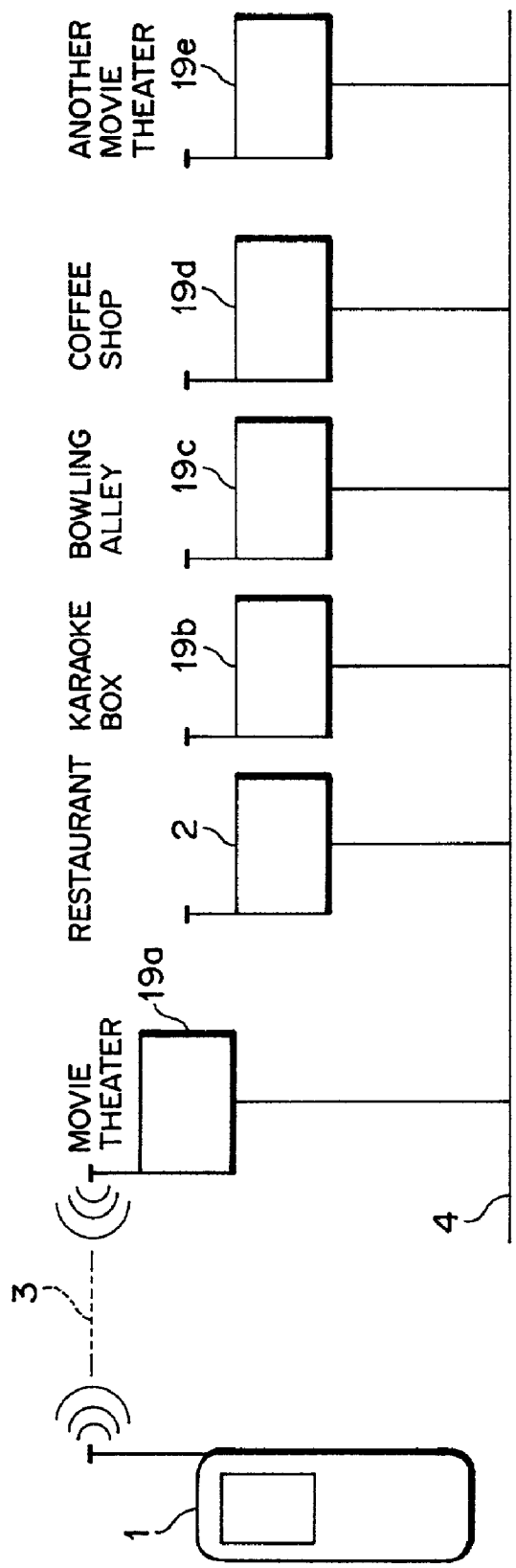
FIG. 3 is an illustration of a configuration of a server network according to the first embodiment of the invention.

FIG. 3 is an illustration of a configuration of the server network 4 according to the first embodiment of the present invention. In FIG. 3, in addition to the reservation server 2 for the restaurant 30, the other reservation servers 19a to 19e are connected to the server network 4. In this case, the other reservation servers 19a, 19b, 19c, 19d and 19e are for a movie theater, a karaoke box, a bowling alley, a coffee shop and another movie theater, respectively. These other reservation servers 19a to 19e retain store/facility information and alternative event information.

Thus, the reservation servers 2 and 19a to 19e can mutually know the reservation situations of each other. When a user has access to the reservation server 19a but fail to make reservation for a desired movie ticket because all seats are occupied, the reservation server 19a can have access to the reservation server 19e to mediate a ticket reservation.

In addition, in a reservation method between the user terminal 1 and the reservation server 2 according to the present invention, the reservation server 2 first transmits store/facility information or alternative event information to the user terminal 1 connected through the radio network 3 thereto (first transmitting step).

Subsequently, the user terminal 1 transmits, to the reservation server 2, a desired service or desired event which a user desires, among the store/facility information or the alternative event information transmitted in the first transmitting step (reserving step).

Then, the reservation server 2 selects store/facility information and alternative event information on an event substituting for a reservation-needed service on the basis of the desired service or desired event transmitted in the reserving step (selecting step).

Following this, the reservation server transmits the store/facility information or alternative event information selected in the selecting step to the user terminal 1 (second transmitting step).

Thus, since the present situation or state of the restaurant 30 is notified to the user, a customer collection is improvable.

Furthermore, when transmitting the store/facility information or the alternative event information to the user terminal 1 (first transmitting step), the aforesaid reservation server 2 has access to other reservation server alternative event information retained in the other reservation servers 19a to 19e which are connected to the reservation server 2 through the server network 4 (other reservation server access step).

Then, the reservation server 2 extracts practicable performing event information among the other reservation server alternative event information, accessed in the other reservation server access step within a user's waiting time, until the desired service starts (performing event information extracting step).

Following this, the reservation server 2 transmits the performing event information extracted in the performing event extracting step to the user terminal 1 (performing event information transmitting step).

Thus, a user can find out a service of a nearby store in a communicable area (communication-feasible range) in real time, and a service provider can notify the user of a reservation situation or a time-limited service at an appropriate timing so that the user can obtain the latest information.

Incidentally, the configuration of the server network 4 shown in FIG. 3 applies to other embodiments and modifications thereof which will be described later, unless otherwise specified especially.

Furthermore, referring to FIG. 4, a description will be given hereinbelow of the user terminal 1.

Figure 4:
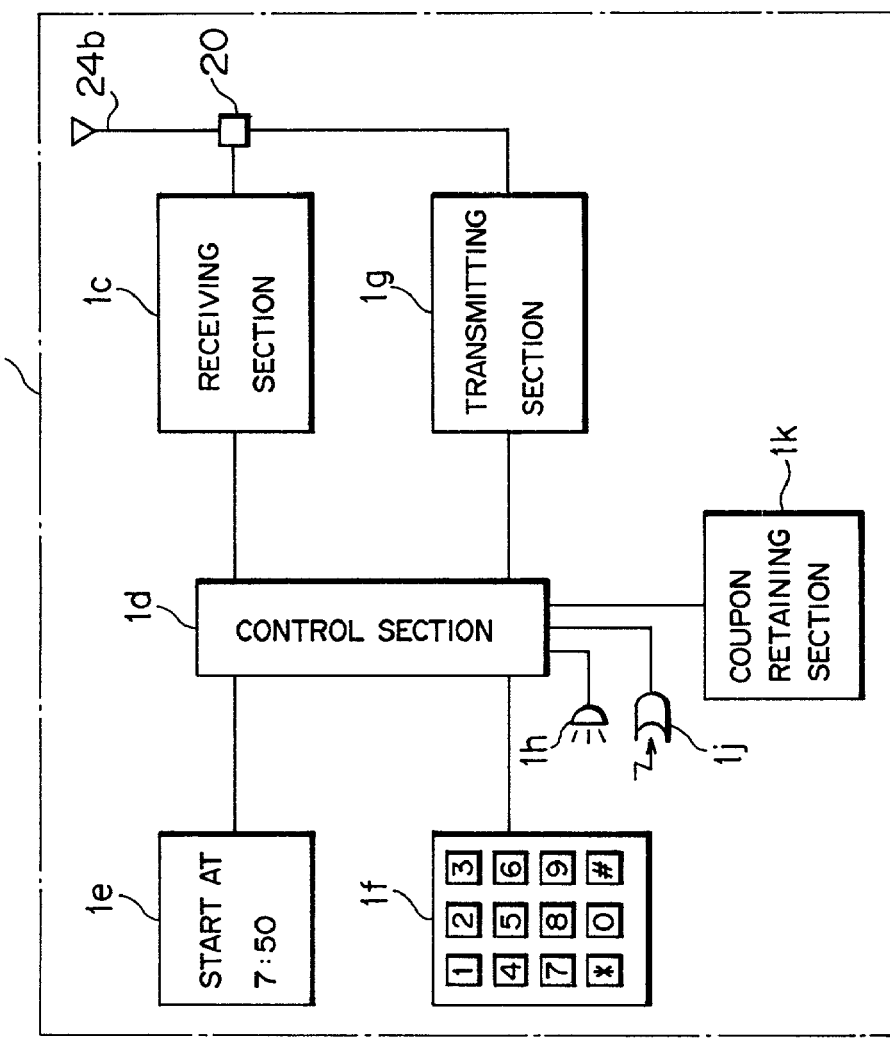
FIG. 4 is a block diagram showing a user terminal according to the first embodiment of the invention.

FIG. 4 is a block diagram showing the user terminal 1 according to the first embodiment of the present invention. In FIG. 4, the user terminal 1 is equipped with an antenna 24b, a coupler 20, a receiving section (second receiving section) 1c, a control section 1d, a speaker 1h, a microphone 1j, a selecting section 1f, a transmitting section (second transmitting section) 1g, a displaying section 1e, and a coupon retaining section 1k.

The antenna 24b is for transmitting/receiving a radio signal, and the coupler 20 is for separating a transmission signal and a receive signal. The receiving section 1c is for receiving store/facility information or alternative event information transmitted from the transmitting section 16b of the reservation server 2, and is equipped with a radio demodulating circuit. The control section 1d is for controlling the processing of a transmission/reception signal and for controlling each of the modules in the user terminal 1. The foregoing feature is realized by the cooperation of a CPU (Central Processing Unit), a ROM (Read Only Memory), a RAM (Random Access Memory) and so on.

The displaying section 1e is for displaying the store/facility information or alternative event information received in the receiving section 1c, and the function thereof is realized by a display (see FIG. 44, which will be described later). The selecting section 1f is for selecting a desired service or desired event, which a user desires, among the store/facility information or alternative event information displayed on the displaying section 1e. This function is realized by a keypad or the like. Thus, the user can select a desired service or event among the services or events displayed on the displaying section 1e.

The transmitting section 1g is for transmitting, to the reservation server 2, the desired service or desired event selected in the selecting section 1f, and is equipped with a radio modulating circuit. The speaker 1h and the microphone 1j act as an audio speaker and an audio microphone, respectively. A voice of the user is converted into an electric signal in the microphone 1j and then amplified in an amplifier (not shown) and subsequently modulated in the transmitting section 1g before transmitted. On the other hand, received data is demodulated in the receiving section 1c, and converted into a voice in an audio circuit (not shown) and outputted from the speaker 1h.

A description of the coupon retaining section 1k will be given in a fifth modification of a second embodiment which will be described herein later. The configuration of the user terminal 1 shown in FIG. 4 applies to the other embodiments and each modification thereof which will be described herein later, unless otherwise specified particularly.

Accordingly, in the user terminal 1, in addition to the ordinary audio conversation, the store/facility information or alternative event information from the reservation server 2 appears on the displaying section 1e for the user, and of the store/facility information or alternative event information displayed on the displaying section 1e, a desired service or desired event is selected in the selecting section 1f and then transmitted through the transmitting section 1g.

Furthermore, in FIG. 1, the restaurant 30 transmits the store information (dish information, opening/closing time, reservation situation) to the reservation server 2, and the reservation server 2 sends the information to the user terminal 1 which is capable of communicating with the reservation server 2. In the user terminal 1, these plurality of information are displayed, and the user selects an interesting information from the plurality of information and transmits the selected information to the reservation server 2.

In addition, when all seats have been occupied, the restaurant 30 transmits a message "there are the second store 100 m ahead, where seats are available" to the user, as an alternative event information, thereby suggesting another service to the user.

Therefore, a service provider such as the owner of the restaurant 30 can collect the pedestrians in the neighborhood of the restaurant 30 as the customers and offer the store information to users through the use of the reservation server 2.

Accordingly, a user can know the reservation situation such as dish information, opening/closing time and the degree of jam of the restaurant 30 without entering the restaurant 30, and can easily secure a seat.

Furthermore, referring to FIGS. 5 to 13, a description will be given hereinbelow of the radio network 3. The radio network 3 can employ the IEEE (Institute of Electrical and Electronics Engineers) 802.11 or the Bluetooth (trademark or service name). The IEEE 802.11 is a standard for use in a radio LAN or the like, as well known.

The Bluetooth is a radio network 3 enabling communications in a range of approximately 10 m to 100 m and allowing one-to-many communication through the use of a piconet according to the specification "Bluetooth Specification V1. 0" as of Jul. 1, 2000.

Figure 5:
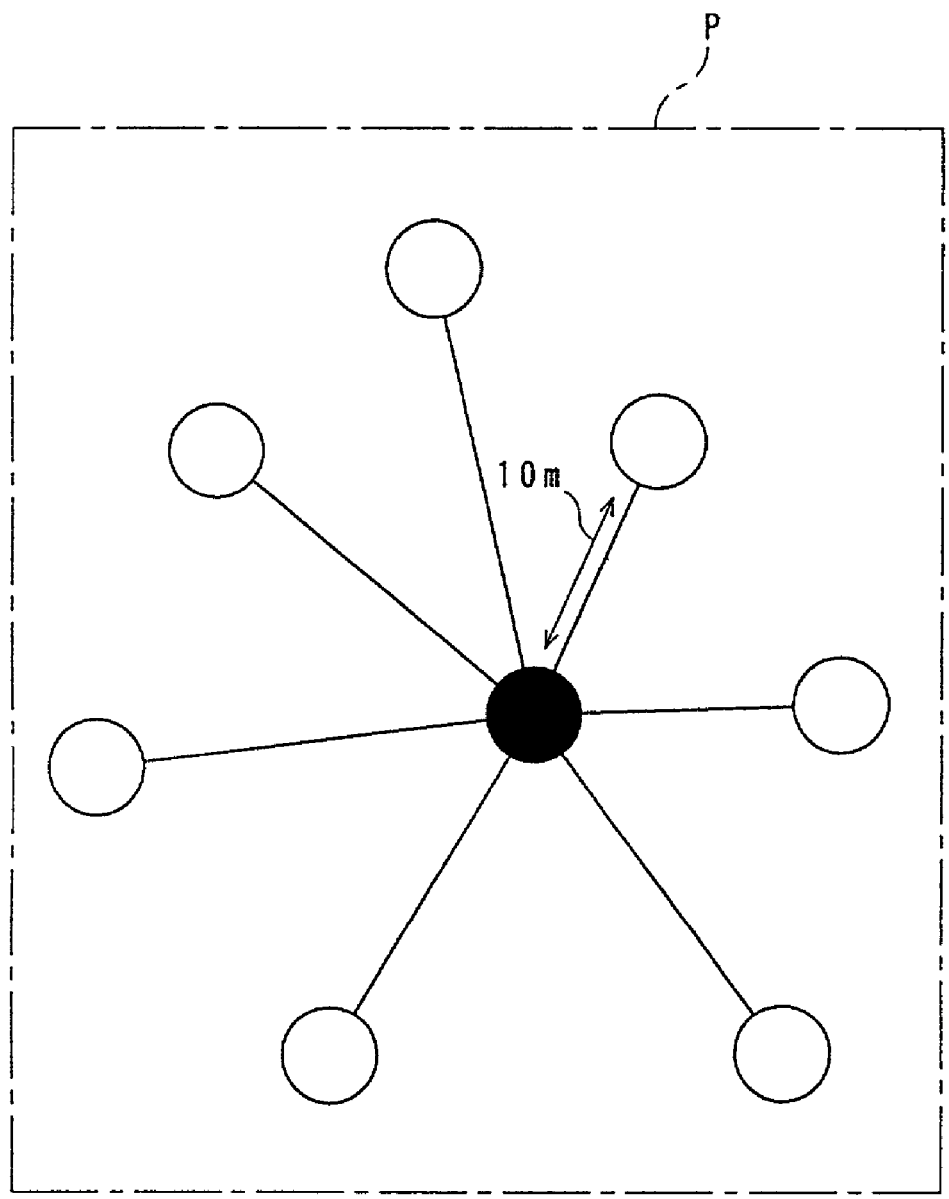
FIG. 5 is an illustration for explaining a piconet.

FIG. 5 is an illustration for explaining the piconet. In FIG. 5, the piconet P comprises one master device (represented by a black circle) and seven slave devices (represented by white circles). The Bluetooth employs the piconet P as a basic unit and is designed to make radio communications among a plurality of piconets P. Incidentally, each of the user terminal 1 and the reservation server 2 can act both as a master device (master) and a slave device (slave).

In addition, seven slaves can be connected concurrently to one master, and the reservation server 2 can simultaneously transmit information to a maximum of seven slaves through time division multiplexing. In this case, the connection between the master and the slaves does not always require the connection establishment at all times, and the connection can be made only at the transmission/receive of information or reservation of a service or event. Still additionally, the slave devices can also pertain to a plurality of other piconets P.

Furthermore, with regard to data transmission volume, the store information and the reservation data require approximately 10 kB (kilobyte), and according to the Bluetooth specification, when the transmission rate is 500 kbps (kilobit/second), the communication time of the store information is calculated as 10 kilobit/500 kbps (that is, 80 kilobyte/500 kbps), resulting in 160 ms (millisecond).

Accordingly, in a case in which a user receives information, transmitted from the reservation server 2, through the use of the user terminal 1 connected to this piconet P, if a time period of 10 seconds is needed from when the user receives the information and reads out the store information from the user terminal 1 until a reserved service starts, a master can transmit the store information sixty-two times to slaves within the user reservation waiting time (for example, 1000 milliseconds).

In addition, according to the Bluetooth, a plurality of piconets P can be connected into a scatternet. Referring to FIGS. 6 to 13, a description will be given hereinbelow of a flow of data in the case of employment of this scatternet.

Figure 6:
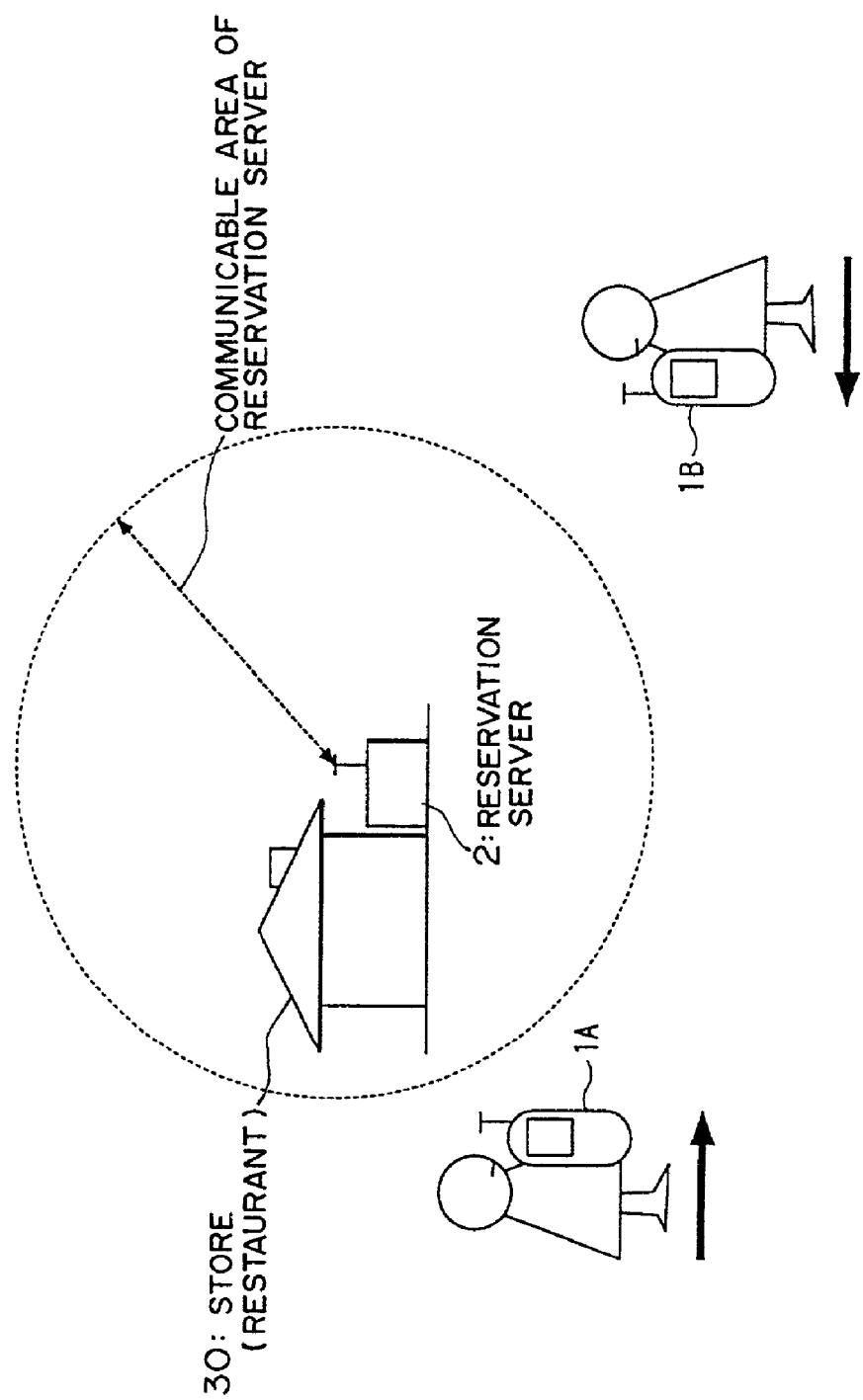
FIG. 6 is an illustration of an initial state of a network on a piconet.

FIG. 6 is an illustration of an initial state of a network on a piconet P. In FIG. 6, user terminals 1A and 1B are out of a communicable area (communication range; indicated by a circle) with respect to the reservation server 2, and in this case, the reservation server 2 does not form the piconet P.

Figure 7:
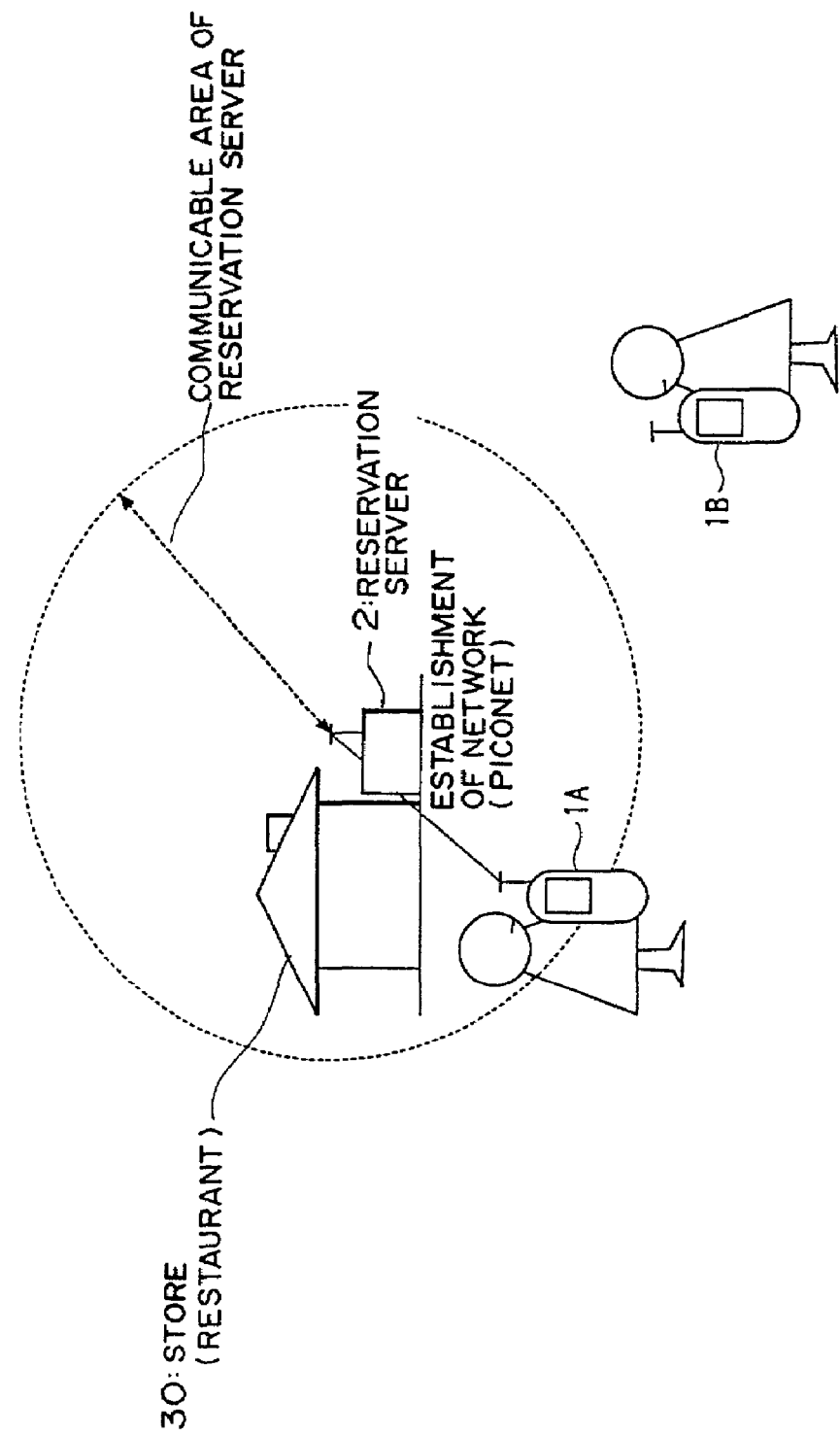
FIG. 7 is an illustration of a state of formation of a network on a piconet.

FIG. 7 is an illustration of a state of formation of a network on the piconet P, where a network is established between the user terminal 1A and the reservation server 2. In FIG. 7, since the user terminal 1A enters the communicable area of the reservation server 2, the piconet P is set up between the user terminal 1A and the reservation server 2. In this case, the reservation server 2 serves as a master while the user terminal 1A acts as a slave, and the reservation server 2 sends store/facility information to the user terminal 1A.

Figure 8:
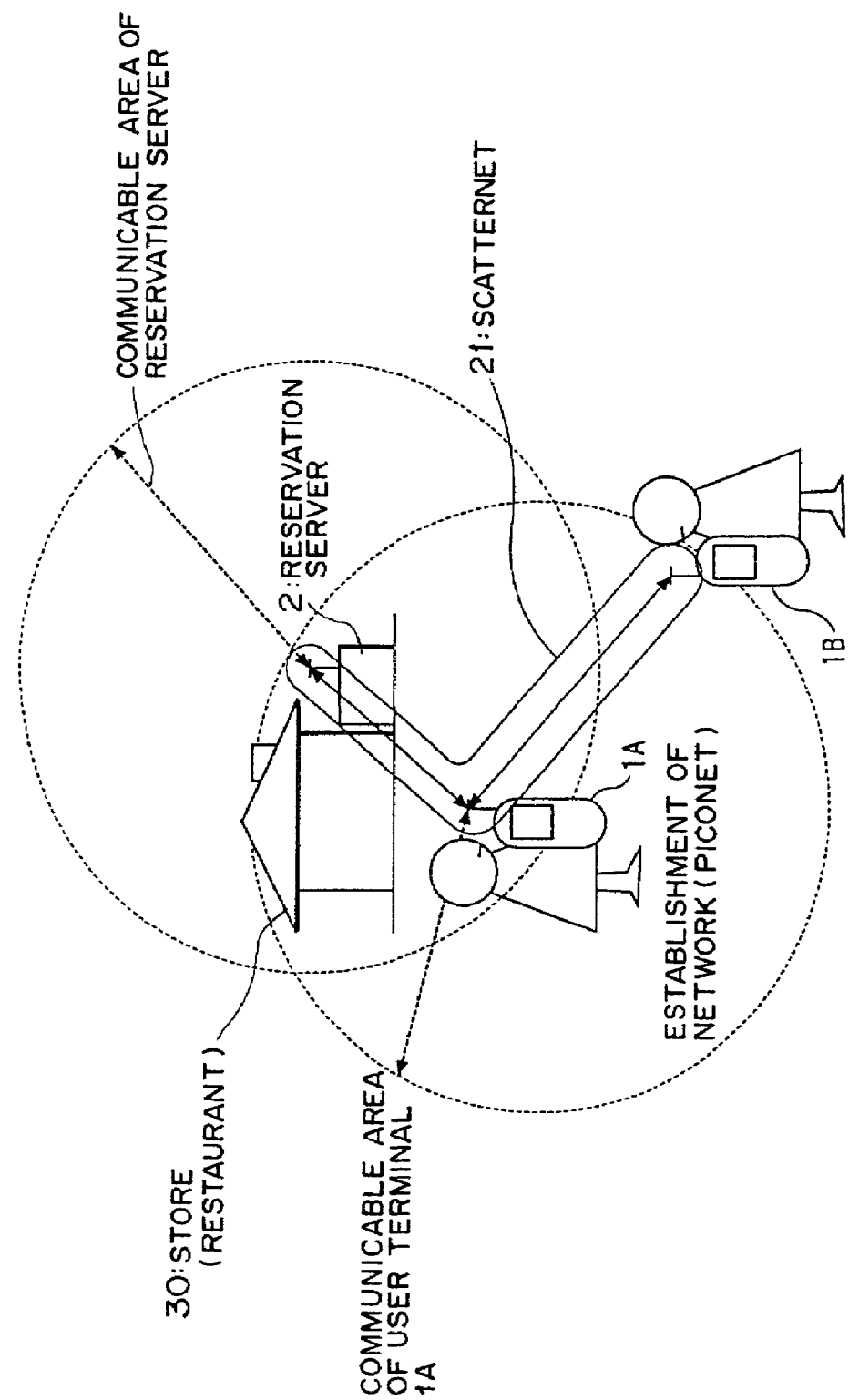
FIG. 8 is an illustration of a state of formation of a scatternet.

FIG. 8 is an illustration of a state of formation of a scatternet. In FIG. 8, the user terminal 1A is in the communicable area of the reservation server 2, but the user terminal 1B is out of the communicable area. The user terminal 1A establishes the piconet P with respect to the user terminal 1B with which the user terminal 1A can communicate, and transmits information from the reservation server 2 to the user terminal 1B. At this time, simultaneously, a scatternet 21 is set up among three units, namely the reservation server 2, the user terminal 1A and the user terminal 1B.

In this case, the user terminal 1B acts as a slave of the user terminal 1A. In addition, the user terminal 1A is not only a slave of the reservation server 2 but also a master of the user terminal 1B, with each of the user terminals 1A and 1B being made to serve as either a master or a slave.

The reservation server 2 communicates with the user terminal 1A, and the user terminal 1A establishes the piconet P with the user terminal 1B which can communicate with the user terminal 1A, thus transmitting the information of the reservation server 2.

Figure 9:
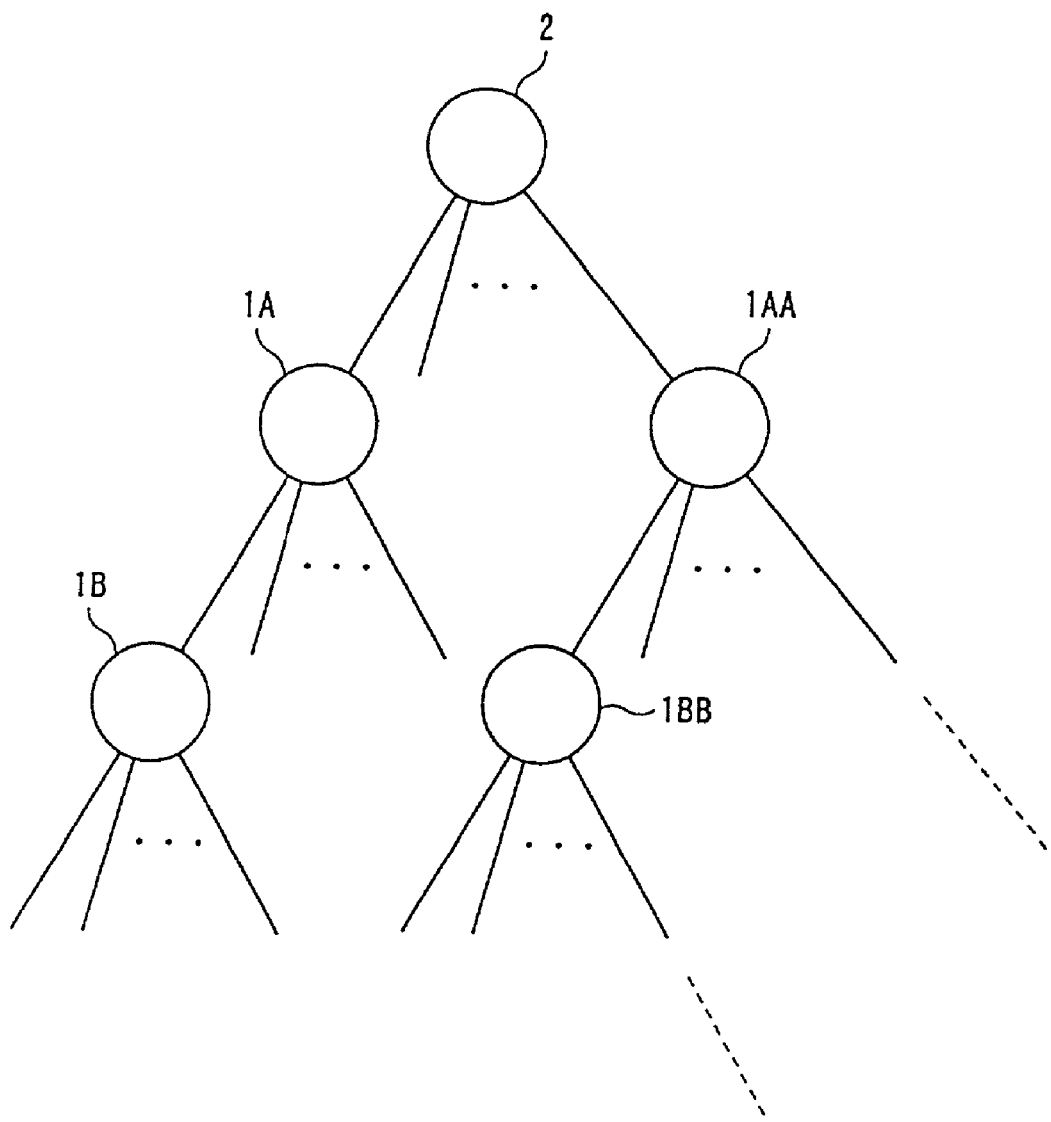
FIG. 9 is an illustration for explaining a hierarchical structure of a scatternet.

FIG. 9 is an illustration for explaining a hierarchical structure of a scatternet. In FIG. 9, a circle denoted at numeral 2 signifies the reservation server 2, while each of circles denoted at numerals 1A, 1B, 1AA and 1BB represents a user terminal which functions as a master or a slave. The reservation server 2 makes a piconet P in cooperation with the user terminals 1A and 1AA, while the user terminals 1A and 1AA make piconets P with the user terminals 1B and 1BB, respectively.

As stated above, with the Bluetooth, owing to the construction of the scatternet 21, the reservation server 2 can also communicate with the user terminals 1B and 1BB which are out of the communicable area of the reservation server 2. The scatternet 21 can be set up only when the user terminal 1A or 1AA in the adjacent hierarchy is in the communicable area.

On the other hand, since the user terminal 1A moves at all times, the scatternet 21 cannot enlarge without limitation. That is, a user who possibly receive a service from the reservation server 2 (can physically enter a store) is required to be in a limited area to some extent with respect to the reservation server 2.

Figure 10:
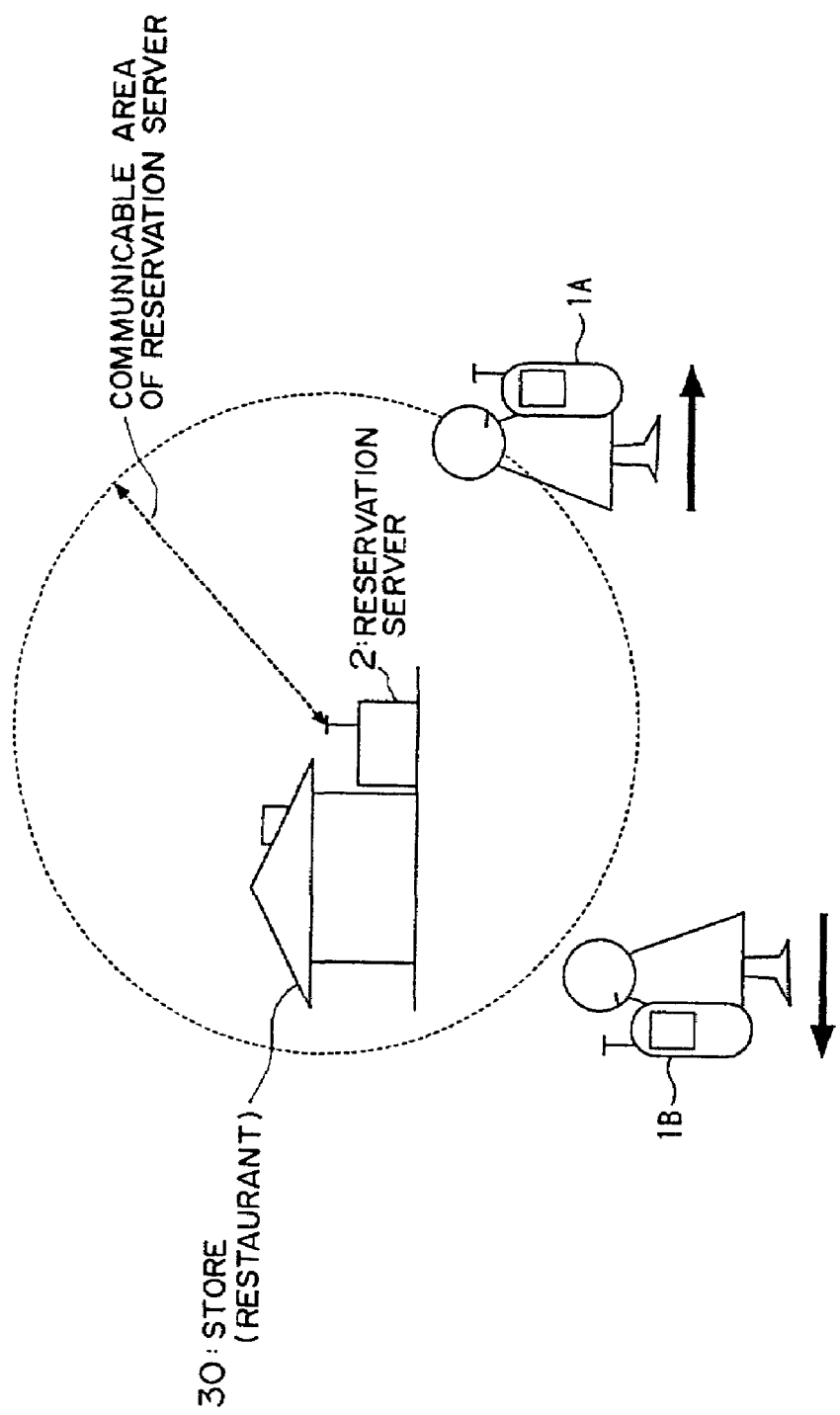
FIG. 10 is an illustration of a terminating state of a scatternet.

FIG. 10 is an illustration of a terminating state of a scatternet. In FIG. 10, if the user terminal 1A moves from the spot, where it has initially set up the piconet P with the reservation server 2, to get out of the communicable area of the reservation server 2, a user terminal which makes the piconet P in cooperation with the user terminal 1A falls into a communication-impossible condition with respect to the reservation server 2, thereby canceling the scatternet 21.

Accordingly, the connection of the communication on the downstream side of the user terminal 1B depends upon whether or not the user terminal 1A exists in the communicable area of the reservation server 2. That is, the continuation of the communication on the downstream side of the user terminal 1B is cut off when the user terminal 1A gets out of the communicable area of the reservation server 2.

Therefore, the reservation server 2 transmits the "store information" as one-way information to all the user terminals existing within the scatternet 21, whereas the permission for the "reservation" requiring the bi-directional communications is given to only the user terminal 1A which is setting up the piconet P with the reservation server 2, thereby avoiding the disconnection of the communication during the reservation.

In addition, the user terminal 1B may transmit positional information on the store or the reservation server 2 together with the store information so that the user terminals on the downstream side of the user terminal 1B may be guided to enter the communicable area of the reservation server 2.

By using the scatternet 21 in this way, the reservation server 2 can transmit the store information to users existing at a place being out of its own communicable area (10 m to 100 m). Moreover, this eliminates physical wiring and considerably saves the investment cost in facility.

Still additionally, in this way, the store/facility information is transmitted to users who may receive a service physically, and the users can make reservation at any place while away from home, while the service provider can enhance the customer collection.

Moreover, since the reservation server 2 gains access to the other reservation servers 19*a* to 19*e*, after the reservation, and notifies a user of a reservation situation on another store or a neighboring store, it is possible to improve the convenience on the store utilization by the user.

Incidentally, various modifications or changes on the network topology (network protocol) are possible.

Figure 11:
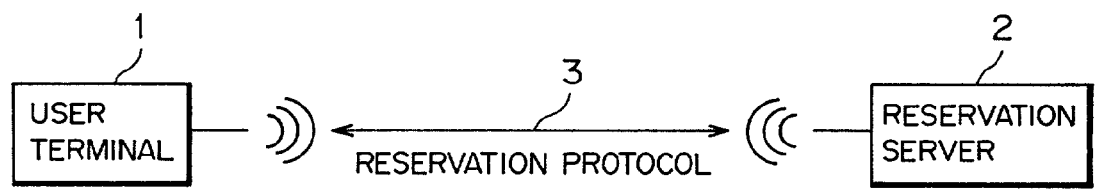
FIG. 11 is an illustration of a network topology for an ordinary reservation according to the first embodiment of the invention.

FIG. 11 is an illustration of a network topology for an ordinary reservation according to the first embodiment of the invention. In FIG. 11, the user terminal 1 and the reservation server 2 are connected to each other through the radio network 3. For the radio interval, a predetermined reservation protocol is used to make interchange of data. This enables reservations.

In addition, the server network 4 can employ the same protocol as the reservation protocol and can also use a protocol different therefrom.

Figure 12:
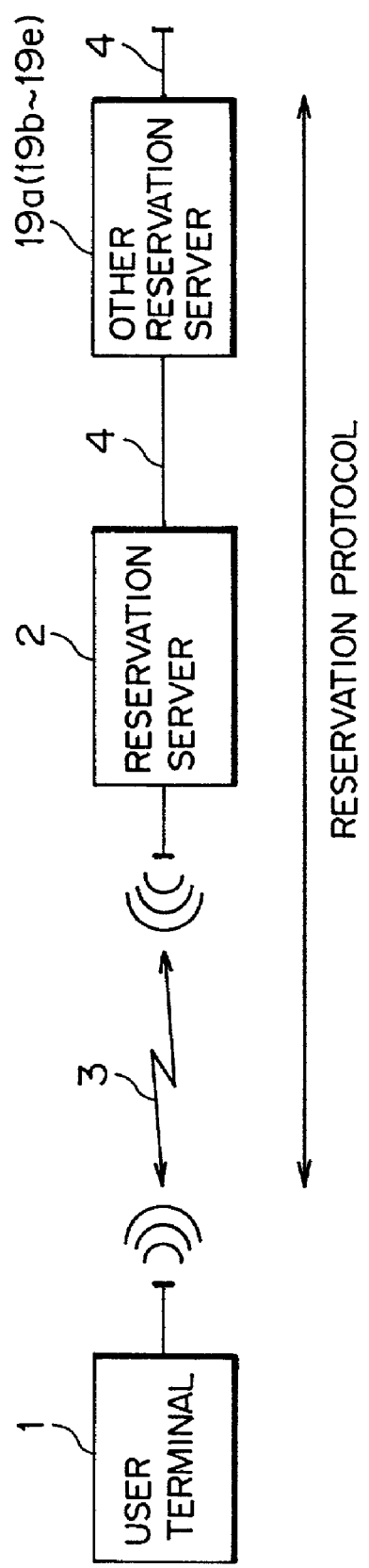
FIG. 12 is an illustration for explaining a first network topology according to the first embodiment of the invention.

FIG. 12 is an illustration for explaining a first network topology according to the first embodiment of the present invention, where the same protocol as the reservation protocol of the radio network 3 is used between the reservation server 2 and the other reservation servers 19*a* to 19*e*. In FIG. 12, the reservation server 2 is made to transmit and receive the reservation protocol in the server network 4 to send and receive the reservation situation data as it is. In this case, the reservation server 2 is made to merely relay data.

Accordingly, the user terminal 1 can make reservation with respect to the other reservation servers 19*a* to 19*e* through the other reservation server 19*a* and the server network 4, and the access mediation between the user terminal 1 and the other reservation servers 19*a* to 19*e* is made with the same protocol as that at which the user terminal 1 has had access to the reservation server 2.

Figure 13:
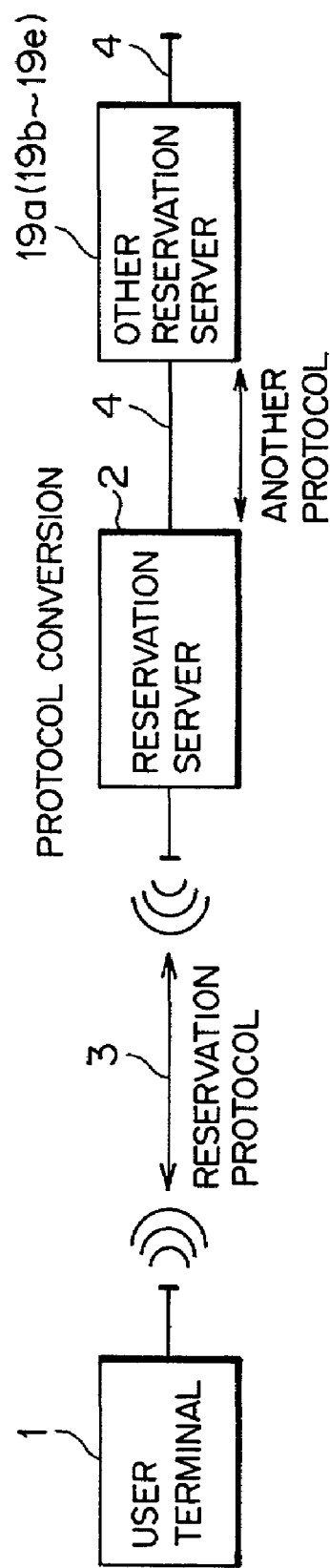
FIG. 13 is an illustration for explaining a second network topology according to the first embodiment of the invention.

FIG. 13 is an illustration for explaining a second network topology according to the first embodiment of the present invention, where the protocol between the reservation server 2 and the other reservation servers 19*a* to 19*e* is different from the protocol of the radio network 3. In FIG. 13, a reservation protocol is used between the user terminal 1 and the reservation server 2, while a protocol different from the reservation protocol is used between the reservation server 2 and the other reservation servers 19*a* to 19*e*. In addition, the reservation server 2 is designed to mutually convert two types of protocols into the other protocols. In consequence, the reservation server 2 can transmit and receive data to and from various servers different in protocol from each other. In this way, the reservation server 2 can mediate reservation in addition to issuing the notification to a user. Moreover, after his or her schedule is determined by the reservation, the user can receive a notification on the reservation contents of a facility near the place the user stands at that time, thereby using the free time efficiently.

Furthermore, thus, a service provider can suggest, to the user, a way to make efficient use of the free time for providing a higher-value-added service.

Figure 14:
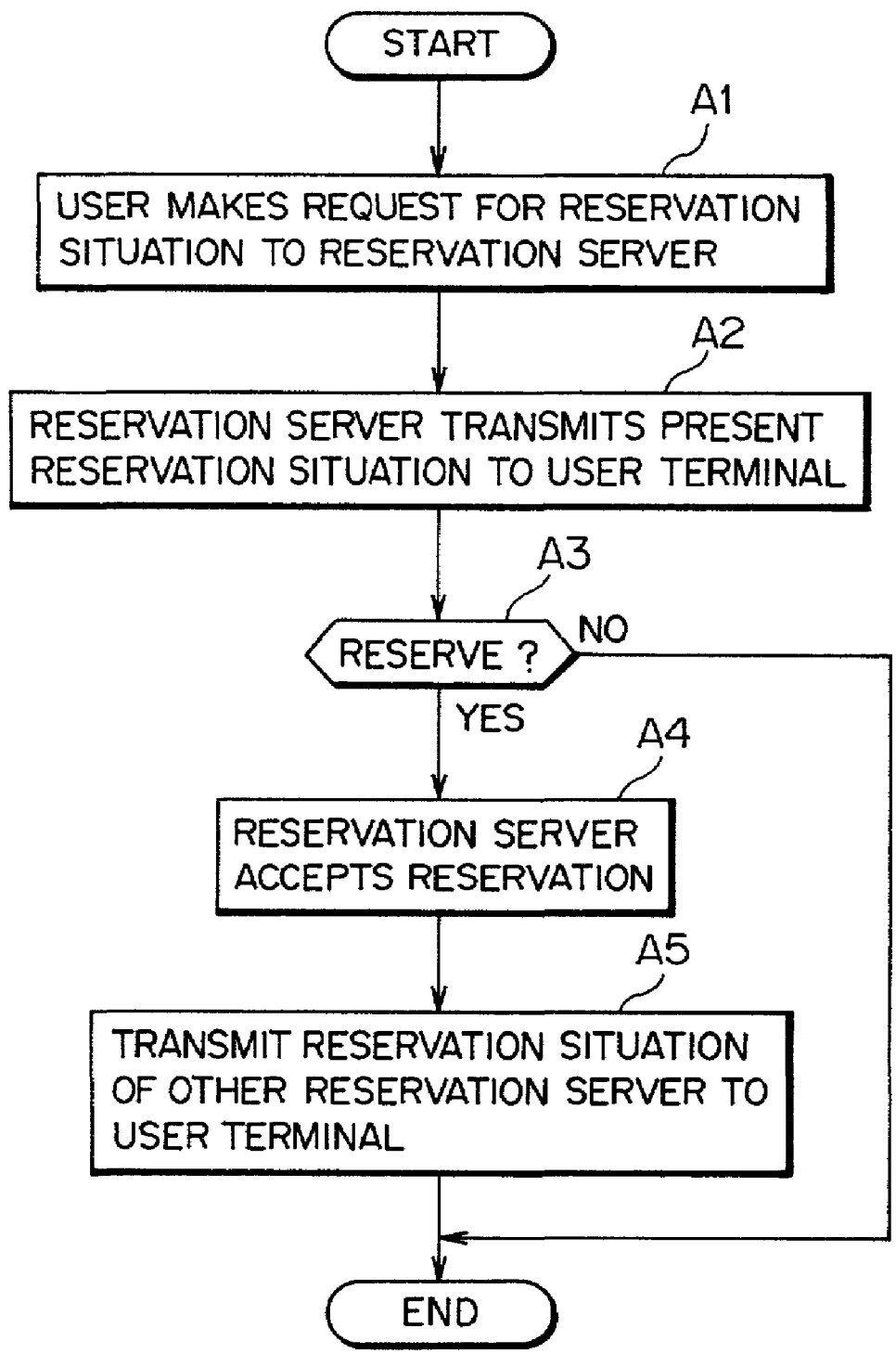
FIG. 14 is a flow chart for explaining a reservation method according to the first embodiment of the invention.

Referring to FIG. 14, a detailed description will be given hereinbelow of a reservation method used in the system, arranged as above, according to the first embodiment of the present invention.

FIG. 14 is a flow chart for explaining a reservation method according to the first embodiment of the present invention. First of all, a user uses the user terminal 1 to issue a request to the reservation server 2 for notification on the present reservation situation (step A1). Then, at step A2, the reservation server 2 notifies the user terminal 1 of the present reservation situation. In more detail, the reservation managing section 26 of the reservation server 2 reads out the reservation situation retaining section 25 which retains the reservation situations to extract the present reservation situation (the number of vacant seats, a reservation situation on each seat, and other information), and the data is transmitted through the radio network 3 to the user terminal 1.

Following this, at step A3, the user sees the reservation situation appearing on the displaying section 1*e* of the user terminal 1 to decide whether or not to make reservation. As a concrete example, in a movie theater, a decision is made on the basis of whether or not all seats for a movie the user wants to see are occupied, a desired seat is vacant, or screening (running) start time or end time is appropriate or not. At this time, if the user does not make reservation, the operational flow goes to the "No" route, making no reservation. On the other hand, if the user makes a reservation, the operational flow advances to the "Yes" route.

At step A4, the reservation server 2 accepts the reservation. In more detail, on the basis of the user's confirmation on the reservation transmitted from the user terminal 1, the reservation managing section 26 updates the reservation situation retained in the reservation situation retaining section 25.

Subsequently, at step A5, the operational flow enters into the processing at the completion or realization of the reservation. In more detail, after the completion of the reservation, the other reservation situation notifying section 7 of the reservation server 2 receives the reservation situations of the other reservation servers 19*a* to 19*e* through the server network 4, and notifies the user terminal 1 of these reservation situations.

The reservation by the user is thus completed. It is also possible that the reservation situations of the other reservation servers 19*a* to 19*e* are limited to the nearby stores to which the user can gain access at that time.

Namely, since limitation in distance is imposed on the radio network 3 with respect to the user terminal 1, only the nearby stores available for the user are selected and the services these stores provide are transmitted to the user terminal 1.

Figure 15:
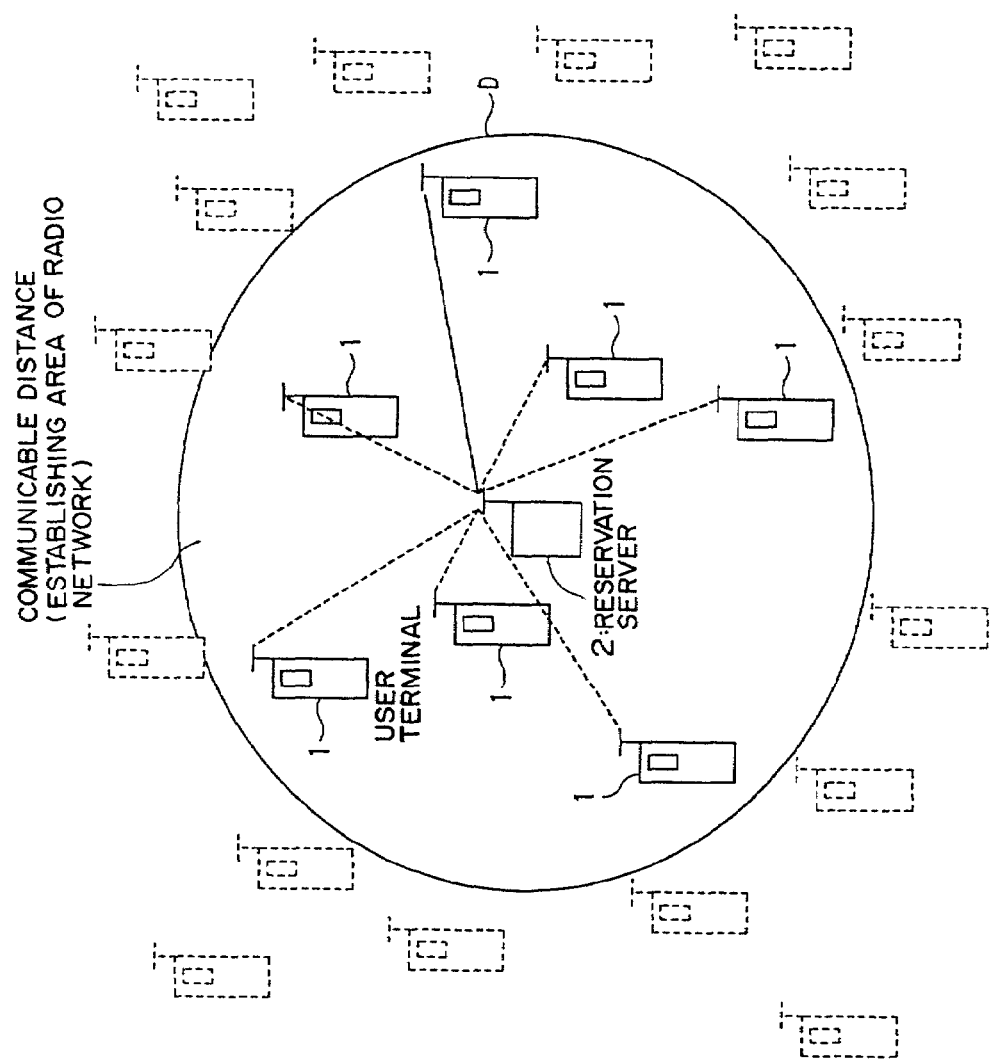
FIG. 15 is an illustration for explaining a communicable range according to the first embodiment of the invention.

FIG. 15 is an illustration for explaining a communicable area according to the first embodiment of the present invention. The area shown in FIG. 15 is a range in which a radio connection can be set up between the reservation server 2 and the user terminals 1. In addition, the reservation server 2 transmits data to only the user terminals existing in this area D for sending the available services. For example, among these services, there are information on current bargain sale, information on bargain sale in the extremely near future (10 minutes later), events to be held, and others.

Figure 16:
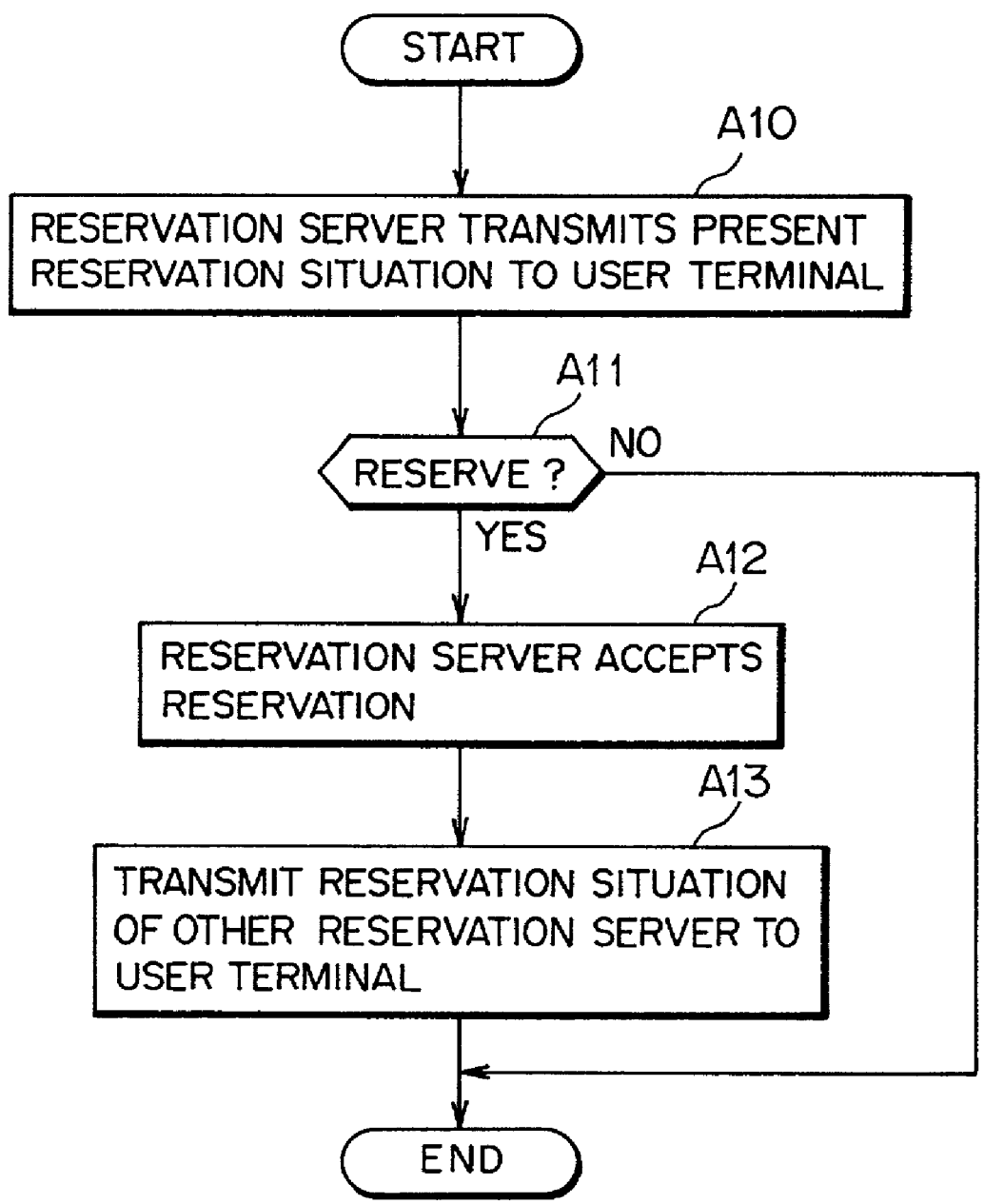
FIG. 16 is a flow chart showing a reservation method using a user terminal before completion of reservation according to the first embodiment of the invention.

FIG. 16 is a flow chart showing a reservation method using the user terminal 1 before the completion of reservation according to the first embodiment of the present invention. First of all, the reservation server 2 transmits the present reservation situation to the user terminal 1 (step A10). Then, at step A11, if the user does not make reservation, the operational flow passes through the "No" route, making no reservation. If a reservation is made, the operational flow passes through the "Yes" route to arrive at step A12 where the reservation server 2 accepts the reservation. Subsequently, at step A13, the reservation server 2 makes access to the other reservation servers 19*a* to 19*e*, and the reservation server 2 transmits, to the user terminal 1, the reservation situations retained in the other reservation servers 19*a* to 19*e*.

Accordingly, even when the reservation server 2 transmits data to the user terminal 1, the user can obtain information on bargain sale or event which is currently on running or which will start 10 minutes later.

Although in this example the information of the other reservation servers 19*a* to 19*e* are given to the reservation server 2 after the completion of reservation, it is also acceptable that they are given thereto before the completion of reservation.

Figure 17:
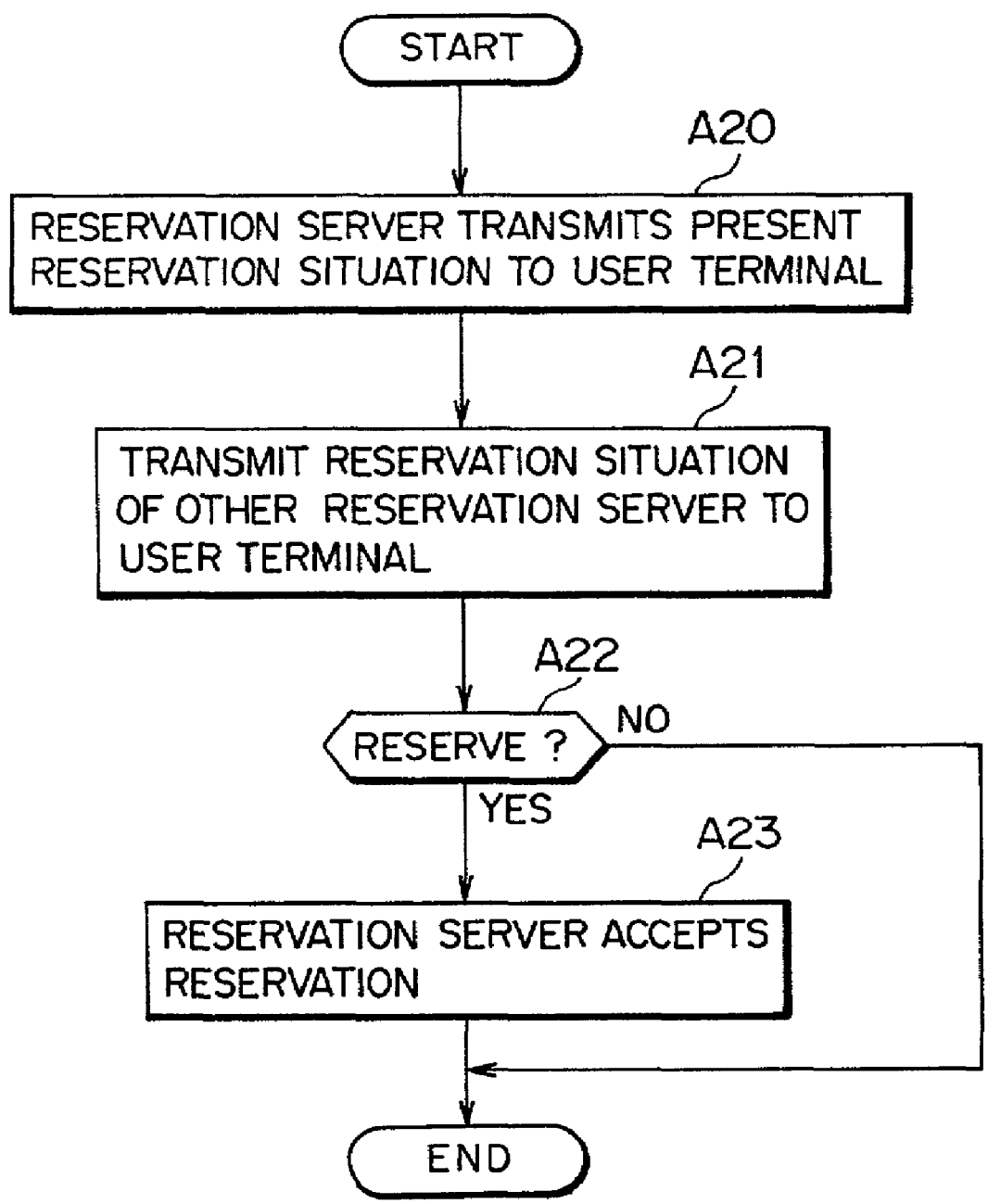
FIG. 17 is a flow chart showing a reservation method using the user terminal after the completion of reservation according to the first embodiment of the invention.

FIG. 17 is a flow chart showing a reservation method using the user terminal 1 after completion of reservation according to the first embodiment of the present invention. In this case, after transmitting a reservation situation to the user terminal 1, the reservation server 2 transmits information of the other reservation servers 19a to 19e to a user on background while the user operates the user terminal 1, and transmits the information of the other reservation servers 19a to 19e to the user terminal 1 after procedure for reservation or cancellation by the user.

First of all, the reservation server 2 notifies the user terminal 1 of the present reservation situation (step A20). Subsequently, the other reservation situation notifying section 7 of the reservation server 2 makes access to the other reservation servers 19a to 19e to transmit, to the user terminal 1, the reservation situations retained in the other reservation servers 19a to 19e (step A21). At step A22, if the user does not make reservation, the operational flow passes through the "No" route, making no reservation. If the user makes reservation, the operational flow passes through the "Yes" route so that the user's intention to make a reservation is communicated from the user terminal 1 to the reservation server 2. Then, at step A23, the reservation server 2 accepts the reservation.

Accordingly, before the completion of the reservation, the information of the other reservation servers 19a to 19e are communicated to the reservation 10 server 2.

Thus, before and after the completion of the user's reservation (achievement of reservation made by the user), the contents preserved in the other reservation servers 19a to 19e are displayed on the user terminal 1.

In addition, since after the completion of the reservation the reservation server 2 makes access to the other reservation servers 19a to 19e to notify the user of the reservation situation of the restaurant 30 or the reservation situation of a nearby store as mentioned above, the user can find out a service of a store while being in the communicable area at that time. Therefore, the service provider can send the reservation situation to the user at an appropriate timing while the user can obtain the latest reservation situation.

Still additionally, since the reservation server 2 sends the reservation situation only to the user existing in a predetermined communicable area, the situation of the store can be communicated to the user in real time so that the service provider on the store/facility can enhance the customer collection.

(B) Description of Second Embodiment of the Invention

A second embodiment of the present invention relates to a means in which a reservation server 2a (see FIG. 18) suggests alternative event information to a user terminal 1.

FIG. 18 is a block diagram showing a reservation server according to a second embodiment of the present invention. In FIG. 18, the reservation server 2a is connected through a radio network 3 to the user terminal 1, and is made to output store/facility information including a reservation-needed service requiring reservation and a reservation situation on the reservation-needed service or alternative event information on an event substituting for the reservation-needed service. Incidentally, in FIG. 18, the elements marked with the same reference numerals as those used above exhibit the same or similar functions, and the description thereof will be omitted for avoiding redundancy.

A waiting time calculating section 6 is for calculating and outputting, as a waiting time, a difference between the start time included in the alternative event information selected in the reservation managing section 26 or the reservation-needed service start time included in the store/facility information and the present time. This function can be realized by a software-based timetable placed in the interior of the waiting time calculating section 6.

FIG. 19(a) is an illustration for explaining a timetable according to the second embodiment of the present invention, where a movie is taken as an alternative event. The waiting time calculating section 6 calculates a difference between a screening start time included in the alternative event information and the present time and obtains "one hour and fifteen minutes".

In addition, in a reservation method using the waiting time calculating section 6 according to the present invention, for selecting store/facility information and alternative event information on an event substituting for a reservation-needed service on the basis of a desired service(s) or desired event(s) (selecting step), the reservation server 2a first gains access to other reservation server store/facility information or other reservation server alternative event information retained in the other reservation servers 19a to 19e connected through a server network 4 thereto (other reservation server access step).

Subsequently, the reservation server 2a calculates a user's waiting time (time that a user waits) to be taken until the desired service or the desired event starts, on the basis of the other reservation server store/facility information or other reservation server alternative event information accessed in the other reservation server access step (waiting time calculating step).

Furthermore, the reservation server 2a extracts, from the desired service or the desired event, a service or event practicable within the waiting time calculated in the waiting time calculating step (extracting step).

With this arrangement, a service provider can notify a user of a reservation situation or a time-limited service at an appropriate timing, while the user can acquire the latest service of a stare standing in a communicable area in real time.

An other reservation situation notifying section 7 is made to output, among the alternative event information, a practicable information as performing event information to a transmitting section 16b. That is, the other reservation situation notifying section 7 issues the performing event information on the basis of (1) a user's moving time, (2) a user's waiting time at another store and (3) a performance time to be taken for an event at another store.

FIG. 19(b) is an illustration for explaining performing event information according to the second embodiment of the present invention. In the other reservation situation notifying section 7, the shuttling (coming and going) times to be taken for going to/from a coffee shop, a bowling alley, a karaoke box and the restaurant 30 with respect to the present location are recorded in advance as fifteen minutes, ten minutes, ten minutes and ten minutes, respectively. Accordingly, in this case, the other reservation situation notifying section 7 outputs the user's waiting times as ten minutes, thirty minutes, zero minute and zero minute. In addition, the other reservation situation notifying section 7 seizes, as the performance time, the eating time being sixty minutes in the restaurant 30, and further seizes performance times in other stores/facilities, thus making out a timetable.

Furthermore, the other reservation situation notifying section 7 calculates the sum of (1) user's shuttling time (time the user needs for shuttling), (2) user's waiting time at another facility and (3) user's performance time at another facility, and if the sum is shorter than the user's waiting time, notifies the user terminal 1 of the practicability of the event.

In this case, the user's shuttling time is calculated on the basis of the distance from the position of the reservation server 2a from another store/facility. The reservation server 2a retains the association between the distances and the corresponding moving times. Incidentally, for the shuttling times, it is also appropriate that the reservation server 2a or the other reservation servers 19a to 19e calculate the moving times from the locations of the reservation servers 2a and 19a to 19e on the basis of the address information or the positional information obtained through GPS (Global Positioning System). Preferably, the moving time is determined to be somewhat longer than calculated.

The user's waiting time in another facility can be calculated on the basis of the present reservation situation of the reservation server 2a. The performance time, which the user is required to take, in another facility is retained in each of the reservation servers 2a and 19a to 19e. Meanwhile, the reservation server 2a can present the definite performance time in the case of a movie or the like, but cannot say the definite time in the case of the meal in the restaurant 30. Accordingly, in the case of providing a service defying the definite timewise determination, the reservation server 2a provides an average performance time which a user is required to take for a service, as the common performance time.

In addition, the other reservation situation notifying section 7 extracts the longest event taking a maximum performance time, among the events included in the alternative event information, on the basis of an event end time obtained by adding a waiting time to the performance time to be taken for each of the events, and includes the extracted longest event in the performing event information and outputs the longest event included performing event information. The maximum performance time, calculated backward on the basis of the user's waiting time, is presented to the user terminal 1 for the user. For example, when the present time is 12:00 and if a waiting time, a shuttling time and a waiting time are taken as one hundred minutes, fifteen minutes and ten minutes, respectively, the other reservation situation notifying section 7 calculates the maximum practicable time as 100 minutes−(fifteen minutes+ten minutes)=seventy-five minutes.

Therefore, the user can take an alternative event which comes to an end until 13:15. For the inquiry about the former service reserved, the reservation server 2a says the fact that there is a need for it to come to an end until 13:15 when notifying the user of information. Moreover, in addition to the notification at the reservation, it is also possible that, when 13:15 comes near, the user terminal 1 displays an announcement or alarm for advising the user.

Figure 20:
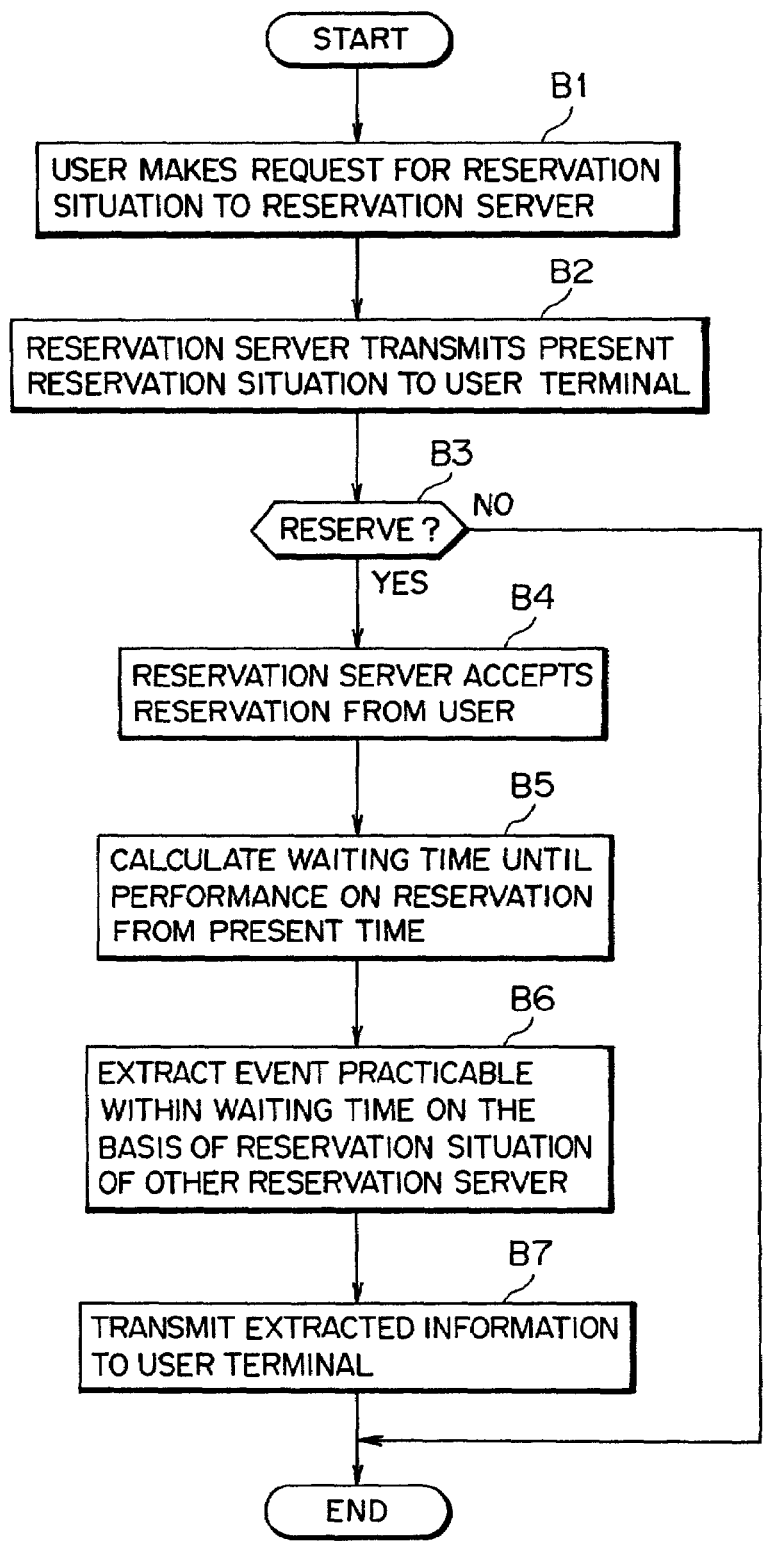
FIG. 20 is a flow chart for explaining a reservation method according to the second embodiment of the invention.

Referring to FIG. 20, a detailed description will be given hereinbelow of a reservation method for use in the system thus arranged according to the second embodiment.

FIG. 20 is a flow chart for explaining the reservation method according to the second embodiment of the present invention.

First of all, through the use of the user terminal 1, a user makes a request for the present reservation situation to the reservation server 2a (step B1). Subsequently, at step B2, the reservation server 2a transmits the present reservation situation to the user terminal 1. The reservation managing section 26 gains access to the reservation situation retaining section 25 to extract the present reservation situation (the number of vacant seats, a reservation situation of each seat, or the like) for sending it to the user terminal 1.

Following this, at step B3, the user sees the reservation situation displayed on the user terminal 1 to decide whether or not to make reservation. If the user does not make reservation, the operational flow passes through the "No" route, resulting in making no reservation. If the user makes reservation, the operational flow passes through the "Yes" route; that is, the user's reservation making intention (signal for the securement of reservation) is communicated from the user terminal 1 to the reservation server 2.

At step B4, the reservation server 2a accepts the user's reservation, and the reservation managing section 26 updates the reservation situation preserved in the reservation situation retaining section 25. When the user's reservation reaches completion, the reservation server 2a notifies the user terminal 1 of this fact.

In addition, at step B5, after the completion of the reservation, the waiting time calculating section 6 of the reservation server 2a calculates, through the use of its own built-in clock, a user's waiting time (for example, one hundred minutes) as a function of the present time (for example, 12:00) and a time such as a screening start time in a movie theater at which the performance on the reservation takes place.

Still additionally, at step B6, the other reservation situation notifying section 7 of the reservation server 2a receives the reservation situations in the other reservation servers 19a to 19e through the server network 4, and extracts a practicable event within the waiting time from the received reservation situations. Then, at step B7, the reservation server 2a transmits the extracted event to the user terminal 1, and further calculate the maximum practicable time.

As mentioned above, in addition to the effects and advantages of the first embodiment, the user can understand the end of the waiting time and receive diverse services. In addition, the user can certainly accomplish the reservation for the services.

With the reservation system 23 being used in this way, the user can gain the following advantages and effects (3-1) to (3-5).

(3-1) The user can transmit/receive information and execute the reservation, and further make efficient use of the waiting time.

(3-2) The user can easily decide whether or not he/she encounters a state of all seats being occupied.

(3-3) The reservation server 2a can first have access to the user terminal 1 to make advertisement or persuade reservation.

(3-4) The user can receive information on, of the services or events communicated from the reservation server 2a to the user terminal 1, only the service or event the user can perform in view of distance or time, thus obtaining useful information.

(3-5) Even if encountering the close of reservation for one kind of service or event, the reservation server 2a can gain access to itself or the other reservation servers 19a to 19e; hence, the user can get an alternative service or event without troublesome terminal operations.

In addition, a store/facility-can gain the following advantages and effects (3-6) to (3-10).

(3-6) The store can change the number of windows properly to place the operators efficiently.

(3-7) The store can let a clerk count the number of users standing in front of a window and transmit this information to other reservation servers so that the reservation servers 2a and 19a to 19e can know accurate sale situation (whether all seats are occupied or not).

(3-8) The store can suggest a service or event other than reserved to the user while the user waits, thus providing a high-quality service.

(3-9) The store can select only the stores existing in the neighborhood of the user on the basis of the present position of the user, thus achieving efficient customer collection.

(3-10) The store can lean to the position of the user having reservation intention and the contents of the reservation secured by the user, and can present proper information for the user in consideration of the place and time of the service or event.

(B1) Description of First Modification of Second Embodiment of the Invention

In a first modification, the reservation server 2a not only displays a reservation situation but also mediate reservation for the other reservation servers 19a to 19e.

Figure 21:
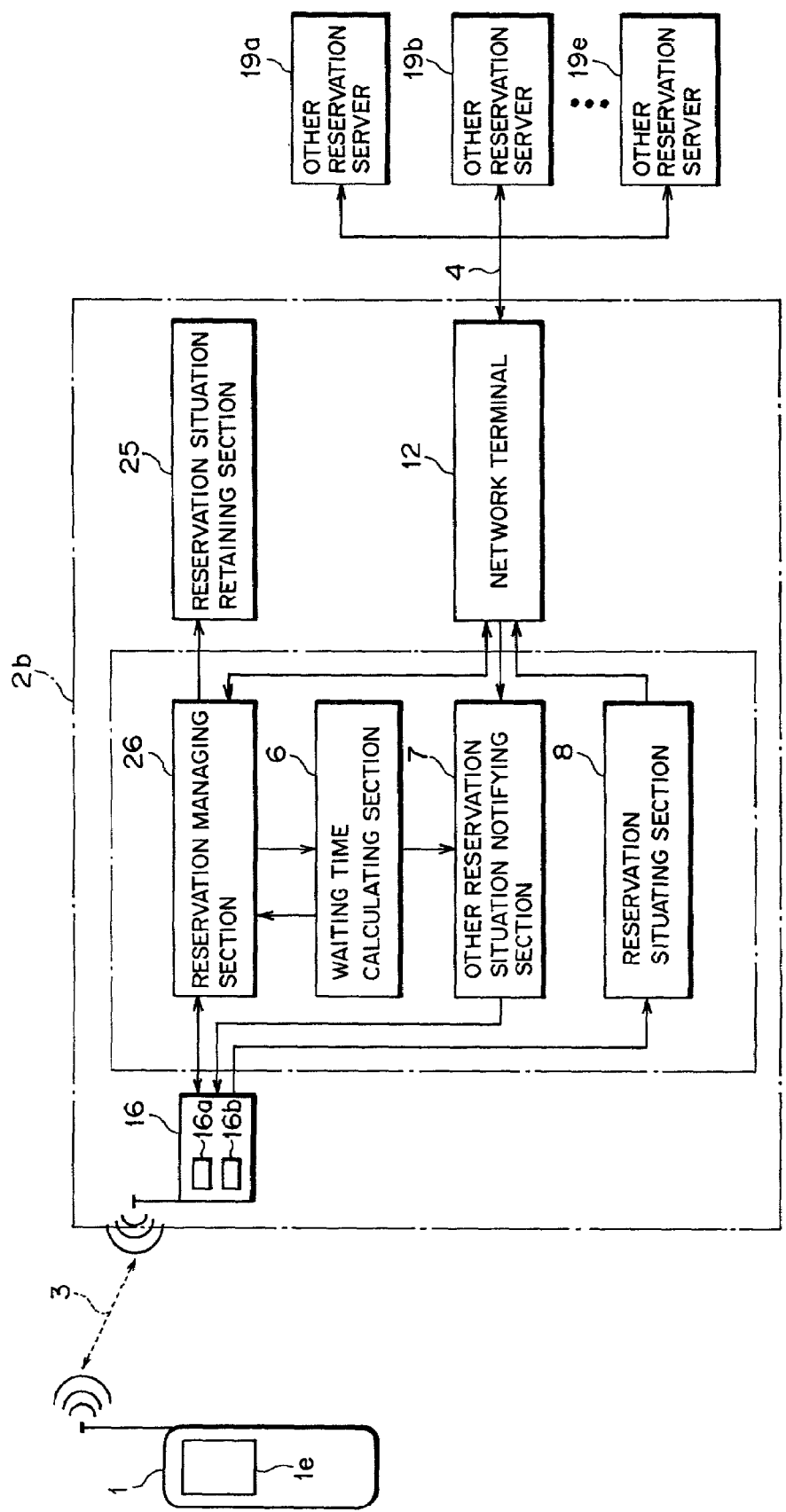
FIG. 21 is a block diagram showing a reservation server according to a first modification of the second embodiment of the invention.

FIG. 21 is a block diagram showing a reservation server according to a first embodiment of the second embodiment of the present invention. In FIG. 21, a reservation server 2b includes a reservation mediating section 8 in addition to the configuration of the reservation server 2a (see FIG. 18). The elements marked with the same reference numerals as those used above exhibit the same or similar features, and the description thereof will be omitted for avoiding redundancy.

The reservation mediating section 8 is for transmitting a request for reservation from a user, received in the receiving section 16a to the other reservation servers 19a to 19e through an other reservation server interface section (network terminal 12). Therefore, it is possible to offer a variety of services to users and further to prevent the drain of service classification to be introduced.

Accordingly, in FIG. 21, a reservation request transmitted from the user terminal and received in the radio transmitter/receiver 16 is transferred through the reservation mediating section 8, the network terminal 12 and the server network 4 to the other reservation servers 19a to 19e the user makes reservation in.

In addition, a reservation situation transmitted from any one of the other reservation servers 19a to 19e is sent as a radio signal by the radio transmitter/receiver 16 after passing through the reservation mediating section 8, and is then received by the user terminal 1.

Figure 22:
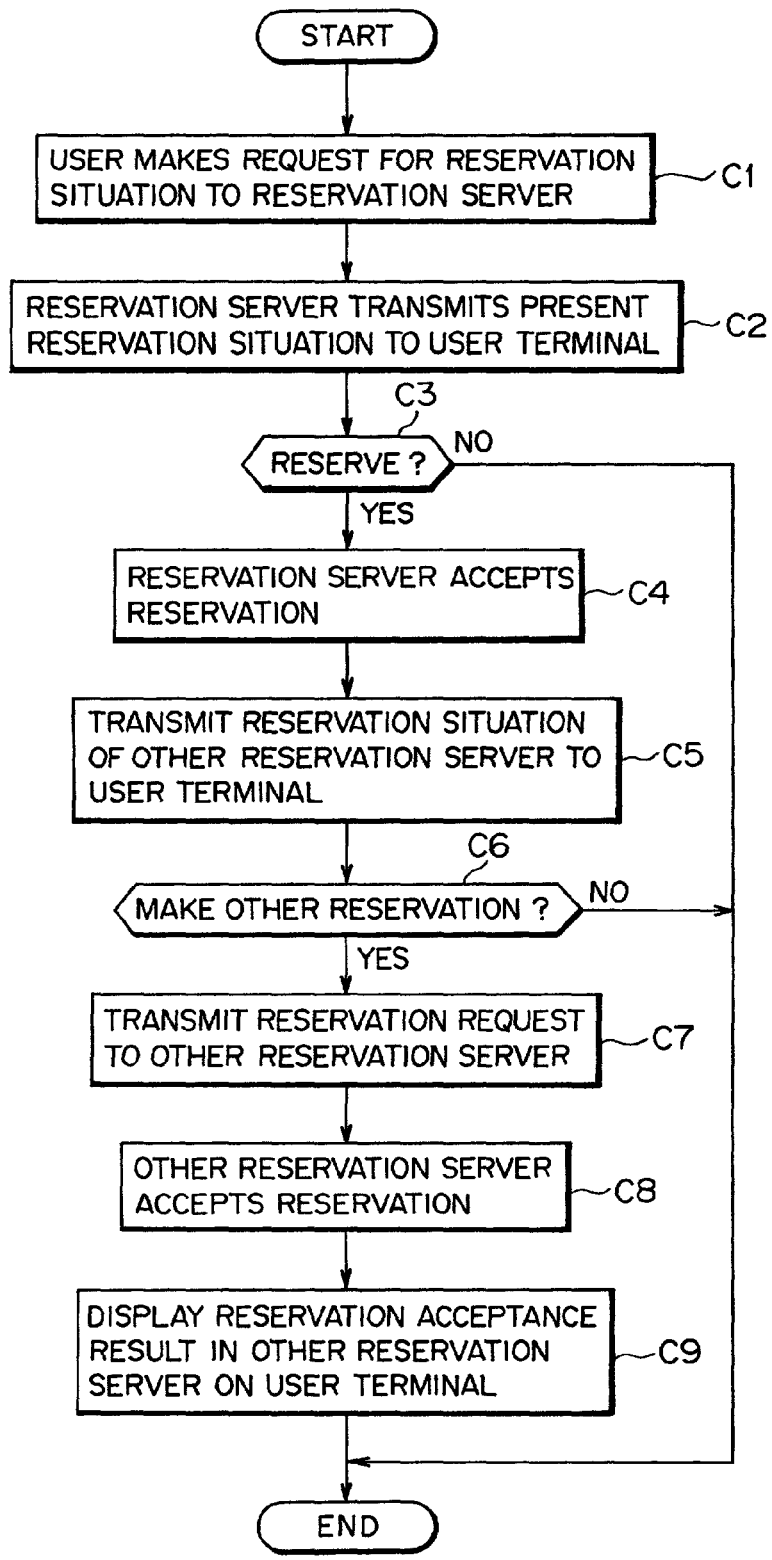
FIG. 22 is a flow chart for explaining a reservation method according to the first modification of the second embodiment of the invention.
Figure 23:
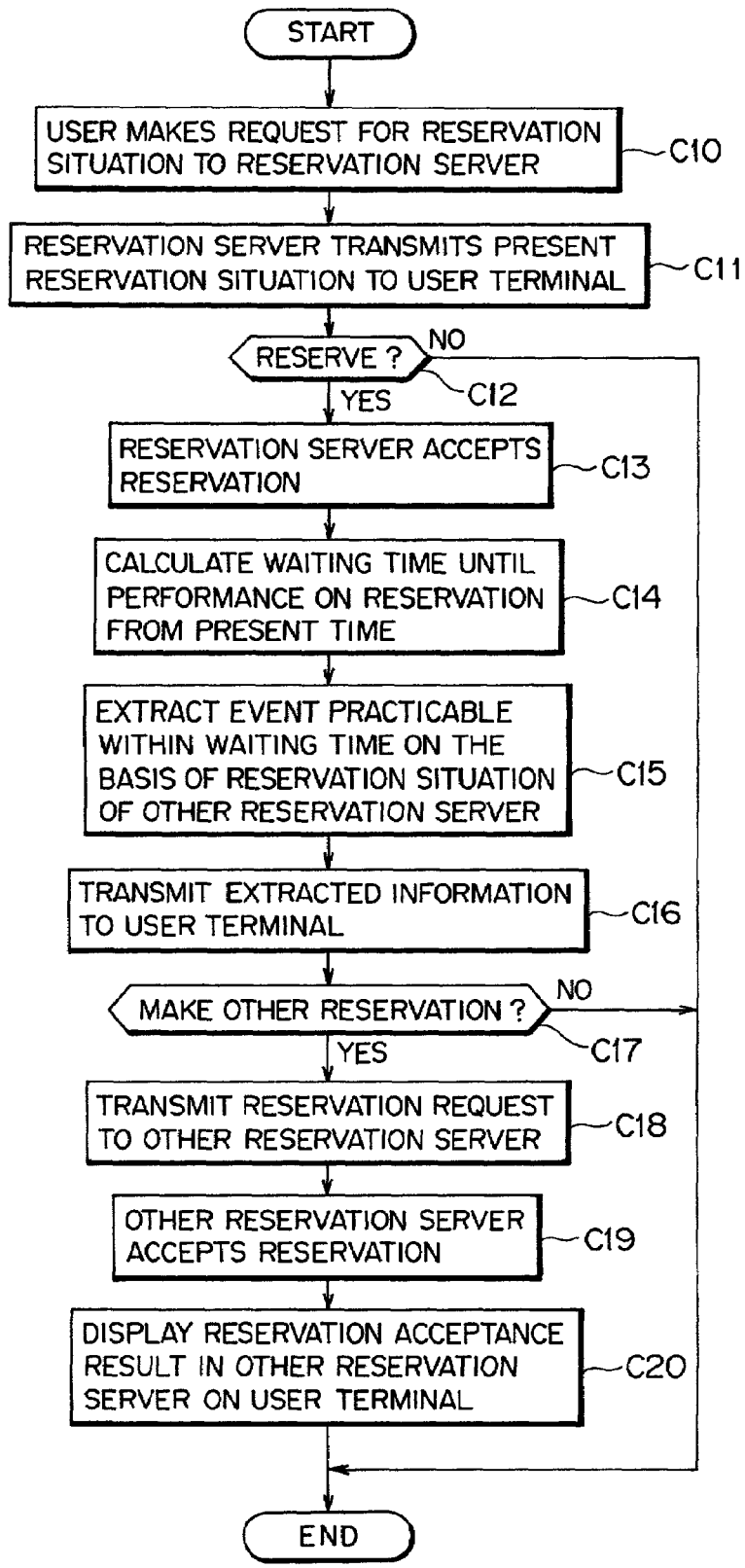
FIG. 23 is a flow chart for explaining another reservation method according to the first modification of the second embodiment of the invention.

Referring to FIGS. 22 and 23, a detailed description will be given hereinbelow of a reservation method for use in the system thus arranged according to the first modification of the second embodiment.

FIG. 22 is a flow chart for explaining the reservation method according to the first modification of the second embodiment of the present invention. First of all, through the use of the user terminal 1, a user issues a request for the present reservation situation to the reservation server 2b (step C1). Subsequently, the reservation server 2b informs the user terminal 1 of the present reservation situation (step C2). At step C3, if the user does not secure reservation, the operational flow passes through the "No" route, making no reservation. If securing the reservation, the operational flow advances along the "Yes" route.

At step C4, the reservation server 2b accepts the reservation. In more detail, the reservation managing section 26 makes access to the reservation situation retaining section 25 to extract the present reservation situation (the number of vacant seats, a reservation situation of each seat, or the like) for transmitting it to the user terminal 1. The user makes a decision, on the basis of the display on the user terminal 1, as to whether or not to make the reservation. If making the reservation, the user terminal 1 communicates the user's reservation making intention to the reservation server 2b, while the reservation managing section 26 of the reservation server 2b updates the reservation situation retained in the reservation situation retaining section 25. If the reservation has succeeded, the reservation server 2b informs the user terminal 1 of this fact.

At step C5, after the completion of the reservation, the other reservation situation notifying section 7 of the reservation server 2b receives the reservation situations in the other reservation servers 19a to 19e through the server network 4, then notifying of the user terminal 1. The reservation server 2b issues inquiries about the presence or absence of reservation in addition to the information notification. Following this, at step C6, if the user does not secure another reservation, the operational flow proceeds along the "No" route, making no reservation. If the reservation is secured, the operational flow proceeds along the "Yes" route. At step C7, the user terminal 1 makes a communication with the reservation server 2b for the reservation in the other reservation servers 19a to 19e. The reservation mediating section 8 of the reservation server 2b transmits a reservation request through the server network 4 to one of the other reservation servers 19a to 19e.

At step C8, the one of the other reservation servers 19a to 19e accepts the reservation request transmitted through the reservation server 2b, and conducts the reservation processing. If the user's reservation reaches completion, at step C9, one of the other reservation servers 19a to 19e communicates the reservation completion through the other reservation situation notifying section 7 of the reservation server 2b to the user terminal 1. The user terminal 1 displays the reservation acceptance result.

Thus, the reservation server 2b can relay the reservation contents of a remote reservation server, thus performing a variety of work, while the user can receive a high-quality service.

Moreover, as a method in which the reservation server 2b mediates reservation, it is also possible to employ a means of extracting and mediating only practicable services within the user's waiting time.

FIG. 23 is an illustration for explaining another reservation method according to the first modification of the second embodiment of the present invention. First 5 of all, through the use of the user terminal 1, a user issues a request for the present reservation situation to the reservation server 2b (step C10). Subsequently, the reservation server 2b notifies the user terminal 1 of the present reservation situation (step C11). In more 10 detail, the reservation managing section 26 gains access to the reservation situation retaining section 25 to extract the present reservation situation (the number of vacant seats, a reservation situation of each seat, or the like) for outputting it to the user terminal 1.

At step C12, the user sees the-reservation situation on the user terminal 1, from the reservation server 2b, to decide whether or not to make reservation. If the user secures the reservation, the operational flow advances through the "Yes" route to step C13 where the reservation 20 server 2b accepts the reservation made by the user. In more detail, the user terminal 1 communicates the user's reservation making intention to the reservation server 2b, and the reservation managing section 26 of the reservation server 2b updates the reservation situation 25 retained in the reservation situation retaining section 25, and if the reservation reaches realization, informs the user terminal 1 of this fact. In addition, the other reservation situation notifying section 7 receives the reservation situations of the other reservation servers 19a to 19e through the server network 4, and sends them to the user terminal 1.

At step C14, the reservation server 2b calculates a waiting time from the present time to the reservation performing time. In addition, at step C15, the reservation server 2b extracts an event practicable within the waiting time on the basis of the reservation situation of any one of the other reservation servers 19a to 19e and, at step C16, transmits the extracted event information to the user terminal 1.

Following this, at step C17, the reservation server 2b makes inquiries about the presence or absence of another reservation to the user in addition to notifying the user of the information. At this time, in the case of the reservation, the operational flow proceeds through the "Yes" route to step C18 where the user terminal 1 transmits the user's reservation making intention on the other reservation servers 19a to 19e to the reservation server 2b, while the reservation mediating section 8 of the reservation server 2b transmits a reservation request through the server network 4 to one of the other reservation servers 19a to 19e.

At step C19, one of the other reservation servers 19a to 19e conducts the reservation processing when accepting the reservation request transmitted through the reservation server 2b, and when the user's reservation is completed, one of the other reservation servers 19a to 19e notifies of the reservation completion to the user terminal 1 through the other reservation situation notifying section 7 of the reservation server 2b. Thereafter, at step C20, the reservation acceptance result in one of the other reservation servers 19a to 19e appears on the user terminal 1.

Incidentally, at steps C12 and C17, if the user does not make the reservation, in both cases, the operational flow passes through the "No" route, resulting in making no reservation.

As described above, in addition to introducing the reservation situation, the reservation server 2b mediates reservation; therefore, the user can reserve a service in another store from the initial position without moving into the communicable area of the reservation server 2b for an another store/facility.

Moreover, in this way, the reservation-feasible area of the reservation server 2b is enlarged to be larger than the communicable area of the radio network 3 on the reservation server 2b.

(B2) Description of Second Modification of Second Embodiment of the Invention

In the second modification, instead of the waiting time, a suggestion to a user is made on the end time of an event the user has reserved. When the user reserve a movie and this movie ends at 17:00, a reservation server 2c (see FIG. 24) suggests a meal in the restaurant 30 to the user as a schedule after 17:00 and makes reservation if the user agrees to the suggestion.

Figure 24:
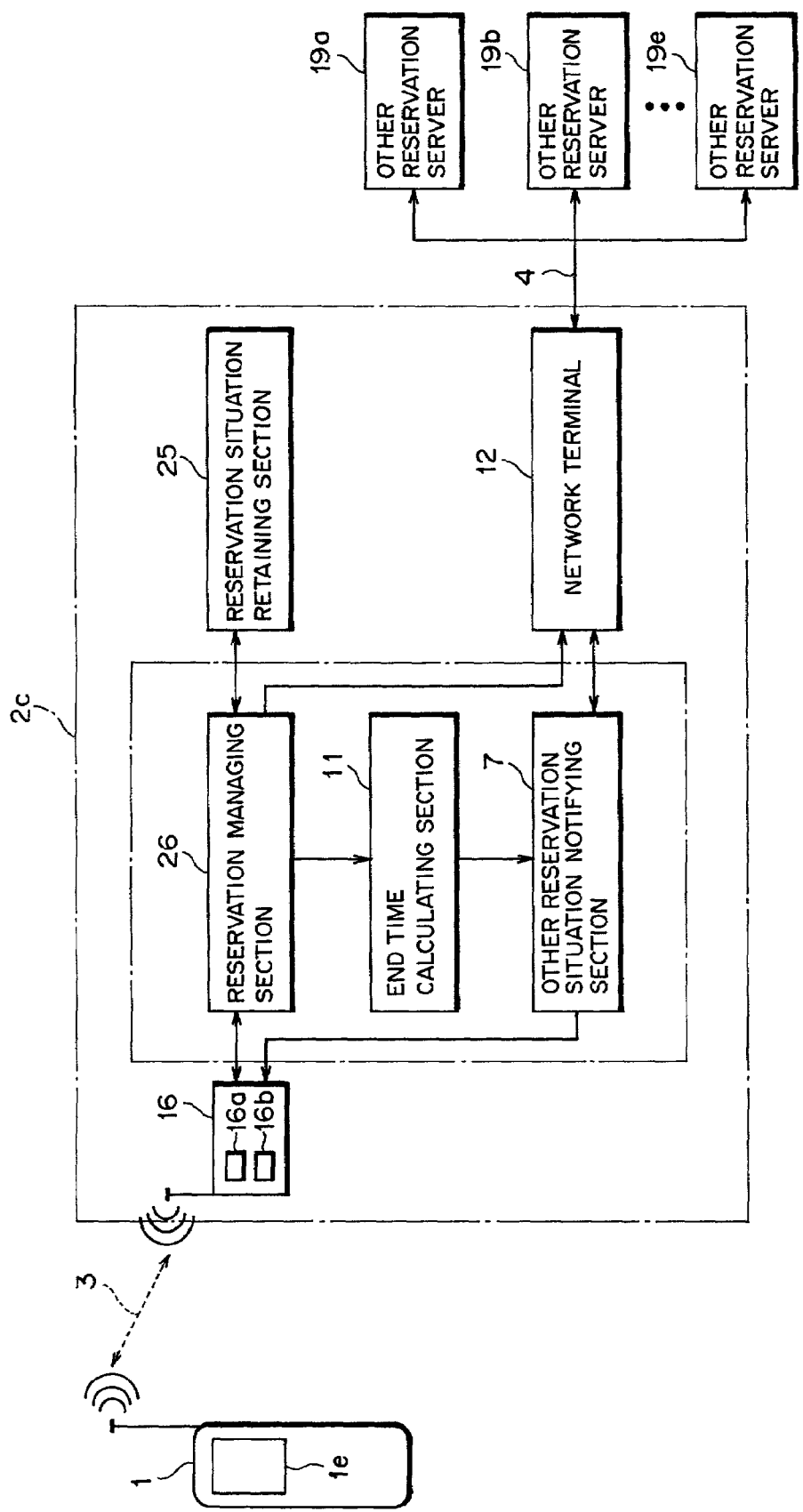
FIG. 24 is a block diagram showing a reservation server according to a second modification of the second embodiment of the invention.

FIG. 24 is a block diagram showing a reservation server according to a second modification of the second embodiment of the present invention. In FIG. 24, the reservation server 2c includes an end time calculating section 11 in addition to the configuration of the reservation server 2a (see FIG. 18). The elements marked with the same reference numerals as those used above exhibit the same or similar features, and the description thereof will be omitted to avoide redundancy.

The end time calculating section 11 is for calculating, as an end time, the sum of a performance time to be taken for an event included in alternative event information selected in the reservation managing section 26 or a performance time to be taken for a reservation-needed service included in store/facility information selected therein and the present time.

The end time calculating section 11 calculates an end time at which a service for a user ends, on the basis of a built-in clock (present time) and an end time of a service reserved (screening end time in a movie theater), and the other reservation situation notifying section 7 of the reservation server 2c receives reservation situations of the other reservation servers 19a to 19e connected to the server network 4, and notifies the user terminal 1.

Figure 25:
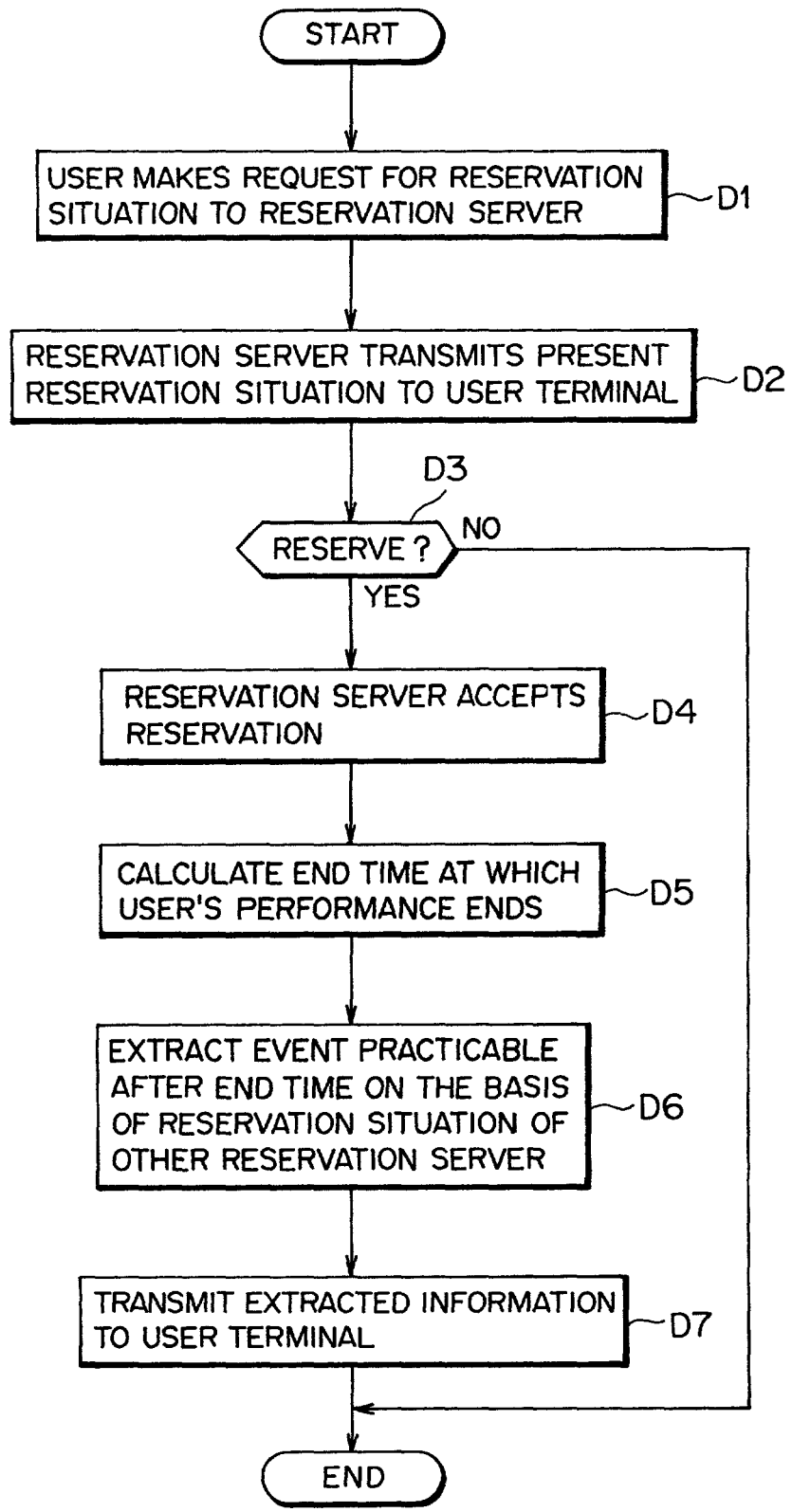
FIG. 25 is a flow chart for explaining a reservation method according to the second modification of the second embodiment of the invention.

Referring to FIG. 25, a detailed description will be given hereinbelow of a reservation method used in this configuration according to the second modification of the second embodiment.

FIG. 25 is a flow chart for explaining a reservation method according to the second modification of the second embodiment of the present invention. In FIG. 25, first of all, through the use of the user terminal 1, a user issues a request for the present reservation situation to the reservation server 2c (step D1). Subsequently, the reservation server 2c notifies the user terminal 1 of the present reservation situation (step D2). In more detail, the reservation managing section 26 of the reservation server 2c has access to the reservation situation retaining section 25 for extracting the present reservation situation (the number of vacant seats, a reservation situation of each seat, or the like) to transmit it to the user terminal 1.

Following this, at step D3, the user sees the reservation situation appearing on the user terminal 1 to make a decision as to whether or not to make reservation. If the user makes the reservation, the operational flow advances along the "Yes" route so that the user terminal 1 communicates the user's reservation making intention to the reservation server 2c. At step D4, the reservation server 2c accepts the reservation. At this time, the reservation managing section 26 of the reservation server 2c updates the reservation situation retained in the reservation situation retaining section 25, and when the reservation is realized, notifies the user terminal 1 of this fact.

At step D5, after the completion of the reservation, the end time calculating section 11 calculates a service end time on the basis of the its own clock and a time at which the service the user receives comes to an end. Then, at step D6, the other reservation situation notifying section 7 of the reservation server 2c receives the reservation situations of the other reservation servers 19a to 19e through the server network 4 to extract only events practicable after the end-time of the reserved service. Furthermore, at step D7, the reservation server 2c transmits the extracted events to the user terminal 1. At the step D3, if the user does not make the reservation, the operational flow passes through the "No" route, resulting in making no reservation.

Thus, the user can reserve an event not only after the completion of the reserved service but also within the waiting time.

(B3) Description of Third Modification of Second Embodiment of the Invention

In a third modification, a reservation server 2d (see FIG. 26) transmits event information and mediates reservation.

Figure 26:
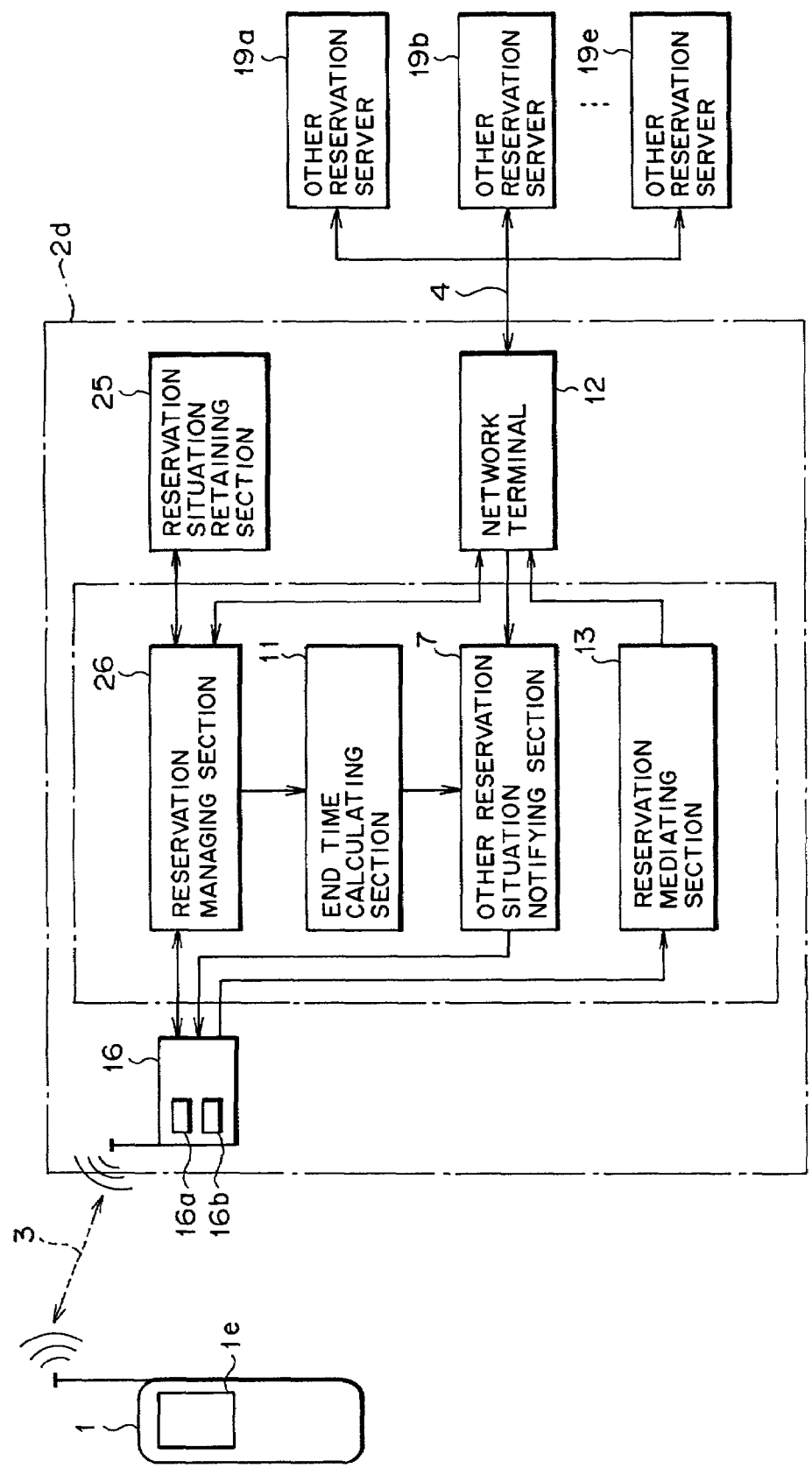
FIG. 26 is a block diagram showing a reservation server according to a third modification of the second embodiment of the invention.

FIG. 26 is a block diagram showing a reservation server according to a third modification of the second embodiment of the present invention. In FIG. 26, the reservation server 2d includes an end time calculating section 11 and a reservation mediating section 13 in addition to the configuration of the reservation server 2 (see FIG. 18). In FIG. 26, the elements marked with the same reference numerals as those used above exhibit the same or similar features, and the description thereof will be omitted for avoiding redundancy.

Figure 27:
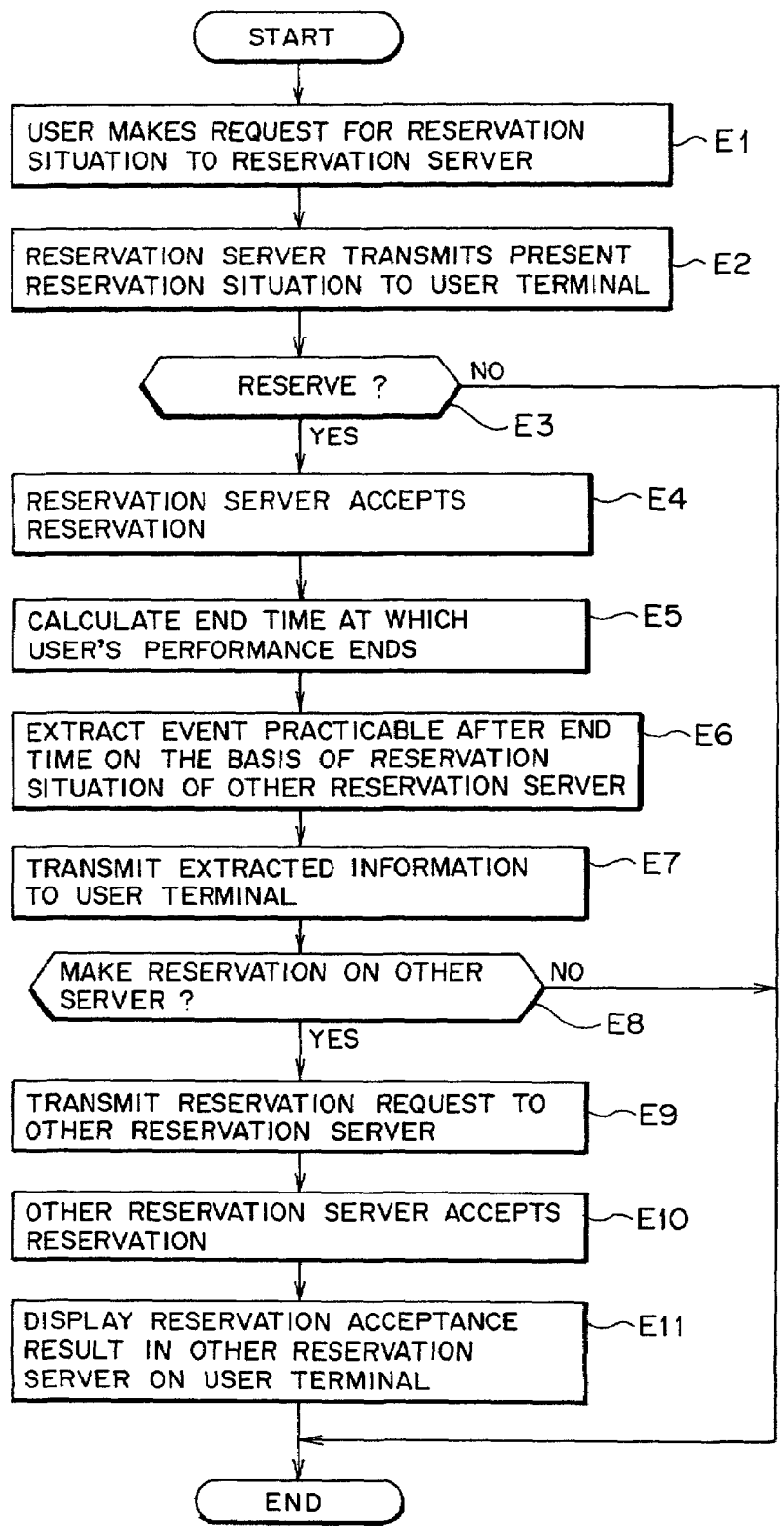
FIG. 27 is a flow chart for explaining a reservation method according to the third modification of the second embodiment of the invention.

Referring to FIG. 27, a detailed description will be given hereinbelow of a reservation method for use in this configuration according to the third modification of the second embodiment.

FIG. 27 is a flow chart for explaining a reservation method according to the third modification of the second embodiment of the present invention.

First of all, through the use of the user terminal 1, a user issues a request for the present reservation situation to the reservation server 2d (step E1). Subsequently, the reservation server 2d notifies the user terminal 1 of the present reservation situation (step E2) In this case, the reservation managing section 26 of the reservation server 2d has access to the reservation situation retaining section 25 to extract the present reservation situation (the number of vacant seats, a reservation situation of each seat, or the like) to send it to the user terminal 1.

At step E3, the user sees the reservation situation appearing on the user terminal 1 to make a decision as to whether or not to make reservation. If the user makes the reservation, the operational flow advances along the "Yes" route to enter into a process of step E4 where the reservation server 2d accepts the reservation. In more detail, the user terminal 1 communicates the user's reservation making intention to the reservation server 2d, and in the reservation server 2d, the reservation managing section 26, upon receiving the user's reservation making intention, updates the reservation situation retained in the reservation situation retaining section 25. When the reservation is realized, the reservation server 2d notifies the user terminal 1 of this fact.

At step E5, after the completion of the reservation, the end time calculating section 11 calculates an end time at which a service for the user ends, on the basis of its own clock (present time) and a time to be taken until the service for the user comes to an end (screening end time of a movie). At this time, the reservation server 2d transmits a reservation request to the other reservation servers 19a to 19e. The other reservation servers 19a to 19e accept the reservation request transmitted through the reservation server 2d and conduct the reservation processing, and when the user's reservation reaches completion, transmits the reservation server 2d of this fact.

At step E6, the other reservation situation notifying section 12 of the reservation server 2d receives the reservation situations of the other reservation servers 19a to 19e through the server network 4, and extracts only practicable events after the end time of the service reserved. Then, at step E7, the reservation server 2d transmits information on the reservation completion and the extracted event to the user terminal At step E8, if the user terminal 1 makes reservation at the other reservation servers 19a to 19e, the operational flow passes through the "Yes" route to read step E9 where the user terminal 1 transmits the user's reservation making intention on the other reservation servers 19a to 19e to the reservation server 2d. At step E10, one of the other reservation servers 19a to 19e accepts the reservation. In more detail, the reservation mediating section 8 of the reservation server 2d transmits a reservation request through the server network 4 to one of the other reservation servers 19a to 19e, while the one of the other reservation servers 19a to 19e accepts the reservation request transmitted through the reservation server 2d and conducts the reservation processing. When the user's reservation is realized, one of the other reservation servers 19a to 19e communicates the reservation completion through the other reservation situation notifying section 7 of the reservation server 2d to the user terminal 1.

Furthermore, at step E11, the reservation acceptance result in one of the other reservation servers 19a to 19e is displayed on the user terminal 1.

Incidentally, if the answers of the steps E3 and E8 show no securement of reservation, in these cases, the operational flow goes along the "No" route, resulting in making no reservation.

Thus, the reservation server 2d transmits event information and mediate reservation; therefore, the user can have larger selection in events.

(B4) Description of Fourth Modification of Second Embodiment of the Invention

In a fourth modification, a reservation server 2e (see FIG. 28) manages access log on reservation mediation and calculates introduction charges.

Figure 28:
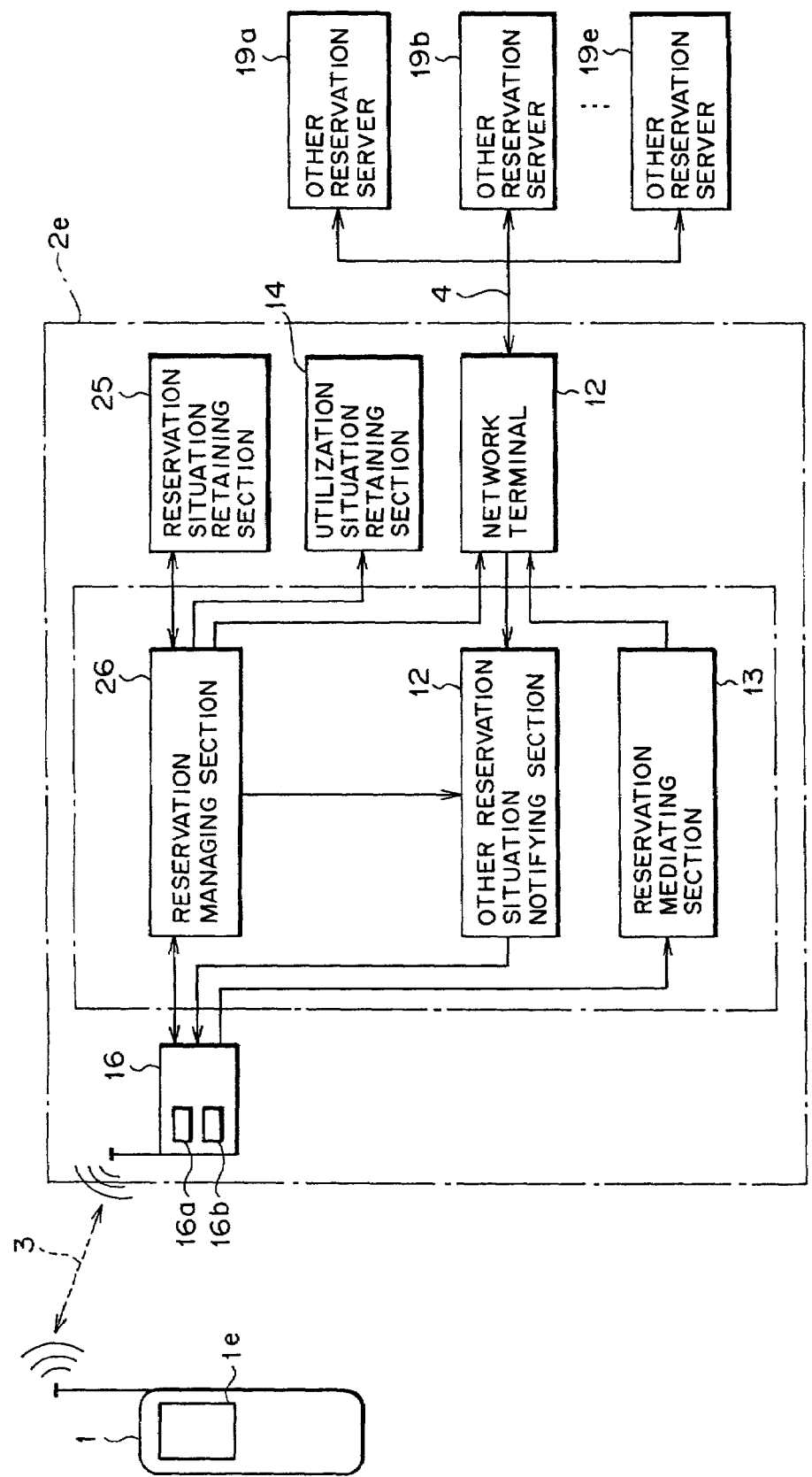
FIG. 28 is a block diagram showing a reservation server according to a fourth modification of the second embodiment of the invention.

FIG. 28 is a block diagram showing a reservation server according to a fourth modification of the second embodiment of the present invention. In FIG. 28, the reservation server 2e includes a reservation mediating section 13 and a utilization situation retaining section 14 in addition to the configuration of the reservation server 2a (see FIG. 18). In FIG. 28, the elements marked with the same reference numerals as those used above exhibit the same or similar features, and the description thereof will be omitted for avoiding the repeated explanation.

In FIG. 28, the reservation server 2e is equipped with a utilization situation retaining section 14 for retaining access log between the reservation server 2e and the other reservation servers 19a to 19e. This utilization situation retaining section 14 is made to calculate introduction charges on information provided from the other reservation servers 19a to 19e and offered to the reservation server 2e and introduction charges on information the reservation server 2e provided from the other reservation servers 19a to 19e, on the basis of access log, and to retain both of the calculated introduction charges.

That the reservation server 2e notifies users of the events in the other reservation servers 19a to 19e or mediates reservation is equivalent to supporting the business of the stores/facilities of the other reservation servers 19a to 19e. Therefore, the store/facility using the reservation server 2e can demand payment of compensation such as introduction charges from another store/facility which has been introduced or for which the reservation has been mediated.

The sum of the introduction charge can be set equally or can also be determined on the basis of the number of introductions or mediations. Therefore, each of the reservation servers 2e and 19a to 19e can obtain an introduction charge corresponding to the information volume.

In this case, as an evidence that the reservation server 2e has introduced the other reservation servers 19a to 19e or has mediated reservation for the other reservation servers 19a to 19e, there is a need to record the access log (which will hereinafter be referred to simply as "log"). Among ways to record this log, there are the following three methods (4) to (6).

(4) Method in which the log is recorded in the reservation server 2e.

(5) Method in which the log is recorded in the other reservation servers 19a to 19e.

(6) Method in which the log is recorded in the user terminal 1.

In the case of (4), the reservation server 2e and the other reservation servers 19a to 19e connected through the server network 4 can mutually mediate reservations. Therefore, each of the reservation servers 2e and 19a to 19e offsets the introduction/mediation charges in accordance with the calculation of the sum total so that one of two stores/facilities conducting more introduction/mediation demands payment from the other.

Accordingly, since the reservation servers 2e and 19a to 19e mutually mediate reservations, the user can receive higher value-added services. For this reason, the log is managed to allow easy handling.

In addition, the case of (5) can be also applied to the case of (4), and the log is recorded in each of the other reservation servers 19a to 19e.

Still additionally, in the case of (6) in which the log is recorded in the user terminal 1, when a store/facility confirms a reservation making manner, the log of the user terminal 1 is referred to as to whether the user has made reservation directly with respect to the reservation server 2e or has made reservation with respect to the other reservation servers 19a to 19e.

Incidentally, it is also possible to give introduction charge to the store having the reservation server 2e which has mediated reservation, on the basis of the charge paid by a user or the profit obtained from the user.

Figure 29:
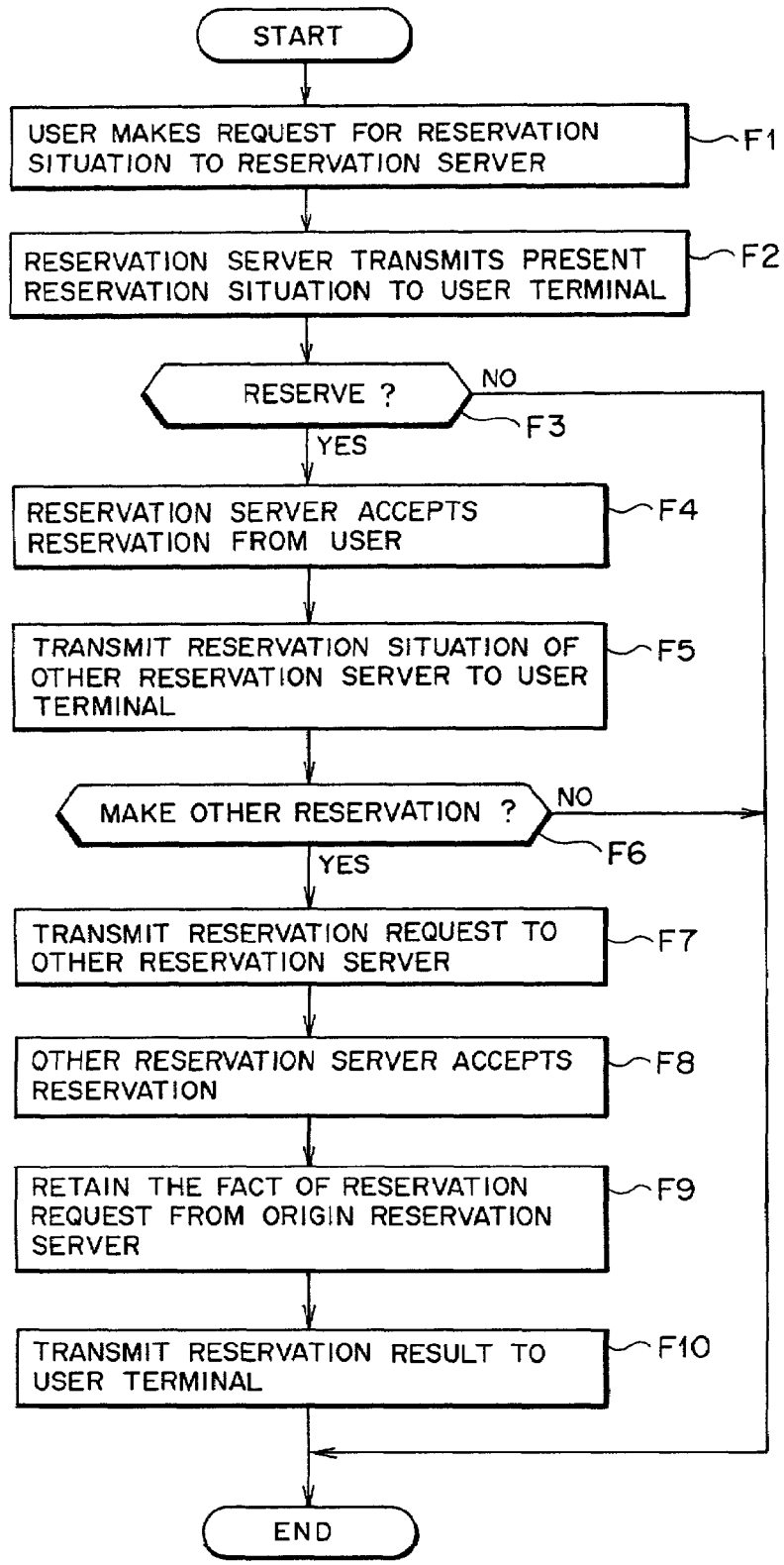
FIG. 29 is a flow chart for explaining a reservation method according to the fourth modification of the second embodiment of the invention.
Figure 30:
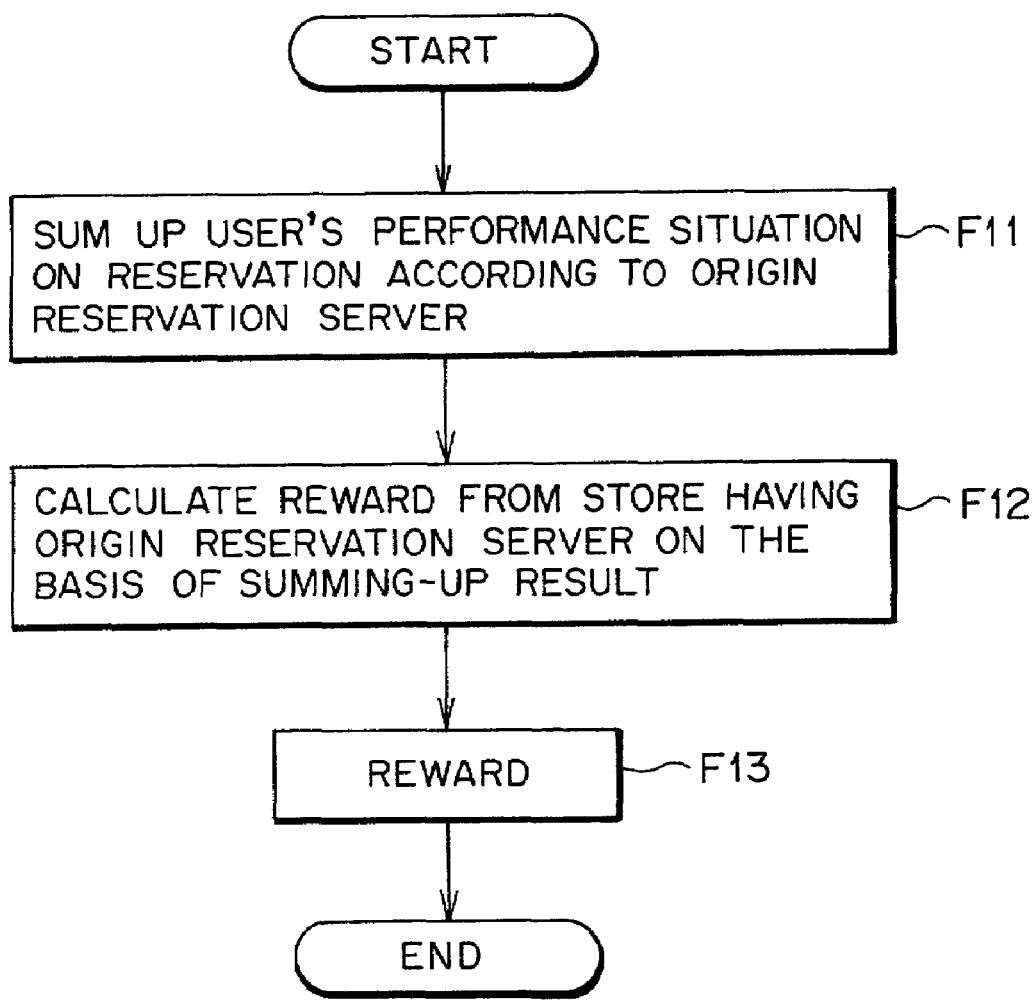
FIG. 30 is a flow chart for describing a calculation method for introduction charges according to the fourth modification of the second embodiment of the invention.

Referring to FIGS. 29 and 30, a detailed description will be given hereinbelow of a method of recording log in connection with each of the above-stated cases (4) to (6).

FIG. 29 is a flow chart for explaining a reservation method according to the fourth modification of the second embodiment of the present invention. First of all, a user issues a request for the present reservation situation to the reservation server2e (step F1). Subsequently, the reservation managing section 26 of the reservation server 2e has access to the reservation situation retaining section 25 to extract the present reservation situation (the number of vacant seats, a reservation situation of each seat, or the like) for transmitting it to the user terminal 1 (step F2). The user sees the reservation situation appearing on the user terminal 1 to make a decision as to whether or not to make reservation (step F3).

If the user makes the reservation, the operational flow advances along the "Yes" route, thereby transmitting the user's reservation making intention from the user terminal 1 to the reservation server 2e. Then, at step F4, the reservation server 2e accepts the reservation for the user. In more detail, the reservation managing section 26 of the reservation server 2e updates the reservation situation retained in the reservation situation retaining section 25, and when the reservation reaches realization, informs the user terminal 1 of this fact and further transmits the reservation request to the other reservation servers 19a to 19e.

At step F5, after the completion of the reservation, the other reservation situation notifying section 7 of the reservation server 2e notifies the user terminal 1 of the reservation situations of the other reservation servers 19a to 19e through the server network 4.

In addition, the reservation server 2e makes inquiries about the user's reservation making intention in addition to notifying of the information. At step F6, if the user makes reservation, the operational flow proceeds through the "Yes" route to step F7 where the user terminal 1 issues a request for the reservation in the other reservation server 19a to the reservation server 2e, and the reservation mediating section 13 of the reservation server 2e transmits a reservation request to the other reservation server 19a through the server network 4. At step F8, the other reservation server 19a accepts the reservation. In more detail, the other reservation server 19a processes the reservation in response to that reservation request.

Following this, at step F9, the utilization situation retaining section 14 of the reservation server 2e retains the reservation-mediation log representative of the reservation request transmitted from the origin reservation server. This origin reservation server signifies the server by which the user has made reservation. If the user has used the reservation server 2e, the origin reservation server is the reservation server 2e itself, while if the user has used the other reservation server 19a, the origin reservation server is the other reservation server 19a itself.

Thereafter, at step F10, when the user's reservation is completed, the other reservation server 19a notifies the user terminal 1 of the reservation completion through the other reservation situation notifying section 7 of the reservation server 2e.

Thus, since the log regarding each of the other reservation servers 19a to 19e is retained in the reservation server 2e, it is possible to calculate an introduction charge based on the reservation mediation. Moreover, the introduction charge is calculated periodically, for example, mostly on the basis of this log.

FIG. 30 is a flow chart for explaining a method of calculating an introduction charge according to the fourth modification of the second embodiment of the present invention.

First, the reservation server 2e sums up the user's reservation making situation at every server (according to origin reservation server) (step F11). That is, each of the other reservation servers 19a to 19e periodically sums up the made reservations on the basis of the reservation mediation log.

In addition, the reservation server 2e calculates a reward to each store/facility possessing the origin server (the reservation server 2e itself or each of the other reservation servers 19a to 19e), through which the reservations have been made, on the basis of the summing-up result (step F12), and gives the reward (step F13) to the store/facility.

Further, in addition to the reservation server 2e, when the other reservation servers 19a to 19e mutually mediate reservations, they offset the mediation charges on the basis of the summing result so that one store having larger introduction charge gives a reward to the other.

As described above, the reservation server 2e or each of the other reservation servers 19a to 19e can easily pay an introduction charge, thereby allowing the user to choose more events.

(B5) Description of Fifth Modification of Second Embodiment of the Invention

In a fifth modification, upon notifying the user terminal 1 of events of the other reservation servers 19a to 19e, a reservation server 2f (see FIG. 31) transmits not only store/facility information (reservation-needed service or reservation situation) but also data corresponding to a discount ticket (which will also be referred to hereinafter as "discount data") or data corresponding to a coupon ticket (which will also be referred to hereinafter as "coupon data").

Figure 31:
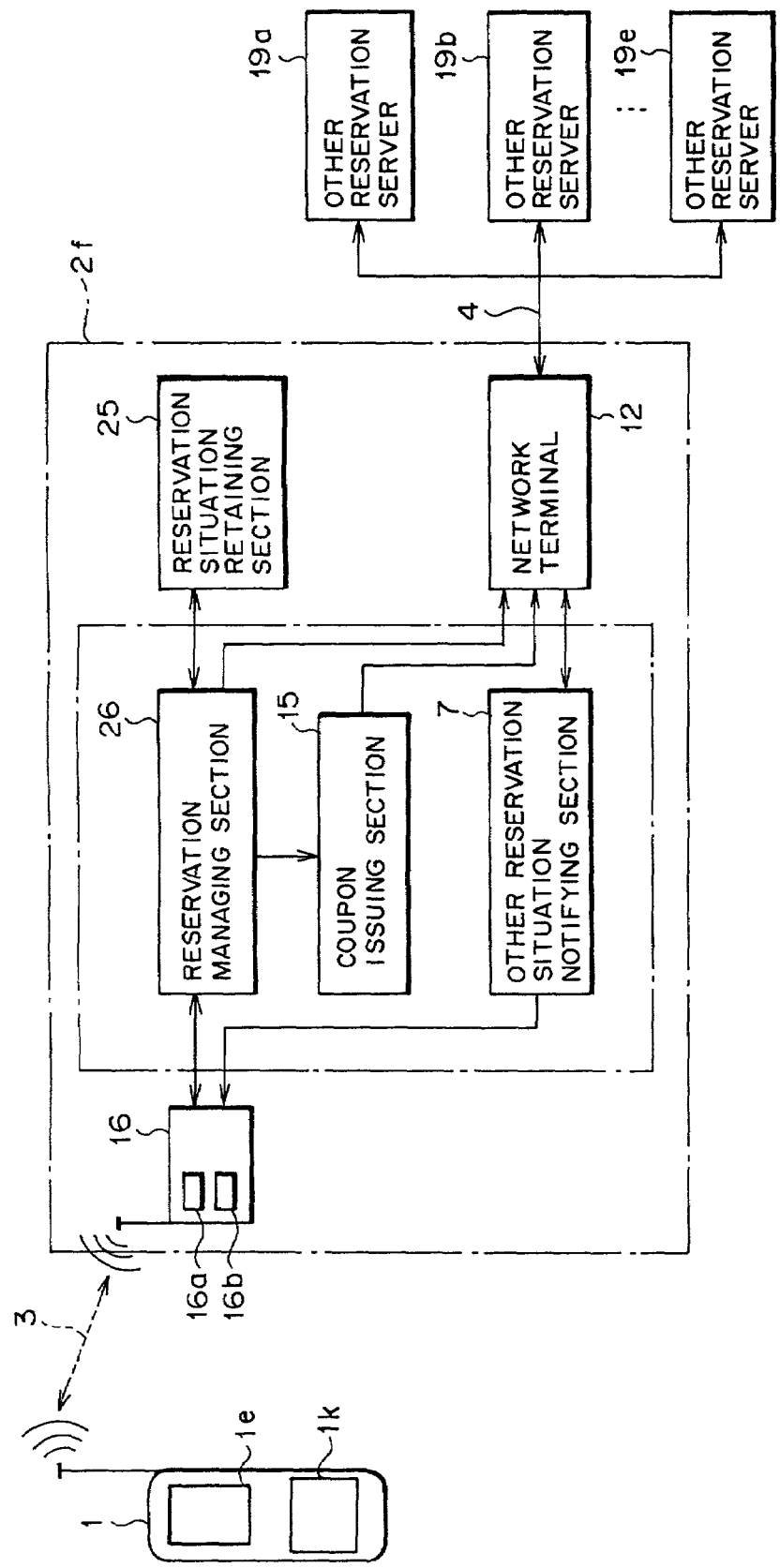
FIG. 31 is a block diagram showing a reservation server according to a fifth embodiment of the second embodiment of the invention.

FIG. 31 is a block diagram showing a reservation server according to a fifth modification of the second embodiment of the present invention. In FIG. 31, the reservation server 2f includes a coupon issuing section 15 in addition to the configuration of the reservation server 2a (see FIG. 18). The elements marked with the same reference numerals as those used above exhibit the same or similar features, and the description thereof will be omitted for avoiding redundancy.

The coupon issuing section (discount/value-added information generating section) 15 is for generating discount data (discount information) or coupon data (value-added information) on alternative event information, outputted from the alternative event information outputting section 12, to output discount information or value-added information to the transmitting section 16b.

This coupon issuing section 15 relays the coupon data transmitted from any one of the other reservation servers 19a to 19e toward the user terminal 1.

Meanwhile, in addition to the reservation server 2f, the user terminal 1 is also made to retain the discount data and the coupon data. The user terminal 1 shown in FIGS. 4 and 31 is equipped with a coupon retaining section 1k. This coupon retaining section discount/value-added information retaining section) 1k is made to retain the discount data or the coupon data from the reservation server 2f, received in the receiving section 1c.

Accordingly, when the reservation is realized, the reservation server 2f notifies the user terminal 1 of this fact, and at the same time, one of the other reservation servers 19a to 19e transmits the event retained in its own reservation situation retaining section 25 and the coupon data retained in the coupon issuing section 15 through the server network 4 to the reservation server 2f, with the reservation server 2f sending this coupon data to the user terminal 1.

In this way, at the introduction or reservation mediation, the coupon data of an another store is transmitted to the user terminal 1 to strongly encourage the user to utilize the introduced service.

Accordingly, the coupon data are accumulated in the coupon retaining section 1k of the user terminal 1 so that the user shows the displaying section 1e of the user terminal 1 to a clerk in a store/facility, thereby receiving the service indicated on the discount ticket or the coupon ticket.

Figure 32:
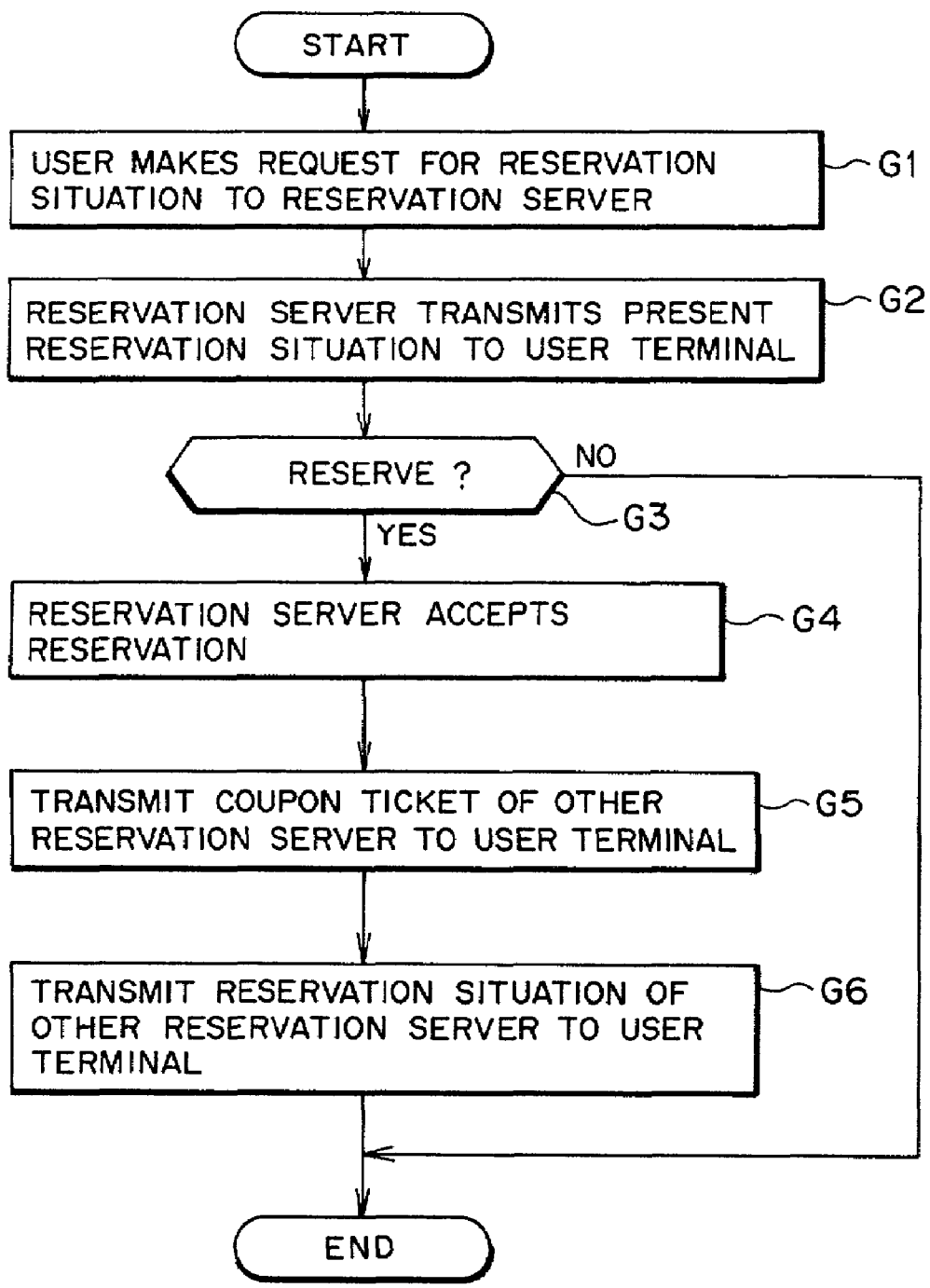
FIG. 32 is a flow chart for describing a reservation method according to the fifth modification of the second embodiment of the invention.

Referring to FIG. 32, a detailed description will be given hereinbelow of a reservation method for use in the system thus arranged according to the fifth modification of the second embodiment.

FIG. 32 is a flow chart for explaining a reservation method according to the fifth modification of the second embodiment of the present invention. First of all, through the use of the user terminal 1, a user issues a request for the present reservation situation to the reservation server 2f (step G1). Subsequently, the reservation server 2f notifies the user terminal 1 of the present reservation situation (step G2). In more detail, the reservation managing section 26 of the reservation server 2f has access to the reservation situation retaining section 25 to extract the present reservation situation (the number of vacant seats, a reservation situation of each seat, or the like) for transmitting it to the user terminal 1.

At step G3, the user sees the reservation situation appearing on the user terminal 1 to make a decision as to whether or not to make reservation. If the user makes reservation, the operational flow passes through the "Yes" route to enter into a process of step G4 where the reservation server 2f accepts the reservation. In more detail, the user terminal 1 communicates the user's reservation making intention to the reservation server 2f, and the reservation managing section 26 of the reservation server 2f updates the reservation situation retained in the reservation situation retaining section 25, and if the reservation is realized, the reservation managing section 26 informs the user terminal 1 of this fact.

Following this, at step G5, one or more of the other reservation servers 19a to 19e transmits the coupon data retained in the coupon issuing section 15 in addition to the event retained in their own reservation situation retaining section 25 through the server network 4 to the reservation server 2f, and this reservation server 2f transmits the coupon data to the user terminal 1. On the other hand, if the answer of the step G3 shows that the user terminal 1 does not make reservation, the operational flow goes to the step G5 through the "No" route.

Thereafter, at step G6, the reservation server 2f transmits the reservation situations of the other reservation servers 19a to 19e to the user terminal 1.

Thus, the user can show the coupon data retainined in the coupon retaining section 1k in the user terminal 1 to a clerk in a store, thus receiving the service indicated on the discount ticket or the coupon ticket.

(B6) Description of Sixth Modification of Second Embodiment of the Invention

A sixth modification relates to a case in which the reservation server 2 described in the first embodiment additionally has the respective functions of the reservation servers 2a to 2f described in the second embodiment and the first to fifth modifications of the second embodiment.

A service provider installs a reservation server 2 in the neighborhood of a store. A user gains access to this reservation server 2 through the use of the user terminal 1. At this time, if a waiting time occurs after reservation, the reservation server 2 inquires a reservation situation of a reservation server of another nearby store/facility such as a karaoke box, and sends the inquiry result to the user terminal 1.

That is, there are a case in which the reservation server 2 first offers information to the user terminal 1 and a case in which the user terminal first offers information to the reservation server 2.

In a reservation method according to the present invention, the user terminal 1 first inquires of the reservation servers 2 and 2a to 2f connected through the server network 4 to the user terminal 1 whether or not the user can receive a desired service which the user desires (inquiring step).

Subsequently, the reservation server 2 refers to store/facility information including a reservation-needed service and a reservation situation thereof or alternative event information on an event substituting for the reservation-needed service with respect to the desired service inquired in the inquiring step (reference step).

Following this, when the reference in the reference step shows that the user can utilize the desired service, the reservation server 2 transmits the details of the desired service to the user terminal 1 when it is possible for the user to receive the desired service as a result of the reference in the reference step, and transmits alternative store/facility information or alternative event information to the user terminal 1 when it is impossible for the user to receive the desired service (store/facility information transmitting step).

In this way, the user can initiatively receive a service.

In addition, it is also appropriate that the reservation server 2 mediates the reservations on the other reservation servers 19a to 19e in addition to transmitting the reservation situation to the user terminal 1. The reservation server 2 makes retrieval of a user terminal 1 existing in a communicable area, and transmits store information (dish information or reservation situation) or coupon data to the user terminal 1 in the communicable area, with the user receiving the information or the data and making reservation.

Thus, in the reservation method according to the present invention, the reservation server 2 first retrieves a communication-feasible user terminal of the user terminals 1 connected through the server network 4 to the reservation server 2 (communicable-feasible user terminal retrieving step).

Subsequently, the reservation server 2 transmits store/facility information including a reservation-needed service and a reservation situation of the reservation-needed service to the communication possible user terminal retrieved in the communication-feasible user terminal retrieving step (third transmitting step) Following this, the communication-feasible user terminal transmits, to the reservation server 2, information on a desired service by a user, among the reservation-needed services included the store/facility information transmitted in the third transmitting step (fourth transmitting step).

Since only the communication-feasible user terminal is selected, the service provider can advertise the service contents and the reservation situation at an appropriate timing, while the user can get the reservation situation on the store/facility he/she can visit directly.

In addition, the user terminal 1 is made to previously add a condition to the information from the restaurant 30 for displaying only the information meeting that condition. The user manipulates the user terminal 1 to input a desired time and the number of people or the kind of dish (Japanese style, French style, or the like) for displaying only the restaurant 30 satisfying these conditions. Accordingly, the user can more easily select a service or an event. Moreover, it is possible to prevent a queue from occurring intensively in front of a specified restaurant.

Meanwhile, when all seats are occupied and a long waiting time is expected, or when the desired time and the number of people or the kind of dish do not meet the user's desire, the reservation server 2 introduces an another store. That is, the reservation server 2 selectively makes access to the other reservation servers 19*a* to 19*e* to inquire the present situations of the stores/facilities near the user.

In addition, the reservation server 2 transmits, to the user terminal 1, the information indicating a short user waiting time and meeting the user's desired condition. In this case, the access-feasible range is limited with respect to the radio network 3 between the user terminal 1 and the reservation server 2.

Thus, since the reservation server 2 transmits the information from the other reservation servers 19*a* to 19*e* through the reservation server 2 itself to the user terminal 1 and the other reservation servers 19*a* to 19*e* accept the reservation, this reservation system 23 can enlarge the reservation acceptable area for the user.

Also, it is appropriate that the reservation server 2 not only waits for access from a user but also positively transmits data to the user. In this case, each store/facility can transmit coupon data through the other reservation servers 19*a* to 19*e* to the user terminal 1, which enhances the customer collection.

In addition, it is also possible to make a suggestion about a time zone after the completion of a service or an event reserved, in place of the waiting time. For example, the reservation server 2 suggests a drinking store (bar, or the like) after a meal or a store (pub) for a second party.

Therefore, the reservation server 2 has access to the other reservation servers 19*a* to 19*e* to present, to the user, store/facility information retained in the other reservation servers 19*a* to 19*e* or a reservation situation before and after the estimated end time of a service or an event. Moreover, it is also appropriate that the reservation server 2 not only makes a suggestion to the user but also mediate reservation. In this case, the reservation server 2 transmits the coupon data of that store/facility through the other reservation servers 19*a* to 19*e* to the user terminal 1.

As described above, the service provider can offer high-quality services to users, thus improving customer collection. Moreover, if preserving the access log, the reservation server 2 can demand payment of compensation, such as introduction charges, as rewards to stores the servers pertain to.

In addition, even if all seats are occupied or if a store does not satisfy the user's desire, the reservation server 2 mutually introduces the reservation contents with respect to the other reservation servers 19*a* to 19*e* connected through the server network 4, the reservation servers 1 and 19*a* to 19*e* can get-compensation such as introduction charges.

(C) Description of Third Embodiment of the Invention

In a third embodiment, in order to offer a service or an event to a user after reservation reaches realization, a reservation server 2*g* (see FIG. 33) transmits the contents retained in the reservation server 2*g* itself in place of acquisition from the other reservation servers 19*a* to 19*e*. For example, it retains information on a parade in a recreation ground, a bargain of a supermarket, or the like.

Figure 33:
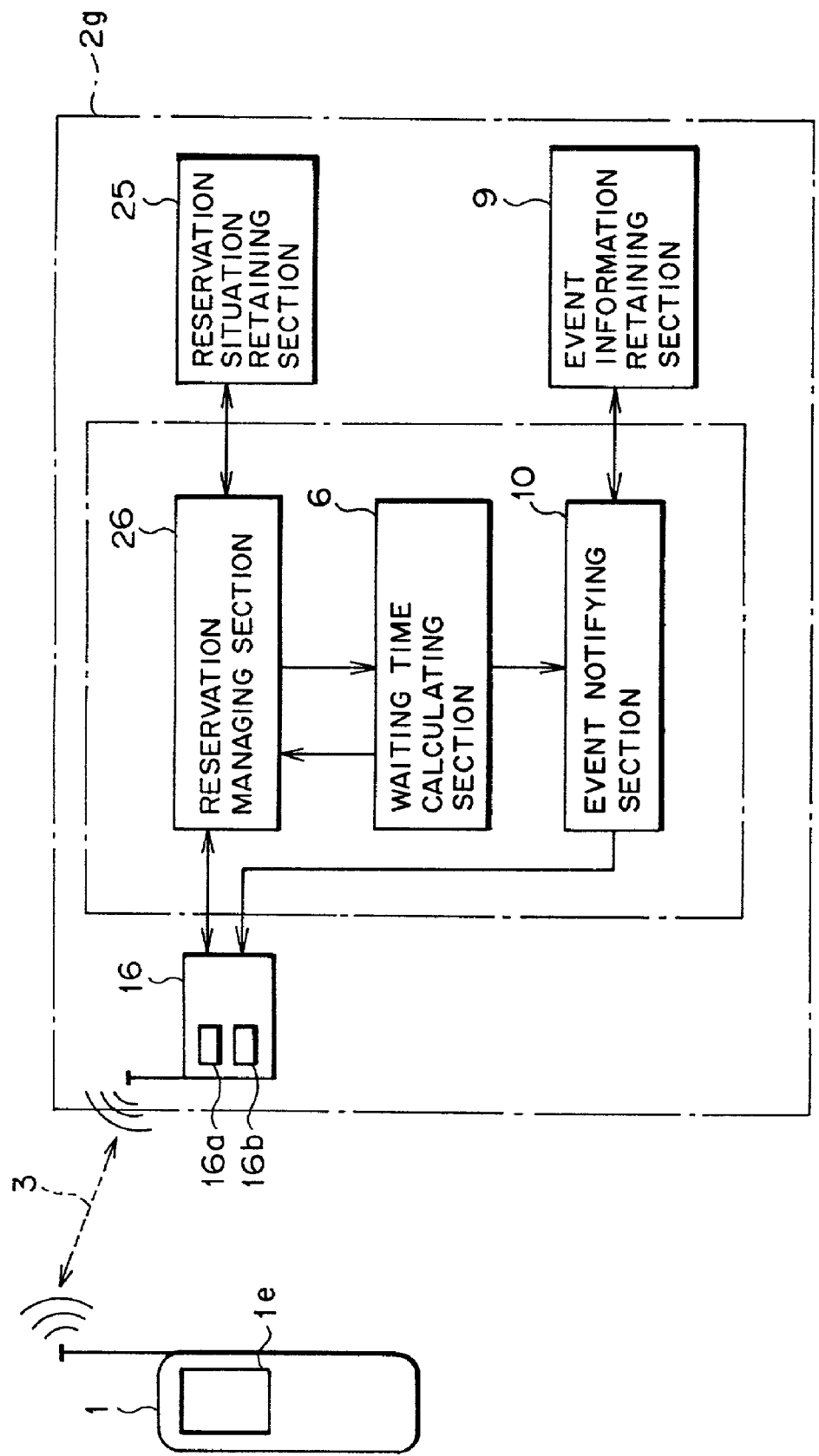
FIG. 33 is a block diagram showing a reservation server according to a third embodiment of the invention.

FIG. 33 is a block diagram showing a reservation server according to the third embodiment of the present invention. In FIG. 33, the reservation server 2*g* includes an event information retaining section 9 in place of the network terminal 12 of the reservation server 2*a* (see FIG. 18), and further includes an event notifying section 10 in place of the other reservation situation notifying section 7.

The event information retaining section 9 is capable of retaining and outputting alternative event information according to time zone, and is made to retain the alternative event information as an event table according to time.

The event notifying section 10 is for extracting performing event information from the alternative event information outputted from the event information retaining section 9 on the basis of the present time, and for outputting the extracted performing event information to the transmitting section 16*b*. This event notifying section 10 is also designed to be capable of extracting information on alternative events practicable within a user's waiting time.

In FIG. 33, the elements marked with the same reference numerals as those used above exhibit the same or similar features, and the description thereof will be omitted for avoiding the repeated explanation.

Accordingly, an alternative event information outputting section 12 is arranged as an event information retaining section 9 capable of retaining and outputting alternative event information according to time zone, and an other reservation situation notifying section 7 is arranged as an event notifying section 10 to extract performing event information from the alternative event information, outputted from the event information retaining section 9, on the basis of the present time, and for outputting the extracted performing event information to the transmitting section 16*b*.

Owing to this event notifying section 10, a user can receive a service in a time zone convenient to the user.

Figure 34:
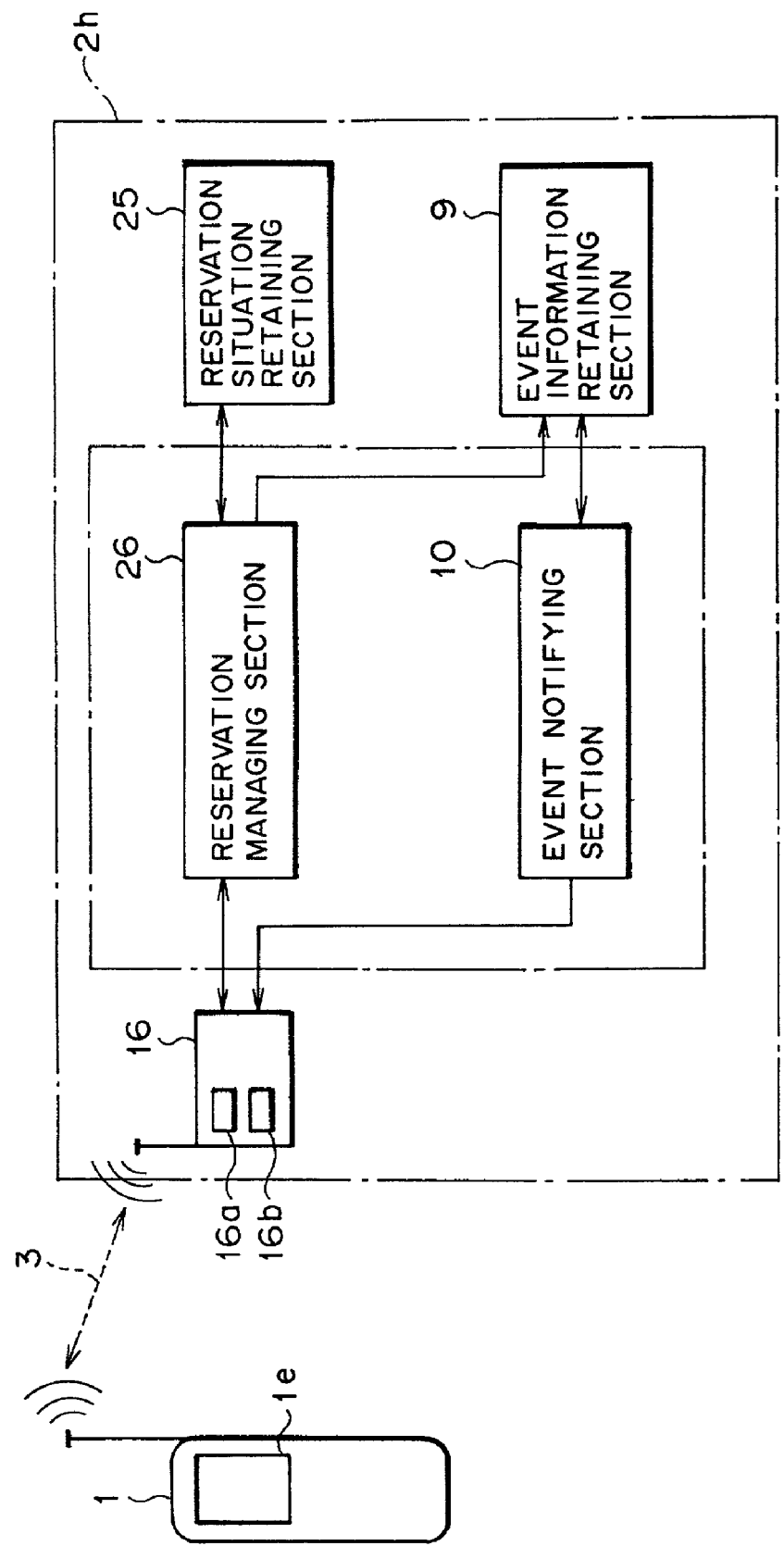
FIG. 34 is another block diagram showing the reservation server according to the third embodiment of the invention.

FIG. 34 is another block diagram showing a reservation server according to the third embodiment of the present invention. In FIG. 34, a reservation server 2*h* does not include a waiting time calculating section 6, unlike the reservation server 2*g* shown in FIG. 33.

Figure 35:
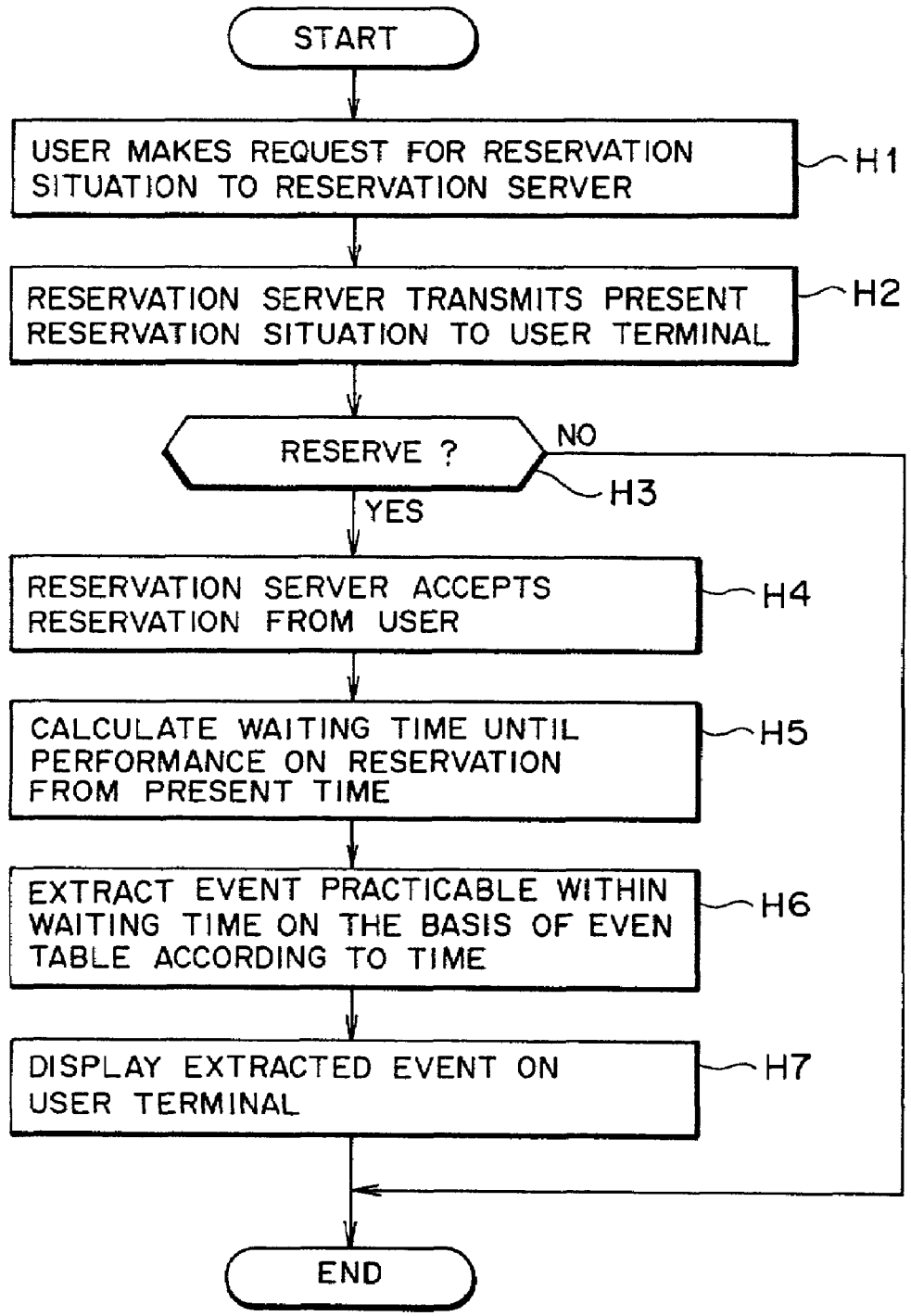
FIG. 35 is a flow chart for describing a reservation method according to the third embodiment of the invention.

Referring to FIG. 35, a detailed description will be given hereinbelow of a reservation method for use in the system thus arranged according to the third embodiment.

FIG. 35 is a flow chart for explaining a reservation method according to the third embodiment of the present invention. First of all, through the use of the user terminal 1, a user makes a request for the present reservation situation to the reservation server 2g (step H1). Subsequently, the reservation server 2g notifies the user terminal 1 of the present reservation situation (step H2). At this time, in the reservation server 2g, the reservation managing section 26 has access to the reservation situation retaining section 25 to extract the present reservation situation (the number of vacant seats, a reservation situation of each seat, or the like) for transmitting it to the user terminal 1. Then, at step H3, the user sees the reservation situation displayed on the user terminal 1 to make a decision as to whether or not to make reservation.

If the user makes reservation, the operational flow advances through the "Yes" route to step H4 where the reservation server 2g accepts the reservation made by the user. In more detail, when the user terminal 1 communicates the user's reservation making intention to the reservation server 2g, the reservation managing section 26 of the reservation server 2g updates the reservation situation retained in the reservation situation retaining section 25, and if the reservation reaches realization, notifies the user terminal 1 of this fact.

At step H5, the waiting time calculating section 6 of the reservation server 2g calculates a waiting time to be taken until the performance on the reservation is made, on the basis of the present time, and at step H6, extracts only events practicable within the waiting time from the event table retained according to time. Following this, at step H7, the event notifying section 10 of the reservation server 2g notifies the user terminal 1 of the event information retained in the event information retaining section 9. Incidentally, if the answer of the step H3 shows that the user does not make the reservation, the operational flow goes along the "No" route, resulting in making no reservation.

As described above, the reservation server 2g can transmit data retained in the reservation server 2g itself to the user terminal 1. In addition, a reservation method based on the reservation server 2h is similar to that of the reservation server 2g. Therefore, the description thereof will be omitted to avoid redundancy.

Secondly, a description will be given hereinbelow of reservation of an event with limited entries, such as an autograph session of an author.

Figure 36:
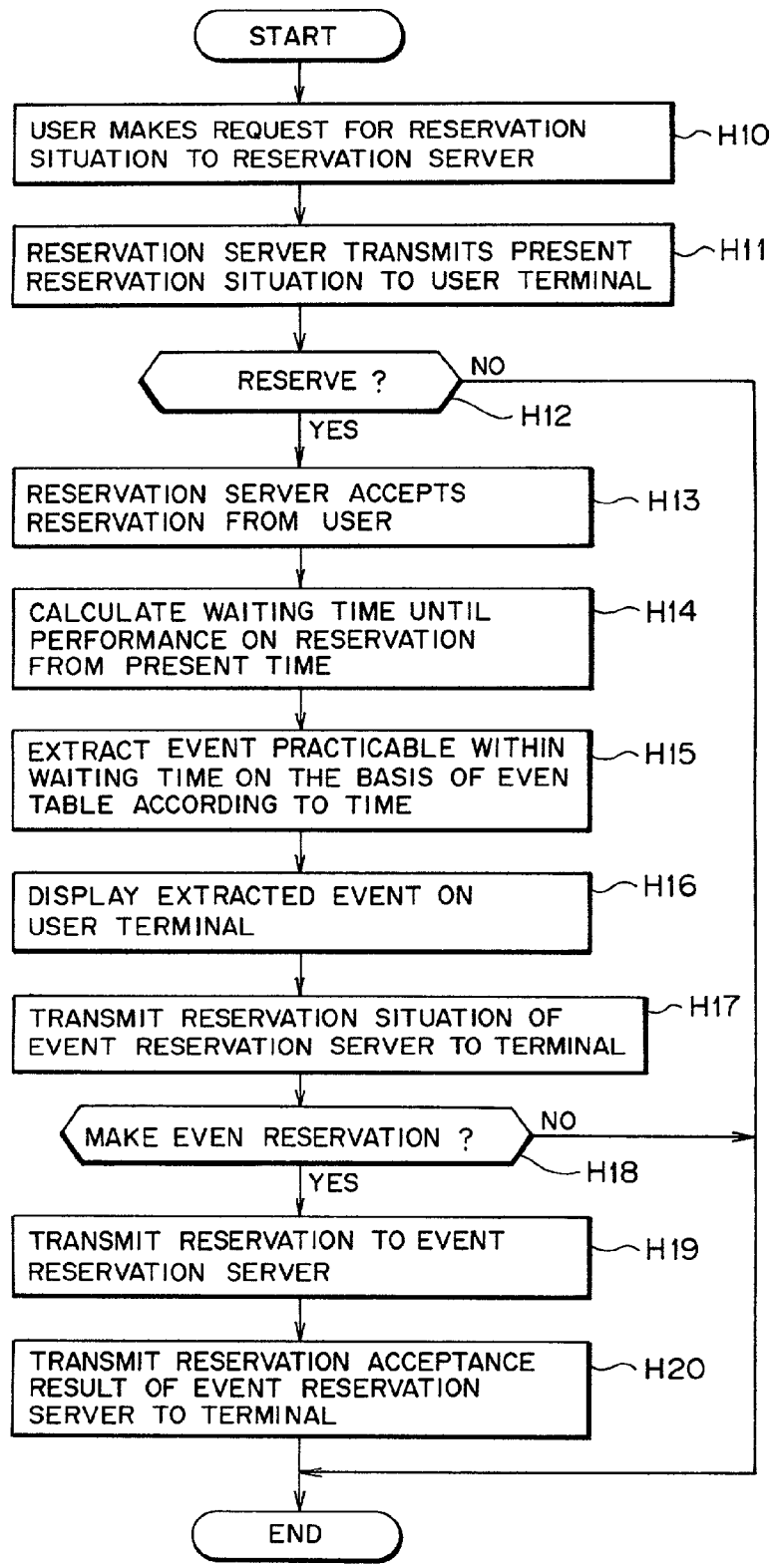
FIG. 36 is a flow chart for describing another reservation method according to the third embodiment of the invention.

FIG. 36 is a flow chart for explaining another reservation method according to the third embodiment of the present invention.

First of all, through the use of the user terminal 1, a user makes a request for the present reservation situation to the reservation server 2g (step H10). Subsequently, the reservation server 2g notifies the user terminal 1 of the present reservation situation (step H11). Then, the user sees the reservation situation displayed on the user terminal 1 to make a decision as to whether or not to make reservation (step H12) If the user makes reservation, the operational flow advances through the "Yes" route to step H13 where the reservation server 2g accepts the reservation made by the user. Following this, the waiting time calculating section 6 of the reservation server 2g calculates a waiting time to be taken until the performance on the reservation is made, on the basis of the present time (step H14), and extracts only events practicable within the waiting time, from the event table (step H15). In addition, the event notifying section 10 of the reservation server 2g notifies the user terminal 1 of the event information retained in the event information retaining section 9 so that the event appears on the user terminal 1 (step H16). The reservation server 2g inquires the presence or absence of the reservation of the user (step H17).

At step H18, if the user makes the reservation, the operational flow advances through the "Yes" route to step H19 where the user terminal 1 transmits the user's event reservation making intention to the reservation server 2g. At step H20, the reservation managing section 26 of the reservation server 2g makes the event reservation, and when the reservation reaches completion, the reservation server 2g informs the user terminal 1 of the reservation completion.

On the other hand, at the steps H12 and H18, if the user does not made the reservation, the operational flow proceeds along the "No" route, resulting in making no reservation. A reservation method using the reservation server 2h is similar to that of the reservation server 2g, and the description thereof will be omitted to avoid redundancy.

In a case in which each of a plurality of other reservation servers 19a to 19e connected through the server network 4 makes event reservation, the following processing (4-1) to (4-3) are conducted.

(4-1) Acquirable reservations are allocated previously to each of the reservation servers 2g, 2h and 19a to 19e.

(4-2) One event reservation server intensively makes event reservations.

(4-3) The reservation servers 2g, 2h and 19a to 19e distributively make the event reservations. In this case, the synchronization of two-phase commit is conducted concurrently. This two-phase commit synchronization signifies that, when two or more writing access occur simultaneously to one database, one is in the writing condition, the access by the other is inhibited.

With this processing, the source characteristics of the data are maintainable in the distributed database.

Thus, when the reservation server 2g, 2h notifies the user terminal 1 of an event, in which limitation is imposed on the entries, as alternative event information, the reservation for that event is also made; therefore, the user can reserve a higher-value-added event.

(D) Description of Fourth Embodiment of the Invention

In the first to third embodiments, the reservation server 2 (or 2a to 2h) gives information on the other reservation servers 19a to 19e to a user, whereas in a fourth embodiment, a reservation server 22 (see FIG. 37) makes a suggestion to a store/facility instead of the user on the basis of the present reservation situation.

For example, if there is a window where an operator is not placed and people come to a specified window, this fact is communicated to the reservation server 22 in order to increase the capacity by placing an operator in the operator-absent window.

Figure 37:
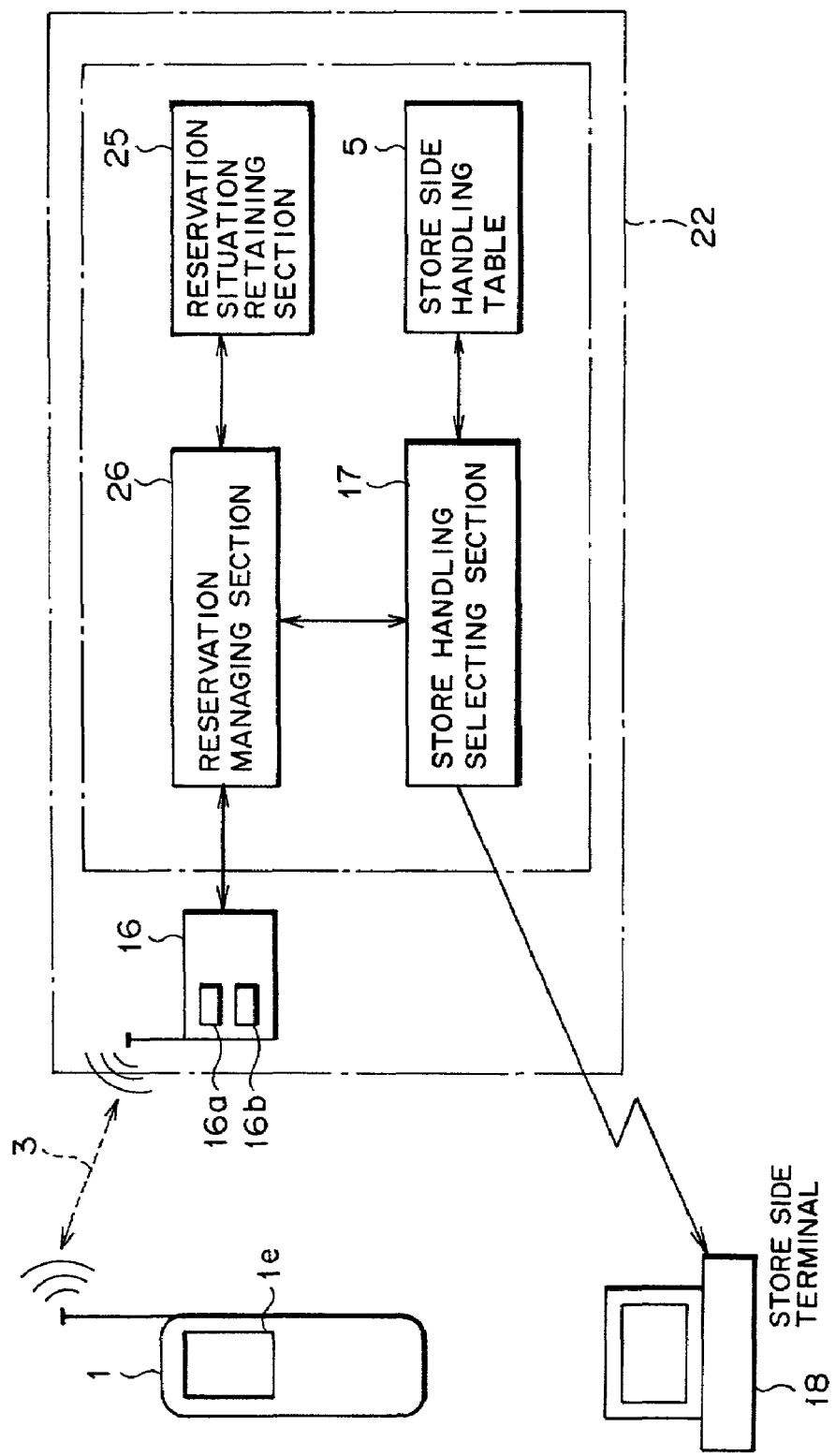
FIG. 37 is a block diagram showing a reservation server according to a fourth embodiment of the invention.

FIG. 37 is a block diagram showing a reservation server according to the fourth embodiment of the present invention. In FIG. 37, the reservation server 22 is equipped with a radio transmitter/receiver 16, a reservation managing section 26 and a reservation situation retaining section 25, and further provided with a store side handling table (handling table) 5 and a store handling selecting section 17. In addition, this reservation server 22 is connected to a store side terminal 18 installed in a store/facility for displaying information.

The reservation situation retaining section 25 is for retaining store/facility information including a reservation-needed service and a reservation situation of the reservation-needed service, and the store side handling table 5 retains handling scheme (solving approach) data on handling by a store/ facility according to a reservation situation of the store/facility information. These functions are realized by a hard disk.

The store handling selecting section 17 is for selecting desired handling scheme data among handling scheme data retained in the store side handling table 5, on the basis of a reservation situation retained in the reservation situation retaining section 25 to notify an another store/facility of the selected handling scheme data. This function is realized by a software.

In addition, the store handling selecting section 17 is made to read out the handling scheme data from the store side handling table 5, for example, in accordance with, of the reservation situation, a rate of change indicative of variation of the number of reservations for one hour and to output the handling-scheme data read out. In this case, the store handling selecting section 17 is made to output the handling scheme data in accordance with, for example, an increase in reservation number within one hour, which enables the monitoring of the number of reservations and the suggestion of handling to be employed by a store according to the present situation to the store. Accordingly, the store/facility can gain more profit and it is possible to provide a service meeting the desire of the user. In addition, the store handling selecting section 17 can use, as the rate of change, a rate of decrease of the number of reservations, for example, for one hour, with the load situation in a window being also seized on the basis of this rate of decrease.

Incidentally, in FIG. 37, the elements marked with the same reference numerals as those used above display the same or corresponding features, and the description thereof will be omitted for avoiding redundancy.

Thus, after the reservation is completed, the reservation managing section 26 calculates a rate of increase in the number of reservations for one hour, retained in the reservation situation retaining section 25, and the store handling selecting section 17 compares the rate of increase with the handling scheme data, retained in the store side handling table 5, to read out the handling scheme data for the store allocated to that reservation situation, with the data read out being displayed on the store side terminal 18.

In addition, in a reservation method according to the present invention, first, the user terminal 1 reserves a reservation-needed service through the reservation server 22 connected through the radio network 3 to the user terminal 1 (reserving step). Subsequently, the reservation server 22 detects that the rate of change of the number of reservations for the reservation-needed service reserved in the reserving step is equal to or more than a first threshold value, or equal to or less than a second threshold value (threshold detecting step).

When the answer of the threshold detecting step detects that the rate of change is equal to or more than the first threshold value, the reservation server 22 has access to the other reservation servers 19a to 19e which are connected through the server network 4 to make retrieval on a supernumerary store/facility having supernumerary staff (extra clerk), and when the answer of the threshold detecting step detects that the rate of change thereof is equal to or less than the second threshold value, the reservation server 22 has access to the other reservation servers 19a to 19e to make retrieval on a dispatch requiring store/facility requiring dispatched staff (supernumerary dispatch staff retrieving step).

Following this, the reservation server 22 issues a request for dispatch to the supernumerary store/facility retrieved in the supernumerary dispatch staff retrieving step or offers support to dispatch requiring store/facility retrieved in the supernumerary dispatch staff retrieving step (requesting/supporting step).

Thus, on the basis of the present reservation situation, the reservation server 22 can suggest appropriate handling (approach) to a store/facility.

Figure 38:
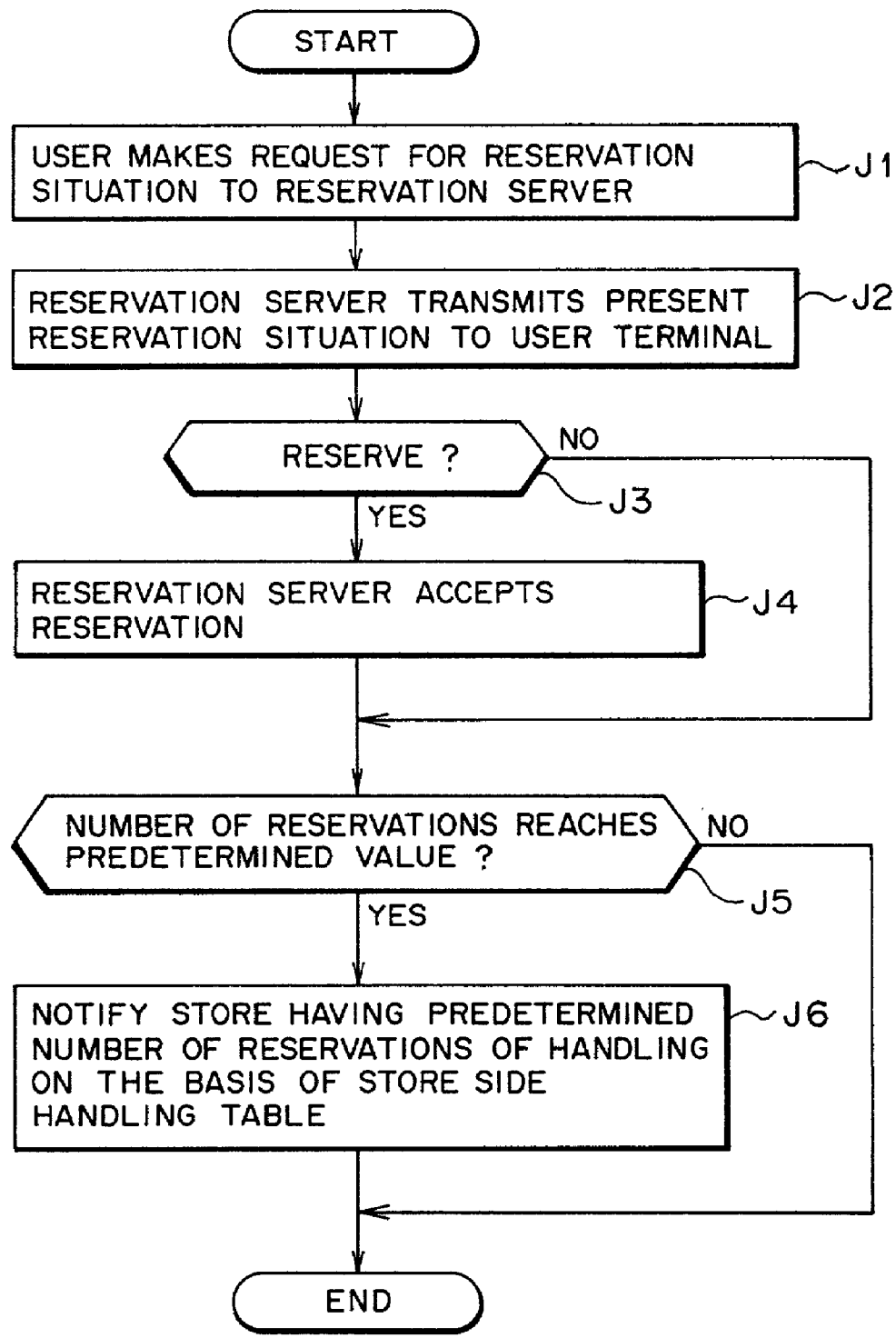
FIG. 38 is a flow chart for describing a reservation method according to the fourth embodiment of the invention.

Referring to FIG. 38, a detailed description will be given hereinbelow of a reservation method for use in the system thus arranged according to the fourth embodiment of the present invention.

FIG. 38 is a flow chart for explaining a reservation method according to the fourth embodiment of the present invention.

First of all, a user issues a request for a reservation situation to the reservation server 22 (step J1). The reservation server 22 transmits the present reservation situation to the user terminal 1 (step J2), and the user sees the reservation situation displayed on the user terminal 1 to make a decision as to whether or not to make reservation (step J3). If the user makes the reservation, the operational flow advances through the "Yes" route to step J4 where the user terminal 1 communicates the user's reservation making intention to the reservation server 22 and the reservation server 22 accepts the reservation. On the other hand, at the step J3, if the user does not make the reservation, the operational flow advances along the "No" route to reach step J5.

Thereafter, at step J5, a decision is made as to whether or not the number of reservations reaches a predetermined value. If the number of reservations has reached the predetermined value, the operational flow proceeds through the "Yes" route to step J6 where, on the basis of the store side handling table 5, the reservation server 22 notifies the store/facility having the number of reservations reaching the predetermined value of a solving approach (settlement) to be taken by the store/facility. Incidentally, if the number of reservations does not reach the predetermined value, the operational flow proceeds along the "No" route for terminating the processing.

Thus, the store/facility can alter the number of windows adaptively for locating the operators efficiently. In addition, hence, the store/facility can greatly improve the customer collection.

Furthermore, a description will be given hereinbelow of concrete examples.

When the number of reservations increases so that the number of people making a queue exceeds a predetermined value, the reservation server 22 suggests or proposes a solving approach to the store/facility according to the number of customers. In this case, the reservation server 22 is made to previously retain the following solving approaches (5-1) and (5-2).

(5-1) User accommodation such as cleaning of seats is made preferentially.

(5-2) A request for staff recruit is made to a store, having a smaller number of reservations, of nearby chain stores which are in cooperative relation to each other.

In the case of (5-2), the reservation server 22 gains access to the reservation servers of the chain stores to detect a store in which the clerks are in a supernumerary condition, of other nearby stores, and suggests a request for reinforcement to the store. Likewise, the reservation server of a supernumerary store (having extra staff) detects a store encountering the lack of staff to suggest dispatch of staff.

In conjunction with the personnel expenses for the reinforcement, the store receiving the reinforcement pays a predetermined sum or takes care of a sum corresponding to the number of people. Incidentally, in addition to the restaurant 30, this also applicable to other eating and drinking houses.

Accordingly, the store having supernumerary condition can reduce the personnel expenses, while the store receiving the dispatched staff can secure many clerks, thus handling excessive reservation.

(E) Description of Fifth Embodiment of the Invention

A detailed description will be given hereinbelow of a case in which the reservation system 23 according to the present invention described above in the first to fourth embodiments and the modifications thereof is applied to movie theaters (or theaters) In addition, first to fourth modifications of the fifth embodiment take charge of cases in which it is applied to recreation grounds, banks, public offices and means of transportation. Still additionally, in the description, the reservation server 2 in the fifth embodiment and the modifications thereof has the functions of the reservation servers 2a to 2h and 22.

A service provider, such as the owner of a movie theater, installs the reservation server 2 in the vicinity of a window for selling tickets. The users who have come to enjoy a movie use their own user terminal 1 to make access to the reservation server 2 through the radio transmitter/receiver 16 of the reservation server 2.

At this time, if a radio transmission means (Bluetooth or IEEE802.11) is used, the access between the user terminal 1 and the reservation server 2 does not require a physical inter-terminal connection, which improves the user's convenience. The reservation server 2 notifies the user terminal 1 of a reservation situation on a movie the user desires. Referring to FIGS. 39 to 45, a description will be given of examples in which a reservation situation appears on a displaying section 1e.

Figure 39:
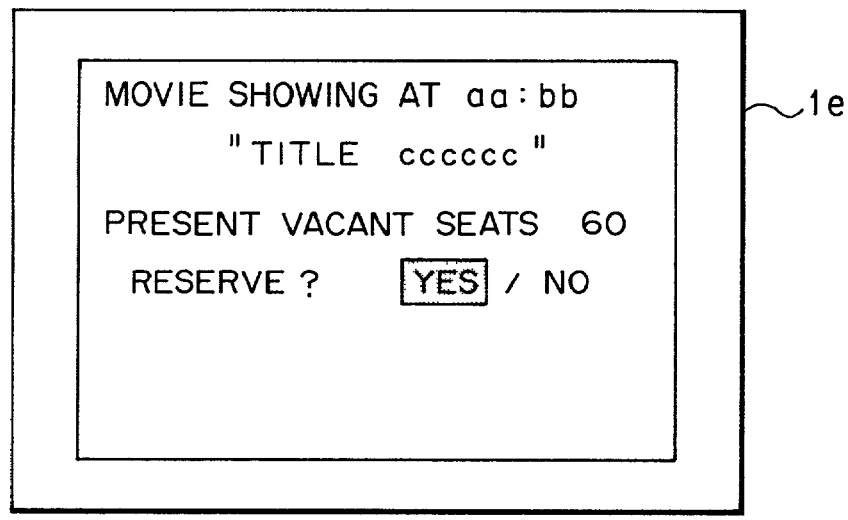
FIG. 39 is an illustration of an example of display of a reservation situation based on rate-of-reservation information according to a fifth embodiment of the invention.

FIG. 39 is an illustration of an example of display of a reservation situation based on reservation rate information according to the fifth embodiment of the present invention. A user can find out the number of vacant seats, for example, sixty seats, through the reservation server 2 and make a choice "Reserve? Yes/No" or the like.

Figure 40:
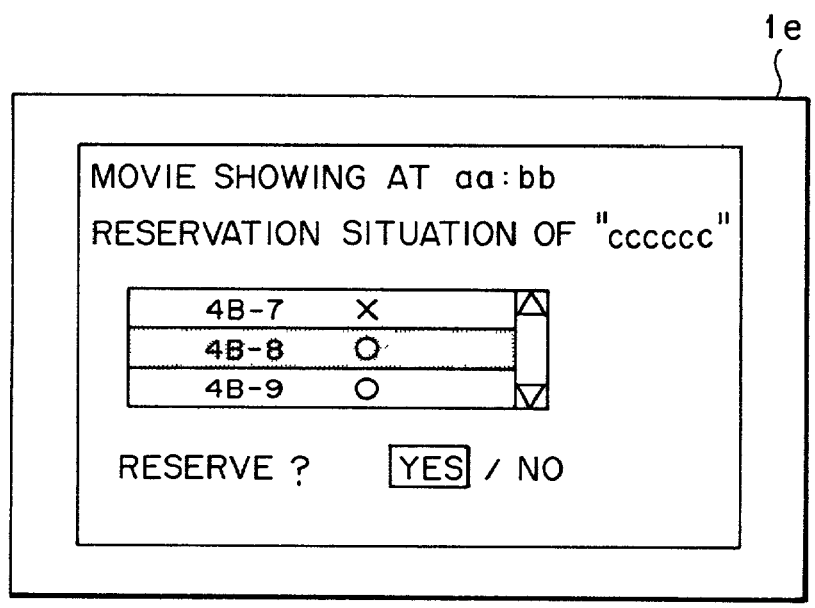
FIG. 40 is an illustration of an example of display of a reservation situation based on seat numbers according to the fifth embodiment of the invention.

FIG. 40 is an illustration of an example of display of a reservation situation based on seat numbers according to the fifth embodiment of the present invention, showing an individual reservation situation list of seat numbers (4B-8) of a movie theater. A user makes reservation through the reservation server 2 on the basis of this list; hence, the user can readily find out the distance between the seats and secure four successive seats.

Figure 41:
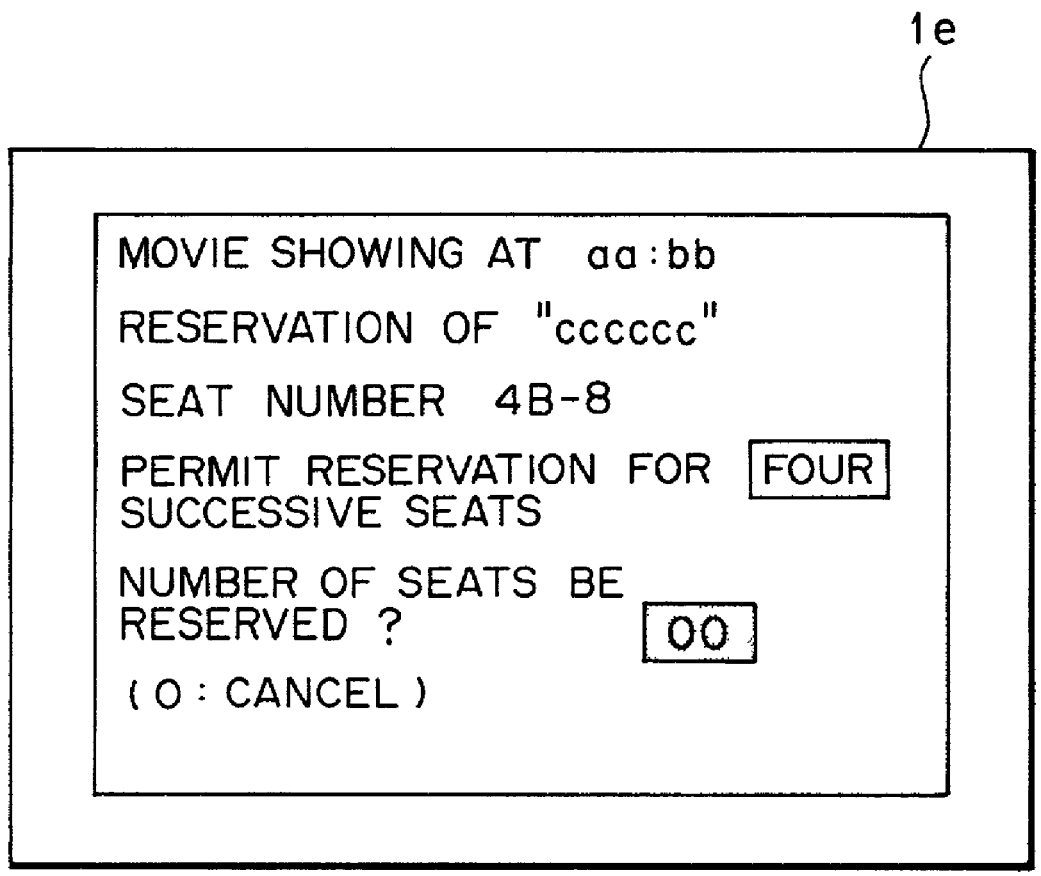
FIG. 41 is an illustration of an example of display of a reservation request according to the fifth embodiment of the invention.

FIG. 41 is an illustration of an example of display of reservation according to the fifth embodiment of the present invention. In this case, a user can make reservation for tickets not exceeding the number of tickets reserved.

FIGS. 42(A) and 42(B) are illustrations of examples of display in the cases of all seats being occupied, according to the fifth embodiment of the present invention. FIG. 42(a) is an illustration of display in a case in which the reservation a user desires is infeasible. In this case, the reservation server 2 suggests reservation of subsequent screening, and suggests a choice between reservation in another movie theater and cancellation.

In an example shown in FIG. 42(b), the reservation server 2 notifies a user of another nearby movie theater showing the same movie and distance information thereon.

Furthermore, as stated above with reference to FIG. 3, the other reservation servers 19a to 19e installed in stores are connected through the server network 4 to each other to have access to each other. Accordingly, when a user cannot make a desired reservation because of all seats being occupied, the reservation server 19a suggests another screening movie in the same movie theater or has access to the reservation server 19e of a movie theater nearby to make reservation of a seat.

Thus, the first reservation server 19a can make access to the reservation server 19e of the nearby movie theater to suggest, to the user, the reservation situation on the same movie as that the user desires or a movie different therefrom.

In addition, as mentioned above, in the reservation system 23, even if the service or event the user desires is now infeasible, the service provider can suggest, to the user, alternative event information on a nearby store/facility accessible to the user from the present position at that time.

Then, after the reservation reaches realization, the reservation server 19a of that movie theater transmits, to the user terminal 1, information on a nearby restaurant 30 and a reservation situation managed in the reservation server 2 installed in that restaurant 30 so that the contents thereof appears on the user terminal 1.

In this case, the reservation server 2 calculates, as a user's waiting time, the difference between the present time and the start time of a movie reserved by the user to suggest only stores/facilities practicable to the user within the waiting time.

Accordingly, the user can receive a more realistic alternative service or event, while the reservation servers 19a to 19e can suggest an appropriate alternative service.

FIG. 43(a) is an illustration for explaining a suggestion time according to the fifth embodiment of the present invention. As shown in FIG. 43(a), a reservation server 19a of a movie theater has data on a screening start time and a screening end time. First, the reservation server 19a calculates, on the basis of this data, that the waiting time is "one hour and fifteen minutes". Subsequently, the reservation server 19a gains access other nearby facilities, for example, a reservation server 2 of a restaurant 30, a reservation server 19b of a karaoke box, a reservation server 19c of a bowling alley, a reservation server 19d of a coffee shop and a reservation server 19e of another movie theater, thereby making out a timetable on the facilities.

FIG. 43(b) is an illustration of a timetable on facilities according to the fifth embodiment of the present invention. For example, the reservation server 19 makes out a timetable indicating a situation of a coffee shop, that is, the moving time from the present position to the facility is fifteen minutes, the user's waiting time is ten minutes and the eating time being the performance time in the coffee shop is sixty minutes.

Figure 44:
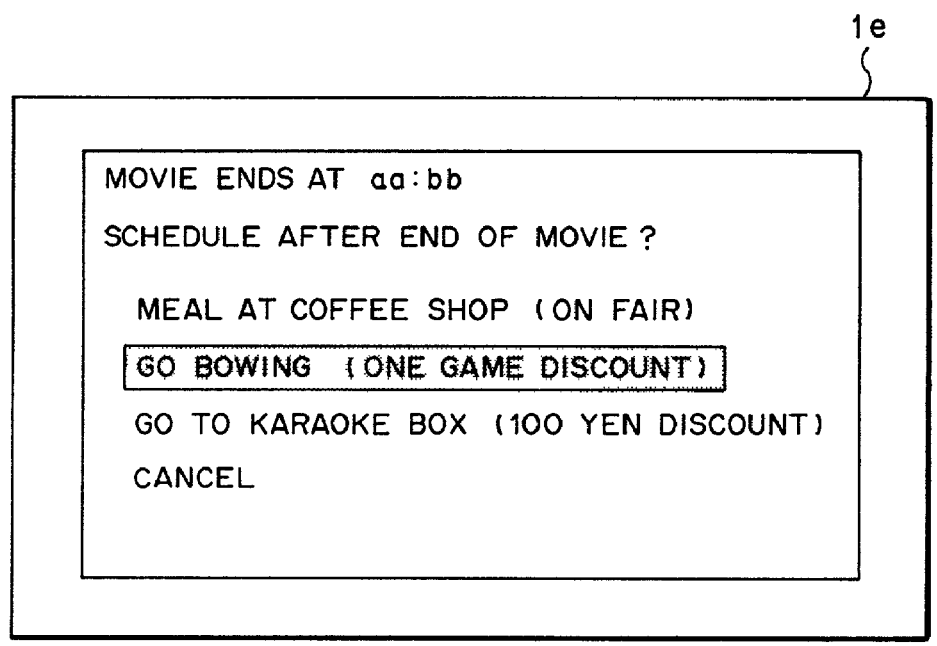
FIG. 44 is an illustration of an example of a screen of a user terminal according to the fifth embodiment of the invention.

FIG. 44 is an illustration of an example of a screen of the user terminal 1 according to the fifth embodiment of the present invention. A user can make a selection from "meal in restaurant 30", "karaoke box" and "cancel" appearing on the displaying section 1e as shown in FIG. 44.

Thus, the reservation server 2 can suggest a waiting time to a user. Moreover, the user can make efficient use of the waiting time.

In addition, in connection of this suggestion, coupon data corresponding to a coupon ticket of a store/facility is transmitted to the user terminal 1. The reservation server 2 transmits coupon data corresponding to "one drink service" to the user who has selected "meal in restaurant 30" in FIG. 44. In addition, by showing the service ticket appearing on the user terminal 1 to a clerk in the restaurant 30, the user can get the one-drink service.

Still additionally, in FIG. 44, it is also possible to transmit coupon data equivalent to "one-hundred yens discount" to the user who has selected "karaoke box".

Thus, the reservation server 19a can notify the user of the reservation situations of the reservation servers 19a to 19e connected through the server network 4 in addition to the reservation situation the reservation server 19a itself manages.

Accordingly, since the service provider suggests the value-added information such as a coupon ticket to the user, it is possible to strongly promote that the user utilizes the suggested facility, thus developing the customer collection.

Moreover, if a service provider such as the owner of a store/facility especially aims at the users existing in the neighborhood of the location of the reservation server 2, then the service provider can catch the users in his/her own business zone, while the user can make efficient use of his/her waiting time.

Accordingly, upon making reservation in utilizing a store/facility, through the use of the user terminal 1, a customer inquires of the reservation server 2 whether a desired service is acquirable or not, and if it is possible to provide a service a customer desires, a service-providing store/facility provides the service immediately. On the other hand, if it is impossible to provide that service or if a waiting time occurs until providing that service, the store/facility can offer an alternative event or another service practicable within the waiting time.

Secondly, a description will be given hereinbelow of a mediation log.

Since the reservation server 2 retains the log on mediation of reservation in the reservation, the service provider can demand a reward (compensation) to the mediation from the reservation servers 19a to 19e.

When the reservation server 19a (see FIG. 3 and so on) of a movie theater has introduced 3,000 people/month to the restaurant 30 and, of these users, 300 people corresponding to 10% have reached reservation realization, the movie theater demands the following compensations (6-1) and (6-2) from the restaurant 30.

(6-1) Introduction charges of 3,000 people
(6-2) Reservation reward of 300 people In this case, for example, the introduction charge is calculated uniformly as 5 yens/person, and the reservation reward is calculated uniformly as 3% of the average profit/person in the restaurant 30.

In addition, it is also possible that the reservation reward is determined in accordance with the paid money. In this case, the reservation server 2 of the restaurant retains the payment situation of a user who has reserved through the reservation server 19a of the movie theater, and a value obtained by multiplying the total sum of the paid money by a predetermined rate (%) is set as the reservation reward.

As described above, by introducing users to an another facility, the movie theater can gain the compensation for the introductions. Likewise, the other reservation servers 2 can gain the introduction charge and the compensation.

A description will be given hereinbelow of a time of an event to be introduced.

Although in the above-mentioned example the service provider suggests an event to the user in connection with a waiting time until the screening of a movie, it is also possible to make suggestion with respect to a time zone after the screening end time of a movie. A further description will be given hereinbelow with reference to the waiting time calculating table shown in FIG. 19(a) and the timetable shown in FIG. 19(b).

A reservation method according to the present invention comprises three steps. First, the reservation server 19a of the movie theater calculates the user's waiting time as "one hour and fifteen minutes" on the basis of the waiting time calculating table shown in FIG. 19(a). Secondly, the reservation server 19a has access to the reservation servers 2 and 19a to 19e installed in nearby stores/facilities such as restaurant 30, coffee shop, karaoke box and bowing alley to make out the timetable shown in FIG. 19(b). Thirdly, the reservation server 19a suggests a plurality of events practicable to the user within the time until the next movie screening time.

Figure 45:
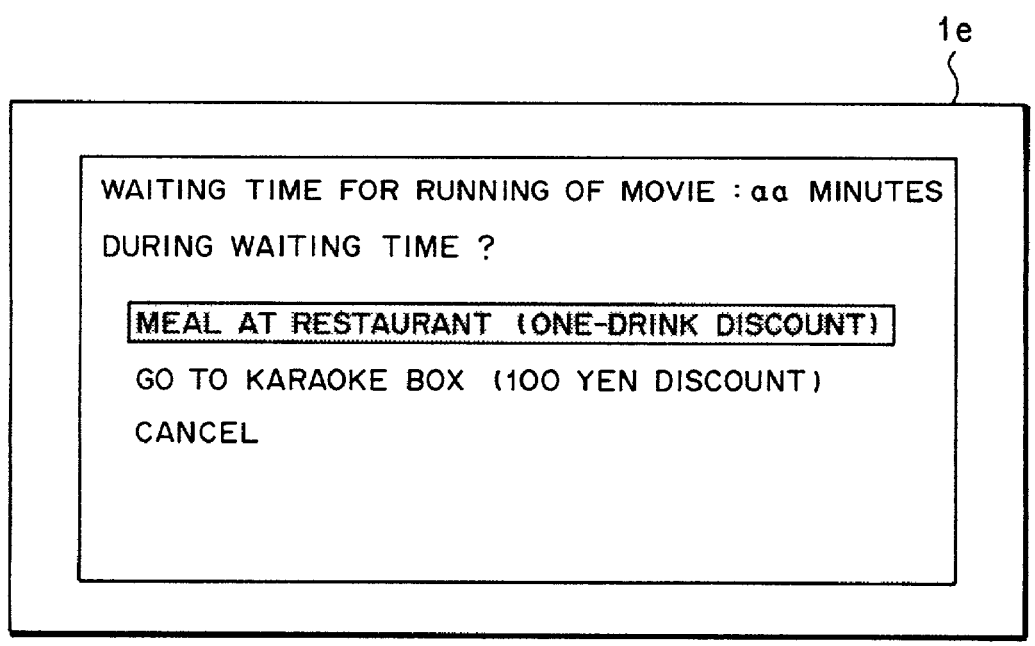
FIG. 45 is an illustration of one example of suggestion contents after completion of a service or event according to the fifth embodiment of the invention.

FIG. 45 is an illustration of an example of the contents of a suggestion after the end of a service or event according to the fifth embodiment of the present invention. The reservation server 19a extracts "practicable meal in restaurant" and "karaoke box" on the displaying section 1e, shown in FIG. 45, as events practicable to the user after the completion of the screening, and transmits and suggests these events to the user terminal 1.

In such a case in which the restaurant 30 is temporarily closed, the waiting time becomes longer than a predetermined time period, and hence the reservation server 19 cancels the service contents without suggesting them, or shows the long waiting time to the user. Accordingly, this can provide a service to even the user whose desires a meal in the restaurant 30 strongly.

Moreover, even in a case in which the reservation server 2 makes a suggestion after the end of a service or event, it is possible to mediate reservation in addition to making the suggestion. That is, the user makes reservation through the reservation server 2 with respect to the reservation servers 19a to 19e.

At the completion of the event or service the user is receiving, the reservation server 2 shows a situation of a nearby facility to the user on the basis of the position of the user; therefore, it is possible to make a suggestion on user's activities after the completion of the event or service.

A description will be given hereinbelow of a method of an introduction method from the reservation server 2 to the user terminal 1.

In the above-described example, the user terminal 1 first has access to the reservation server 2 to get information for making reservation. On the other hand, it is also possible that the reservation servers 2 and 19a to 19e first transmit information to the user terminal 1.

With this arrangement, the reservation server 2 retrieves a user existing within a radio communication-feasible area (10 m to 100 m in radius in the case of the Bluetooth) and transmits movie information or reservation situation to the user terminal 1 in the communication-feasible area. In addition, the user selects desired one from the transmitted contents. These contents are removed by a deletion manipulation by the user, and when the user terminal 1 does not have access to the reservation server 2 until the start time of the service, they are also removed from the user terminal 1. Accordingly, it is possible to prevent the unnecessary information from accumulating in the user terminal 1.

As described above, a user can receive movie information while walking without conducting special manipulation, while a service provider can transmit information to many and unspecified persons.

In addition, on the basis of the present position of the user, the reservation servers 2 and 19a to 19e can transmit the reservation situation retained therein to the user existing in the communicable area of the radio network 3 for making a suggestion on user's activities after that time.

Furthermore, a description will be given hereinbelow of handling to be employed by a store in accordance with a reservation situation.

It is also possible to change the handling by a store/facility in accordance with a situation of reservation the reservation server 2 accepts. For example, this is useful in the case of a combined movie theater (cinema complex) comprising a plurality of movie theaters.

That is, the reservation server 2 of a combined movie theater prepares the relationship between a rate of increase of customers and handling by a store/facility as an association table stated in the following (7-1) to (7-7), where each of A, B, C and D represents a predetermined threshold value for each movie theater.

(7-1) rate of increase<A

When the rate of increase is less than the threshold value A, the movie theater continues the running of a movie in the current condition (this situation will sometimes be referred to hereinafter as "in the current condition")

(7-2) A≦rate of increase<B

When the rate of increase equal to or more than the threshold value A but is less than the threshold value B, the movie theater shifts a showing movie to a movie theater having a larger seating capacity. When the rate of increase is D (A<D<B), it is also possible to suggest that the movie is to shift and show at a movie theater with a larger seating capacity.

(7-3) B≦rate of increase<C

In a case in which jam occurs, the movie is temporarily puts on the screen at another movie theater.

(7-4) rate of increase≧C

The movie is put into all-night screening.

In addition, it is also possible to prepare not only one association table but also a plurality of association tables.

Moreover, for example, a service provider such as the owner of a movie theater can advertise a service to users in accordance with a rate of increase as stated in the following (7-5) to (7-7), where X and Y denote threshold values, respectively.

(7-5) rate of increase<X

The movie theater announces 200 yen discount to users.

(7-6) X≦rate of increase<Y

The handling is kept in the current condition.

(7-7) rate of increase>Y

The movie theater positively announces the many reservations to users.

Thus, when the present rate D of increase in the number of reservations is such that D>Y, the reservation server 19*a* of a movie theater transmits the fact of "that movie is popular and all seats will be occupied soon" to the user terminal 1 to suggest enjoying the movie. In addition, it is also possible to suggest to the store/facility that "the movie to be put on the screen should be shifted to a movie theater with a larger seating capacity".

On the other hand, when the rate E of increase is such that E<X and E<A, the reservation server 19*a* makes no suggestion to a store/facility ("in the current condition"). In this case, for fear of a small number of customers and a low profit, a service provider (the owner of a movie theater) lowers the price to increase the number of users for increasing the profit.

In addition to the movie theater, this is also applicable to concerts, stages, circuses, dinner shows, and sports watching such as baseball and soccer. That is, for these events, the start time is fixed and the end time is fixed or estimable and even another store/facility exists in the neighborhood, and for this reason, these events are practicable as well as the movie theater.

In this connection, it is also appropriate that the situation data on the store/facility transmitted from the reservation server 19*a* to a user is removed from the user terminal 1 in accordance with the time at which the user terminal 1 is disconnected from the reservation server 19*a*. In addition, it is also appropriate that it is removed from the user terminal 1 after the elapse of a predetermined period of time. Still additionally, it is also appropriate that the information on the realization of the user's reservation is kept until the user actually receives the service because it serves as a ticket or numbered ticket.

Thus, since the nearby store/facility is introduced on the basis of the position of the user, the service provider can make expectation with high accuracy for the near future and hence can suggest handling agreeing to the expectation to the store/facility.

(E1) Description of First Modification of Fifth Embodiment of the Invention

A description will be given hereinbelow of an example in which the present invention is applied to a recreation ground.

A waiting queue occurs for each attraction in a recreation ground. A service provider installs the reservation server 2 in the vicinity of each attraction for accepting reservation for each attraction.

With this arrangement, a user makes reservation to the reservation server 2 (which will also be referred to hereinafter as a "server J") for getting in a roller coaster through the use of the user terminal 1. After the reservation is realized, the server J notifies the user of a reservation situation of a nearby attraction such as a big wheel, a roller coaster, a boat, or the like.

In addition, after the reservation, the server J gains access to a server for another attraction in connection with a waiting time until his/her turn comes, and suggests, to the user, another attraction practicable to the user within the waiting. At this time, in addition to suggesting the attraction, the server J mediates reservation for an another attraction, such as a reservation server 2 (which will sometimes be referred to hereinafter as a "server BT") for a boat, through the server J itself.

Incidentally, it is also appropriate that, without waiting for access from the user, the server J retrieves the user terminal 1 existing in a communicable area of the radio network 3 to positively give information to the user terminal 1 existing in the communicable area.

Furthermore, an entertainment such as a parade limited in time is also held in the recreation ground. In addition to the access to the reservation servers 19*a* to 19*e*, the server J has a timetable retaining a schedule on an entertainment limited in time, and notifies the user terminal 1 of the event feasible within the waiting time.

With this arrangement, the server J can also suggest, to the user, an attraction after the end time of a service or event in place of the waiting time. The server J estimates the end time of an attraction by adding a waiting time to the performance time of the attraction on the basis of the present time, and makes access to the reservation servers 19*a* to 19*e* on the basis of the estimated end time to suggest, to a user, a reservation situation and an attraction practicable after the estimated end time.

In addition to the suggestion to the user, the server J can make reservation. The server J transmits a reservation request from the user through the server network 4 to the server BT. Accordingly, the user can make reservation for an another attraction practicable after the end of the present attraction, without moving from the present position.

Still additionally, it is also possible to alter the handling in a store/facility in accordance with a situation of reservation the server BT has accepted. That is, in connection with boats, the server BT retains an association table showing the association between stores/facilities and rates of increase as stated in the following (8-1) to (8-4), where A to D represent threshold values, respectively, and are different from those as previously mentioned.

(8-1) rate of increase<A

The handling in the store/facility is kept in the current condition.

(8-2) A≦rate of increase<B

The number of operators is increased.

(8-3) B≦rate of increase<C

The number of operators is increased and the number of boats is increased.

(8-4) rate of increase≧C

The reservation is temporarily stopped.

When the rate of increase is D (A<D<B), the server BT suggests an increase in number of operators to the recreation ground in order to deal with the users more smoothly.

Accordingly, it is possible to make a suggestion to the user so that the user can utilize more kinds of attractions under limitation in time. In addition, the service provider (recreation ground side) can enhance the rate of utilization, thereby obtaining a larger profit.

Moreover, for a facility where a plurality of different waiting queues occur in a limited area, it is possible to improve the efficiency of the work in a window.

(E2) Description of Second Modification of Fifth Embodiment of the Invention

Secondly, a description will be given hereinbelow of application to a bank or a public office.

In the case of a bank, a service provider installs the reservation server 2 at the entrance of the bank. Accordingly, a user can make reservation without entering the bank.

With this configuration, if a user has a waiting time until the reserved time, the reservation server 2 of the bank transmits the jam situation of a window (for example, a fixed deposit window) other than a window at which the user has made reservation. At this time, the reservation server 2 can transmit, to the user, information on not only the window of that bank but also a nearby store such as a coffee shop so that the user can spend the waiting time efficiently.

In addition, the reservation server 2 can make access to the reservation server 2 of an another store to notify the user terminal 1 of information on another store and the reservation situation, and can also extract only services or events practicable to the user within the waiting time. Still additionally, the reservation server 2 of the bank can also mediate reservation at another store. At this time, the reservation server 2 retains the log or reservation situation at the introduction of another store, thereby demanding an introduction charge or a compensation from another store introduced.

Moreover, on the basis of a reservation situation, each of the reservation servers 2 and 19a to 19e suggests, to a bank or a public office, an increase/decrease in the number of windows of the bank or the public office. For example, the number of windows is changed so that the waiting time or the average waiting time becomes equal to or less than a predetermined value.

In this case, the reservation server 2 calculates an average waiting time on the basis of the number of people who have made reservation. When the user's waiting time exceeds the predetermined value, the reservation server 2 suggests the increase in the number of windows to the bank or the public office.

The waiting time will be described hereinbelow using the Poisson's distribution.

If the people purchase tickets in the order of arrival, a model of the waiting queue is described with an M/M/n model. In this model, the first-mentioned M is a symbol designating that the distribution of arrival of customers is approximated by the Poisson's distribution, the second-mentioned M represents that the distribution of service is approximated by the exponential distribution, and the third-mentioned n signifies that the number of windows is n (integer equal to or more than one). In more detail, the first-mentioned M signifies that the customers come at a time interval according to the exponential distribution on a parameter λ, and the second-mentioned M signifies that the customers receives a time service according to the exponential distribution on a parameter μ, and the third-mentioned n signifies that the servers for providing a service are n in number. In addition, this model is such that the time interval of the arrival of users at a window is proportional to the Poisson's distribution and the average handling time needed for dealing with one user at a window is proportional to the exponential distribution.

For example, in the case in which the number of windows is one, when the average handling time per user is taken as $T_S$ and the average arrival interval is taken as $T_A$, the rate p of utilization is expressed by the equation (9-1).

$$\rho = T_S/T_A \qquad (9\text{-}1)$$

Furthermore, the user's average waiting time $T_W$ is calculated by the equation (9-2).

$$T_W = T_S \times \rho/(1-\rho) \qquad (9\text{-}2)$$

In these equations, each of $T_A$, $T_S$, $T_W$ and ρ are a positive real number, and "X" represents the multiplication while "/" represents the division.

Accordingly, when the number of windows increases to n, $\rho = T_S/(T_A \times n)$, and hence the average waiting time $T_W$ decreases. For this reason, the reservation server 2 suggest, to a store, an increase in the number of windows so that the average waiting time $T_W$ becomes below a predetermined time. In this case, $T_S$ can be calculated in advance by averaging the user handling times at a window, and $T_A$ can be calculated on the basis of the user reservation situation.

Incidentally, in addition to banks, this is also applicable to facilities such as public offices and drugstores in hospitals, for that a plurality of people visit these facilities.

As described above, since the reservation server 2 introduces a window of another store/facility or the like as an alternative window in accordance with a reservation situation, with increased utilization of users.

In addition, since the reservation server 2 introduces other stores, the reservation servers 2 and 19a to 19e can mutually get compensation such as introduction charge.

Still additionally, since the number of windows is altered in accordance with a reservation situation in this way, it is possible to avoid requiring a long waiting time to users and to smoothly conduct the processing in windows.

(E3) Description of Third Modification of Fifth Embodiment of the Invention

Furthermore, a description will be given hereinbelow of a case in which the present invention is applied to a transportation means such as railroad company and airline.

For the business at a window in a railroad or airline, a service provider installs the reservation server 2 not only around a ticket office but also in a railroad yard or airport. Therefore, users can get a ticket without standing in a queue in front of a specified place such as a ticket office.

With this arrangement, when a waiting time occurs until the departure time of a train or aircraft reserved by the user, the reservation server 2 installed in these transportation means has access to the reservation server 2 installed in railroad yards, airports or stores (for example, restaurant 30, coffee shop, snack bar, or the like) in vicinity of stations or airports for notifying the user terminal 1 of information on stores/facilities and reservation situations.

In this connection, it is also appropriate that the reservation server 2 extracts only reservations practicable within the waiting time and mediates reservation at other stores.

In addition, the reservation server 2 can also suggest user's activities after the arrival at the destination by the utilization of a train or aircraft. That is, the reservation server 2 gains access to the reservation server 2 of accommodations or sightseeing facilities at the destination to transmit the lodging information or the reservation situation to the user terminal 1 for the user after the arrival. In addition, the reservation server 2 mediates reservations, if the user desires it.

In this case, by retaining the contents of introduction of the other stores/facilities and the reservation situations, the reservation server 2 of the transportation means can demand the compensation for the introduction to the other stores.

Still additionally, the reservation server 2 suggests handling to a railroad company or an airline on the basis of a reservation situation. For example, when the rate of increase of people who make reservation is higher than a predetermined increase rate, an increase in passengers is expectable. Therefore, the reservation server 2 suggests to a bus company an increase in the number of extra buses as many as possible even immediately before departure. Conversely, if the number of passengers is low, the reservation server 2 suggests, to the bus company, the use of a smaller bus to lower the cost.

Thus, since the reservation server 2 makes a suggestion on the running of buses immediately before the running, it is possible to more definitely seize the number of passengers so that the bus company can finely perform the handling.

In addition, with respect to a railroad train having a no-smoking car and a smoking car, the reservation server 2 obtains the number of smoking seats reserved and the number of no-smoking seats to change the number of no-smoking cars. Therefore, the service provider can offer a service meeting the user's desire.

Thus, since the reservation server 2 suggests the use of other transportation means on the basis of the reservation situation, the number of users increases, and when the reservation server 2 introduces the other stores/facilities, it is possible to demand the compensation such as introduction charge.

(F) Others

The present invention is not limited to the above-described embodiment, and it is intended to cover all changes and modifications of the embodiments of the invention herein which do not constitute departures from the spirit and scope of the invention.

Stores/facilities can issue tickets for sports watching such as baseball and soccer or driver's license.

The present invention is also applicable to cases in which the reservation is made through remote access means using telephone or Internet.

In FIGS. 5 to 10, the communicable area has been indicated by a circle for simplicity of description only, but in fact, it has a complicated configuration, and a three-dimensional configuration in consideration of valleys between buildings and others.

In the above description, although the above-mentioned access line has been constructed using a radio means, it is also possible to use a wire circuit.

In the flow charts of FIG. 14 and other illustrations, "Start" and "End" represent start and end, respectively.

What is claimed is:

1. A reservation server comprising:
   a retaining section for retaining store information including a reservation-needed service requiring reservation and a reservation information of said reservation-needed service;
   an alternative event information outputting section for outputting first alternative event information on an event substituting for said reservation-needed service;
   a receiving section for receiving desired service or desired event information which a user desires, and is transmitted from a user terminal through the communication network;
   a reservation managing section for selectively reading out said store information retained in said retaining section and said first alternative event information outputted from said alternative event information outputting section on the basis of said desired service or desired event received in said receiving section; and
   a transmitting section for transmitting, through the communication network to said user terminal, at least one of said store information and said first alternative event information read out in said reservation managing section,
   wherein said reservation managing section, when receiving a reservation from the user terminal, updates the store information retained in said retaining section, thereby completing the reservation, and
   wherein said transmitting section, when the reservation is completed by said reservation managing section, transmits, to the user terminal, second alternative event information, which is different from the reservation-needed service and the first alternative event information and is practicable for a user of the user terminal.

2. A reservation server according to claim 1, further comprising a waiting time calculating section for calculating, as a waiting time, a difference between a start time, included in said alternative event information selected by said reservation managing section, or a reservation-needed service start time, included in said store information selected by said reservation managing section, and the present time, and for outputting the calculated waiting time.

3. A reservation server according to claim 1, further comprising an end time calculating section for calculating, as an end time, the sum of a performance time to be taken for said event, included in said alternative event information selected by said reservation managing section, or a performance time to be taken for said reservation-needed service, included in said store information selected by said reservation managing section, and the present time, and for outputting the calculated end time.

4. A reservation server according to claim 1, further comprising an other reservation information notifying section for outputting, to said transmitting section, a reservation information on a reservation-needed event requiring reservation, among said alternative event information outputted from said alternative event information outputting section.

5. A reservation server according to claim 4, wherein said other reservation information notifying section is made to output practicable information of said alternative event information as practicable event information to said transmitting section.

6. A reservation server according to claim 5, wherein said other reservation information notifying section is made to output said practicable event information on the basis of a user traveling time, a user's waiting time at an other store and an event performance time in said other store.

7. A reservation server according to claim 5, wherein said alternative event information outputting section is constructed as an event information retaining section to retain and output said alternative event information according to time zone, and said other reservation information notifying section is constructed as an event notifying section to extract said practicable event information from said alternative event information outputted from said event information retaining section on the basis of the present time, and for outputting the extracted practicable event information to said transmitting section.

8. A reservation server according to claim 4,
wherein said retaining section is connected, through a server network, to another reservation server which retains store information that is different from the store information retained in said retaining section, and
wherein said alternative event information outputting section is constructed as an other reservation server interface section to output, as said alternative event information, other reservation server alternative event information retained in said another reservation server connected through the server network, and said other reservation information notifying section is made to extract practicable other reservation server alternative event information, said other reservation server alternative event information satisfying a predetermined condition from said other reservation server alternative event information outputted from said other reservation server interface section, and to output the extracted practicable other reservation server alternative event information to said transmitting section.

9. A reservation server according to claim 8, further comprising a reservation mediating section for transmitting a reservation request from a user, received in said receiving section to said other reservation server through said other reservation server interface section.

10. A reservation server according to claim 9, further comprising a utilization information retaining section for retaining an access log between said reservation server and said other reservation server, said utilization information retaining section being made to calculate an introduction charge on information provided by said other reservation server to said reservation server and an introduction charge on information provided from said reservation server to said other reservation server on the basis of said access log, and to retain both the calculated introduction charges.

11. A reservation server according to claim 1, further comprising a discount information generating section for generating discount information or value-added information on said alternative event information outputted from said alternative event information outputting section and for outputting said discount information or said value-added information to said transmitting section.

12. A reservation server comprising:
a retaining section for retaining store information including a reservation-needed service requiring reservation and reservation information of said reservation-needed service;
an alternative event information outputting section for outputting alternative event information on an event substituting for said reservation-needed service;
a receiving section for receiving desired service or desired event information which a user desires, and which is transmitted from a user terminal through the communication network;
a reservation managing section for selectively reading out said store information retained in said retaining section and said alternative event information outputted from said alternative event information outputting section on the basis of said desired service or desired event received by said receiving section;
a transmitting section for transmitting, through the communication network to said user terminal, at least either one of said store information and alternative event information read out in said reservation managing section; and
an other reservation information notifying section which outputs, to said transmitting section, reservation information of a reservation-needed event which needs reservation, out of the alternative event information output from said alternative event information outputting section,
wherein said other reservation information notifying section outputs, to said transmitting section, practicable alternative event information, out of the alternative event information, as practicable event information, and
wherein said other reservation information notifying section is made to extract a longest event taking a maximum performance time among events, included in said alternative event information, on the basis of an event end time obtained by adding said waiting time to a performance time to be taken for each of said events, for including the extracted longest event in said practicable event information and outputting the longest event included in said practicable event information.

13. A reservation server comprising:
a retaining section for retaining store information including a reservation-needed service requiring reservation and reservation information of said reservation-needed service;
an alternative event information outputting section for outputting alternative event information on an event substituting for said reservation-needed service;
a receiving section for receiving desired service or desired event information which a user desires, and which is transmitted from a user terminal through the communication network;
a reservation managing section for selectively reading out said store information retained in said retaining section and said alternative event information outputted from said alternative event information outputting section on the basis of said desired service or desired event received by said receiving section;
a transmitting section for transmitting, through the communication network to said user terminal, at least either one of said store information and alternative event information read out in said reservation managing section; and an other reservation information notifying section which outputs, to said transmitting section, reservation information of a reservation-needed event which needs reservation, out of the alternative event information output from said alternative event information outputting section, wherein said other reservation information notifying section outputs, to said transmitting section, practicable alternative event information, out of the alternative event information, as practicable event information, and wherein said other reservation information notifying section is made to extract a longest event taking a maximum performance time among events, included in said alternative event information, on the basis of an event end time obtained by adding said waiting time to a performance time to be taken for each of said events, for including the extracted longest event in said practicable event information and outputting the longest event included in said practicable event information.

14. A user terminal comprising:

a receiving section for receiving, through the communication network, at least either one of (i) store information including a reservation-needed service requiring reservation and reservation information of said reservation-needed service and (ii) first alternative event information about an event substituting for said reservation-needed service, retained in a reservation server;

a displaying section for displaying said store information or alternative event information received in said receiving section;

a selecting section for selecting a desired service or desired event which a user desires, among said store information or alternative event information displayed on said displaying section; and a transmitting section for transmitting, through the communication network, the desired service or desired event selected in said selecting section to said reservation server, wherein said receiving section, after completion of reservation based on the desired service or the desired event transmitted by said transmitting section, receives second alternative event information, which is different from the reservation-needed service and the first alternative event information and is practicable for a user of the user terminal.

15. A user terminal according to claim 14, further comprising a discount information retaining section for retaining discount information or value-added information transmitted from said reservation server and received in said receiving section.

16. A reservation system comprising:

a user terminal for transmitting and receiving data; and a reservation server, connected through a radio network to said user terminal, for outputting at least either one of (i) store information including a reservation-needed service requiring reservation and a reservation information of said reservation-needed service and (ii) first alternative event information on an event substituting for said reservation-needed service to said user terminal, said reservation server including:

a retaining section for retaining said store information;

an alternative event information outputting section for outputting said alternative event information;

a first receiving section for receiving, through the radio network, a desired service or desired event which a user desires, and is transmitted from said user terminal;

a reservation managing section for selectively reading out said store information, retained in said retaining section, and said first alternative event information, outputted from said alternative event information outputting section, on the basis of the desired service or desired event received in said first receiving section; and a first transmitting section for transmitting, through the radio network to said user terminal, at least either one of said store information and alternative event information read out by said reservation managing section, wherein said reservation managing section updates the store information retained in said retaining section, thereby accepting a reservation request from a user of the user terminal, and wherein said first transmitting section, when the reservation is accepted by said reservation managing section, transmits, through the radio network to the user terminal, second alternative event information, which is different from the reservation-needed service and the first alternative event information and is practicable for a user of the user terminal, said user terminal including:

a second receiving section for receiving at least either one of said store information and alternative event information transmitted from said first transmitting section of said reservation server through the radio network;

a displaying section for displaying said store information or alternative event information received in said second receiving section;

a selecting section for selecting the desired service or desired event which the user desires, among said store information or alternative event information displayed on said displaying section; and a second transmitting section for transmitting, through the radio network to said reservation server, the desired service or desired event selected by said selecting section.

17. A reservation method comprising:

a first transmitting step in which a reservation server transmits, to a user terminal connected through a radio network to said reservation server, at least one of store information including a reservation-needed service requiring reservation and reservation information of said reservation-needed service and first alternative event information on an event substituting for said reservation-needed service;

a reserving step in which said user terminal transmits, to said reservation server, a desired service or desired event which a user desires, among said store information or alternative event information transmitted in said first transmitting step;

a selecting step in which said reservation server selects at least one of said store information and said first alternative event information on said event substituting for said reservation-needed service, on the basis of the desired service or desired event transmitted in said reserving step;

a second transmitting step in which said reservation server transmits, to said user terminal, said store information or first alternative event information selected by said selecting step;

a reservation accepting step in which the reservation server accepts a reservation from a user of the user terminal, when the user makes a reservation based on the store information and the first alternative event information transmitted in said second transmitting step; and a third transmitting step for transmitting, to the user terminal, second alternative event information, which is different from the reservation-needed service and the first alternative event information and is practicable for the user.

18. A reservation method according to claim 17, wherein said first transmitting step includes:

an other reservation server access step in which said reservation server has access to other reservation server alternative event information retained in at least an other reservation server which is connected through a server network to said reservation server;

a practicable event information extracting step in which said reservation server extracts, from said other reservation server alternative event information accessed in the other reservation server access step, practicable event information practicable within a user's waiting time to be taken until a desired service starts; and a practicable event information transmitting step in which said reservation server transmits, to said user terminal, said practicable event information extracted in said practicable event information extracting step.

19. A reservation method according to claim 17, wherein said selecting step includes:

an other reservation server access step in which said reservation server gains access to other reservation server store information or other reservation server alternative event information retained in an other reservation server connected through a server network to said reservation server;

a waiting time calculating step in which said reservation server calculates a user's waiting time, to be taken until a desired service or a desired event starts, on the basis of said other reservation server store information or other reservation server alternative event information accessed in said other reservation server access step; and an extracting step in which said reservation server extracts, from the desired service or the desired event, a service or event practicable within the waiting time calculated in said waiting time calculating step.

* * * * *

UNITED STATES PATENT AND TRADEMARK OFFICE
CERTIFICATE OF CORRECTION

| | | |
|---|---|---|
| PATENT NO. | : 7,152,038 B2 | |
| APPLICATION NO. | : 09/824237 | |
| DATED | : December 19, 2006 | |
| INVENTOR(S) | : Kimitaka Murashita et al. | |

It is certified that error appears in the above-identified patent and that said Letters Patent is hereby corrected as shown below:

Cover Page, (57) Abstract

Line 11, delete "store-near" and insert --store near--.

Signed and Sealed this

Twenty-second Day of May, 2007

JON W. DUDAS
*Director of the United States Patent and Trademark Office*